US011991452B2

(12) United States Patent
Nakade et al.

(10) Patent No.: US 11,991,452 B2
(45) Date of Patent: May 21, 2024

(54) IMAGING DEVICE, PORTABLE TERMINAL, AND EXPOSURE CONTROL METHOD

(71) Applicant: MAXELL, LTD., Kyoto (JP)

(72) Inventors: Mayumi Nakade, Kyoto (JP); Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 42 days.

(21) Appl. No.: 17/630,616

(22) PCT Filed: Jul. 31, 2019

(86) PCT No.: PCT/JP2019/030080
§ 371 (c)(1),
(2) Date: Jan. 27, 2022

(87) PCT Pub. No.: WO2021/019745
PCT Pub. Date: Feb. 4, 2021

(65) Prior Publication Data
US 2022/0263992 A1    Aug. 18, 2022

(51) Int. Cl.
*H04N 23/71* (2023.01)
*H04N 23/73* (2023.01)

(52) U.S. Cl.
CPC ............. *H04N 23/71* (2023.01); *H04N 23/73* (2023.01)

(58) Field of Classification Search
CPC ........ H04N 23/71; H04N 23/73; H04N 23/00; H04N 23/75; G03B 7/093; G03B 11/00
See application file for complete search history.

(56) References Cited

U.S. PATENT DOCUMENTS 6,968,073 B1 * 11/2005 O'Boyle ................ G06V 40/10
356/3
2010/0310130 A1 * 12/2010 Beghuin ............ G01M 11/0264
382/106
(Continued)

FOREIGN PATENT DOCUMENTS

JP    2000-299822 A    10/2000
JP    2012-222540 A    11/2012
(Continued)

OTHER PUBLICATIONS

Machine Translation of JP2019-087796-A (Year: 2019).*
International Search Report of PCT/JP2019/030080 dated Oct. 15, 2019.

*Primary Examiner* — Jason A Flohre
(74) *Attorney, Agent, or Firm* — MATTINGLY & MALUR, PC

(57) ABSTRACT

An imaging device comprises: an image sensor to convert an optical image captured in light receiving elements arranged in an array on an imaging surface into sensor signals and output the sensor signals; a modulator provided on a light receiving surface of the image sensor and to modulate light by using a first grating pattern; an exposure control unit to determine an exposure condition based on the sensor signals, change a set exposure condition to the determined exposure condition, and control exposure in accordance with the changed exposure condition; and an image processing unit to generate a second grating pattern corresponding to the first grating pattern, generate a moiré fringe image based on the second grating pattern and the sensor signals, and generate a photographed image based on the moiré fringe image. The exposure condition includes an exposure time of the image sensor and a transmittance of the modulator.

16 Claims, 32 Drawing Sheets

(56) References Cited

U.S. PATENT DOCUMENTS

| | | | |
|---|---|---|---|
| 2012/0257077 A1 | 10/2012 | Suzuki | |
| 2016/0142610 A1* | 5/2016 | Rivard | H04N 23/631 |
| | | | 348/239 |
| 2017/0069064 A1 | 3/2017 | Sugimoto et al. | |
| 2019/0118970 A1* | 4/2019 | Takahashi | G02F 1/133509 |
| 2019/0313018 A1* | 10/2019 | Ono | H04N 23/957 |
| 2019/0339485 A1* | 11/2019 | Nakamura | G02B 5/1814 |
| 2020/0084350 A1* | 3/2020 | Kishine | H04N 23/00 |
| 2021/0014412 A1* | 1/2021 | Miyatani | H04N 23/80 |

FOREIGN PATENT DOCUMENTS

| | | | |
|---|---|---|---|
| JP | 2014-230099 A | | 12/2014 |
| JP | 2017-022491 A | | 1/2017 |
| JP | 2019-087796 A | | 6/2019 |
| JP | 2019087796 A | * | 6/2019 |
| WO | 2015/156151 A1 | | 10/2015 |
| WO | 2017/149687 A1 | | 9/2017 |

\* cited by examiner

FIG.2A 104,105
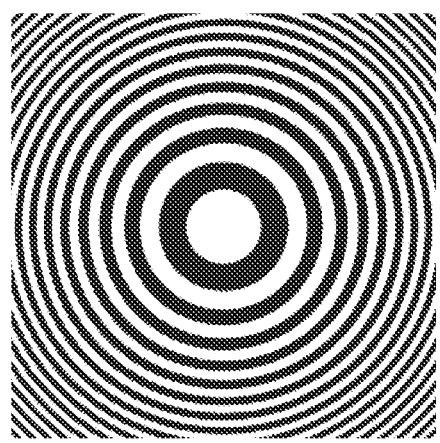
FIG.2B 104b
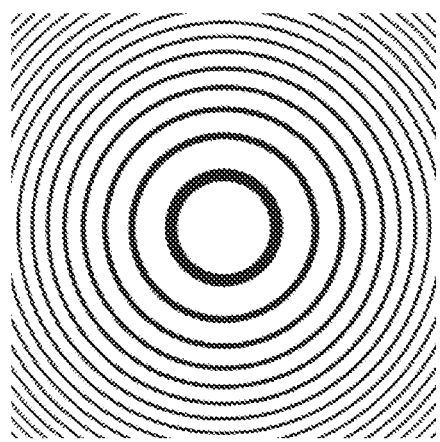
FIG.2C 104c
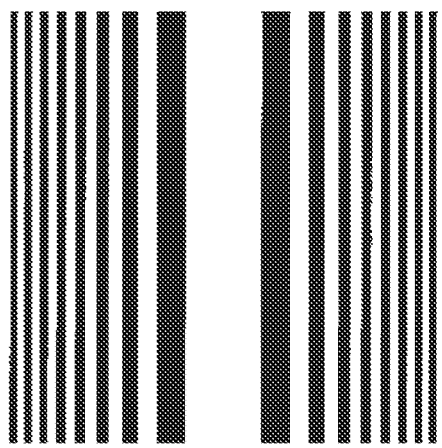

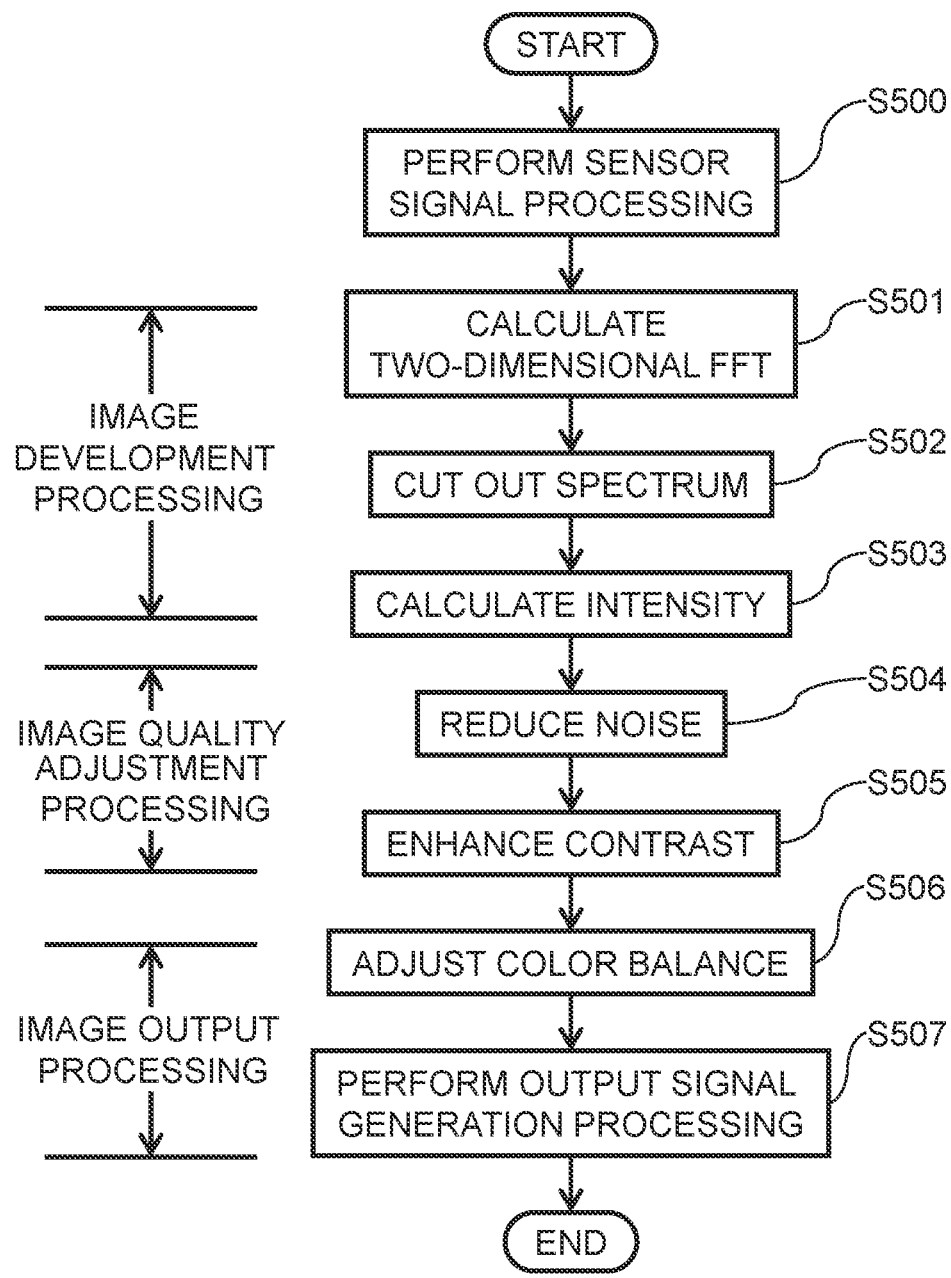

FIG.4A
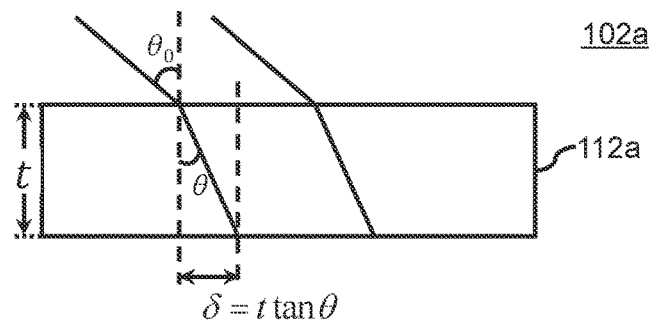
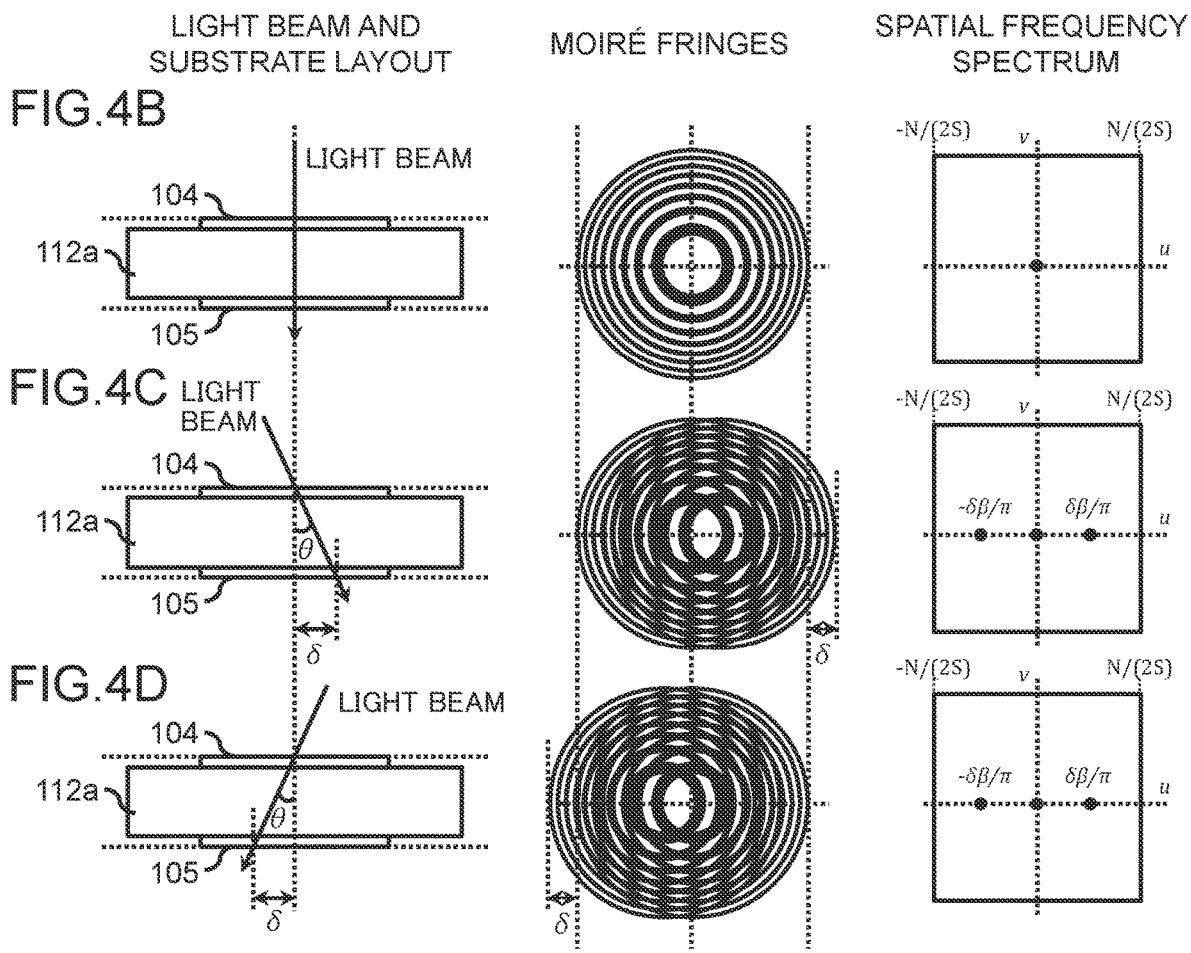

FIG.5A
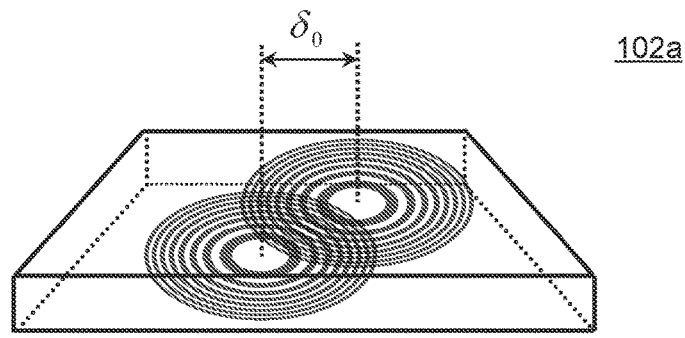
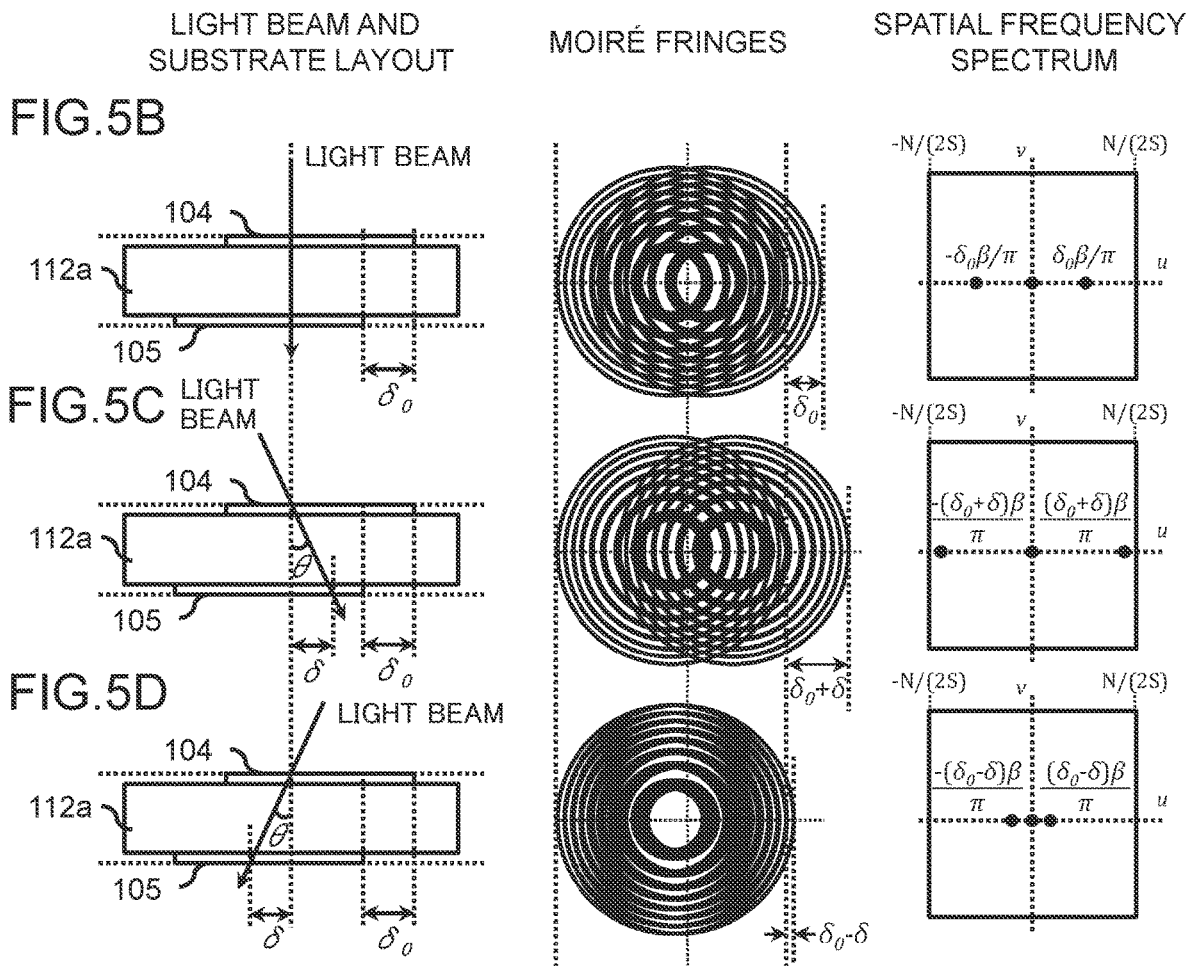

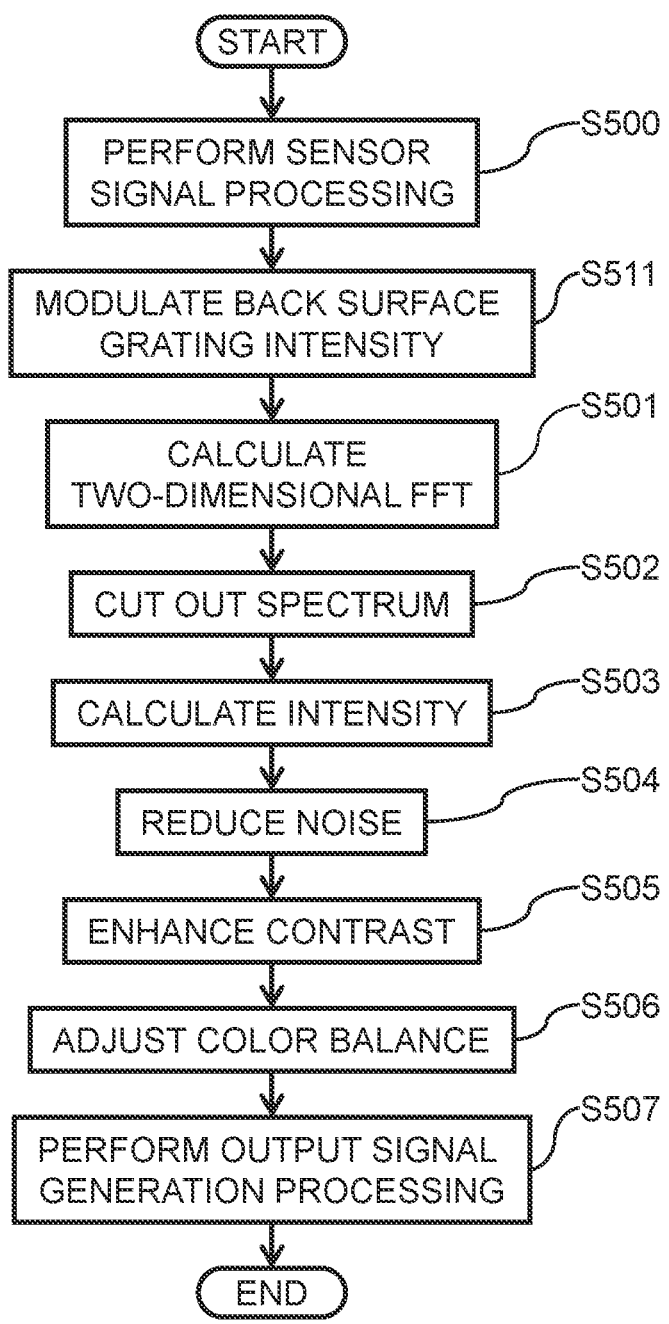

$\Phi_F, \Phi=0$ $\Phi_F, \Phi=\pi/2$ $\Phi_F, \Phi=\pi$ $\Phi_F, \Phi=3\pi/2$ 0 1 1 0

0 0 1 1

1 0 0 1

1 1 0 0

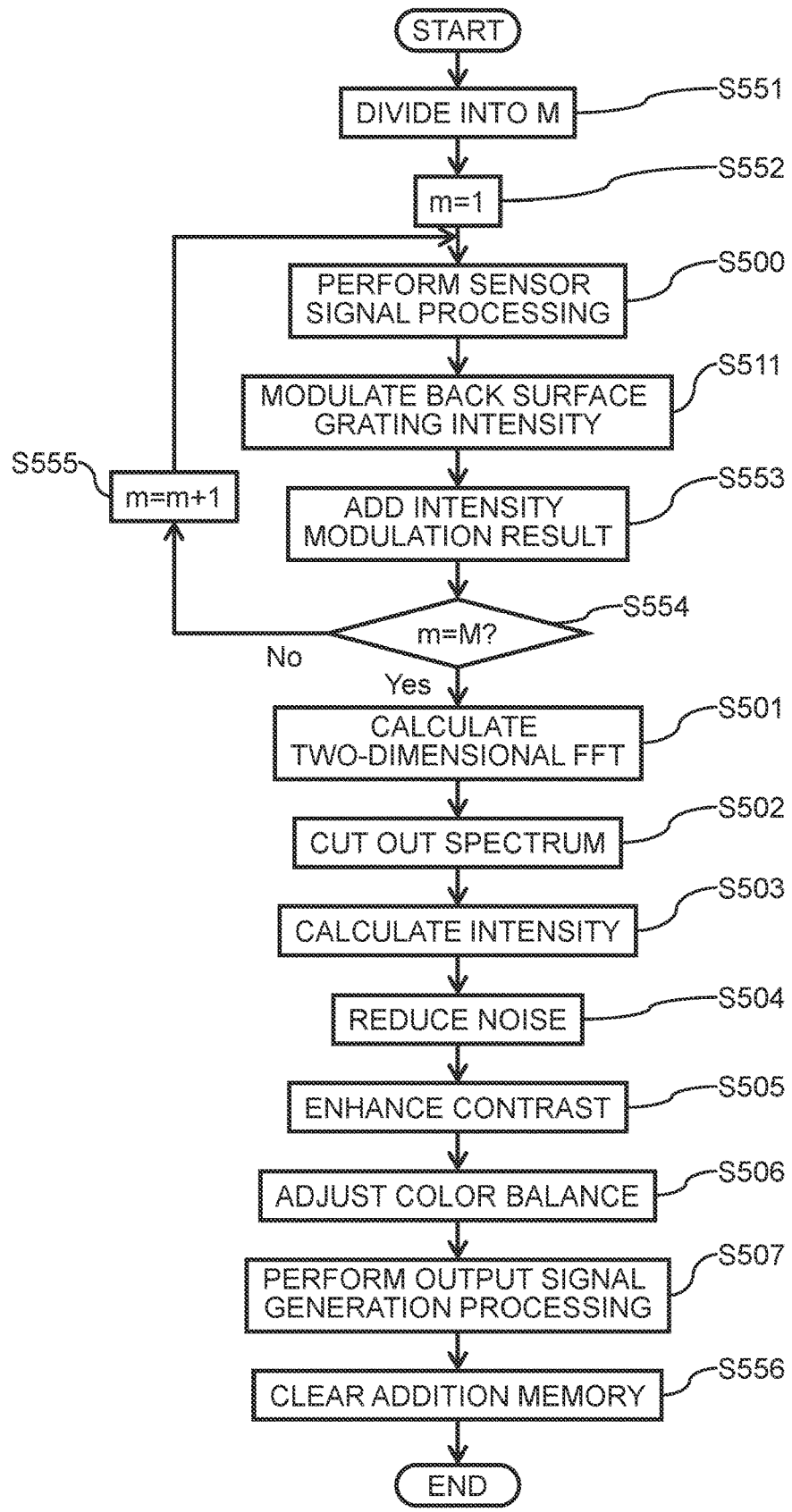

161

162

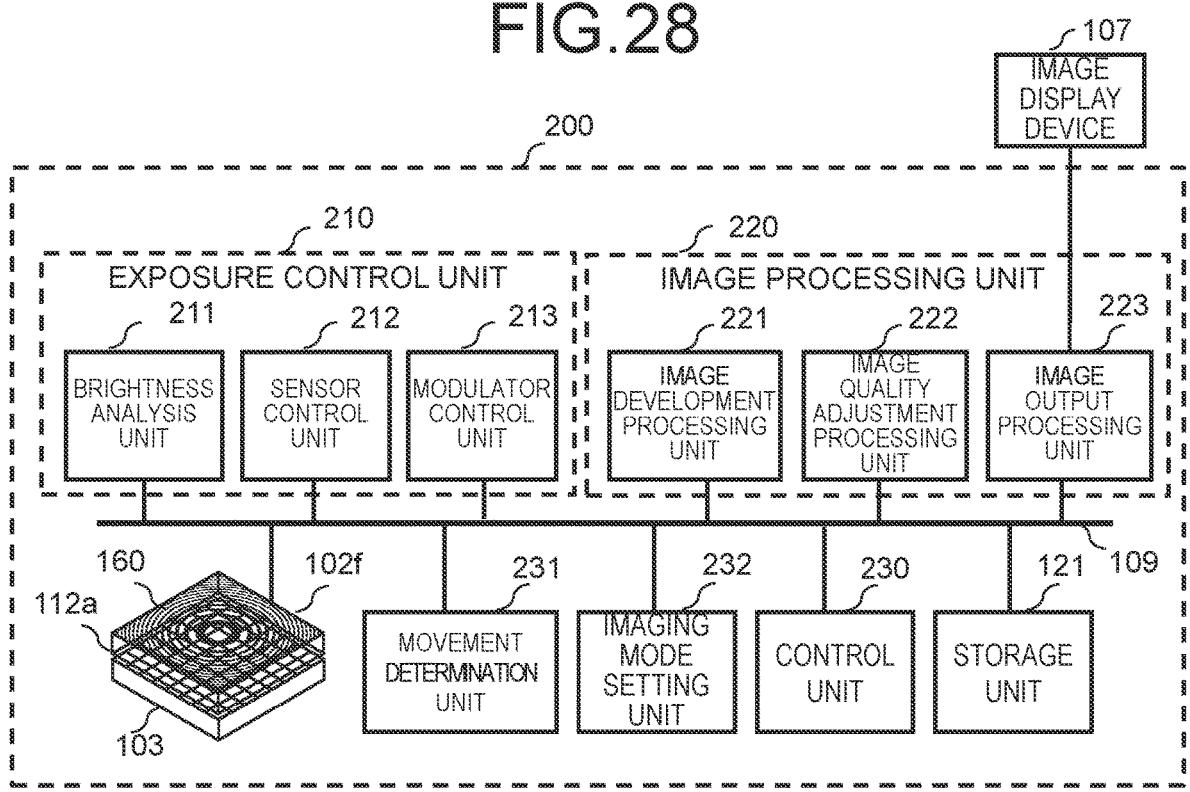

# IMAGING DEVICE, PORTABLE TERMINAL, AND EXPOSURE CONTROL METHOD

TECHNICAL FIELD

The present invention relates to an imaging device, in particular, relates to a lens-less imaging device without including any lenses.

BACKGROUND ART

As so-called lens-less imaging devices, imaging devices using zone plates (FZP) have been known. A lens-less imaging device of this type is configured to detect a light beam from a subject as a spatial frequency of moiré fringes by FZP to reconstruct an image of the subject by the Fourier-transformed image. The lens-less imaging device configured as above can decrease its size and costs.

For example, as a lens-less imaging device, Patent Literature 1 discloses "an imaging device including an image sensor that converts an optical image captured in a plurality of pixels arrayed on an imaging surface in an array configuration into an image signal and outputs the image signal, a modulator that is provided on the light receiving surface of the image sensor and modulates light intensity, an image storage unit that temporarily stores the image signal output from the image sensor, and a signal processing unit that performs an image process of the image signal output from the image storage unit, wherein the modulator has a first grating pattern formed of a plurality of concentric circles, and the signal processing unit modulates the image signal output from the image storage unit with a virtual second grating pattern formed of a plurality of concentric circles to create a moiré fringe image, and changes the size of the concentric circles of the second grating pattern corresponding to a focus position" (extracted from Abstract).

CITATION LIST

Patent Literature

Patent Literature 1: WO-2017-149687

SUMMARY OF INVENTION

Technical Problem

At the time of imaging, even in the case of a lens-less imaging device, exposure control for adjusting the light volume to be projected onto an imaging element (image sensor) is necessary. However, the lens-less imaging device, which does not include any lenses, cannot employ the technique of "opening and closing an aperture diaphragm" for controlling the light volume passing through the lens by controlling an aperture blade inside the lens, which is generally used in the case of an imaging device with a lens. In addition, Patent Literature 1 does not mention the exposure control. Accordingly, a conventional lens-less imaging device is not suitable for use in an environment where the light volume is not constant, for example, an environment where an illumination varies.

The present invention has been made in order to solve the problems described above, and an object thereof is to provide a lens-less imaging technique for realizing acquisition of high-quality images regardless of the environment.

Solution to Problem

According to the present invention, provided is an imaging device comprising: an image sensor that is configured to convert an optical image captured in a plurality of light receiving elements arranged in an array on an imaging surface into sensor signals, and output the sensor signals; a modulator that is provided on a light receiving surface of the image sensor, and configured to modulate light by using a first grating pattern; an exposure control unit that is configured to determine an exposure condition based on the sensor signals, change a set exposure condition to the exposure condition as determined, and control exposure in accordance with the exposure condition as changed; and an image processing unit configured to generate a second grating pattern corresponding to the first grating pattern, generate a moiré fringe image based on the second grating pattern and the sensor signals, and generate a photographed image based on the moiré fringe image, and the exposure condition including an exposure time of the image sensor and a transmittance of the modulator.

Furthermore, according to the present invention, provided is an exposure control method for an imaging device including: an image sensor that is configured to convert an optical image captured in a plurality of light receiving elements arranged in an array on an imaging surface into sensor signals and output the sensor signals; a modulator that is provided on a light receiving surface of the image sensor and configured to modulate light by using a first grating pattern; and an image processing unit configured to generate a second grating pattern corresponding to the first grating pattern, generate a moiré fringe image based on the second grating pattern and the sensor signals, and generate a photographed image based on the moiré fringe image, the exposure control method comprising the steps of: determining an exposure condition based on the sensor signals; changing a set exposure condition to the exposure condition as determined; and controlling exposure in accordance with the exposure condition as changed, and the exposure condition including an exposure time of the image sensor and a transmittance of the modulator.

Advantageous Effects of Invention

According to the present invention, it is possible to acquire high-quality images regardless of the environment by using a lens-less imaging device. The problems, configurations, and advantageous effects other than those described above will be clarified by explanation of the embodiments below.

BRIEF DESCRIPTION OF DRAWINGS

FIG. 2 Each of FIG. 2A to FIG. 2C explains an example of a grating pattern according the embodiments of the present invention.

FIG. 3 illustrates a flowchart of image processing performed by an image processing unit according the embodiments of the present invention.

FIG. 4A explains the production of an in-plane shift in an application image from the front surface to the back surface of a grating substrate due to an oblique incident collimated light, and FIG. 4B to FIG. 4D explain the creation of moiré fringes and a frequency spectrum in the case where the axes of the gratings on both surfaces of the grating substrate are aligned according to the embodiment of the present invention.

FIG. 5A is a schematic diagram in the case where the axes of a front surface grating and a back surface grating are disposed as the axes are shifted according to an embodiment of the present invention, and FIG. 5B to FIG. 5D explain the creation of moiré fringes and a frequency spectrum in the case where the gratings of both the surfaces of the grating substrate are disposed as the gratings are shifted according to the embodiment of the present invention.

FIG. 10 is a flowchart of the image processing performed by the image processing unit of the imaging device that implements the back-side grating pattern with the image processing according to the embodiment of the present invention.

FIG. 18 is a flowchart of the image processing during execution of the time division fringe scanning according to the embodiments of the present invention.

FIG. 28 illustrates a configuration of an imaging device according to the third embodiment.

DESCRIPTION OF EMBODIMENTS

Hereinafter, embodiments of the present invention will be described with reference to the drawings.

In the embodiments described below, when the shapes, positional relationships, and the like of components and constituent parts are referred, ones in shapes substantially analogue or similar to the shapes, for example, are included, unless otherwise explicitly shown or unless clearly theoretically considered otherwise. This also applies to numerical values and ranges.

In all the drawings for explaining the embodiments, the same members are assigned with the same reference signs in principle, and the duplicated description is omitted.

Prior to describing the embodiments according to the present invention, a basic configuration and processing of an optical lens-less imaging device (in the following, simply referred to as an imaging device), which is used in common in the embodiments, will be described.

[Configuration of Imaging Device]

Figure 1A:
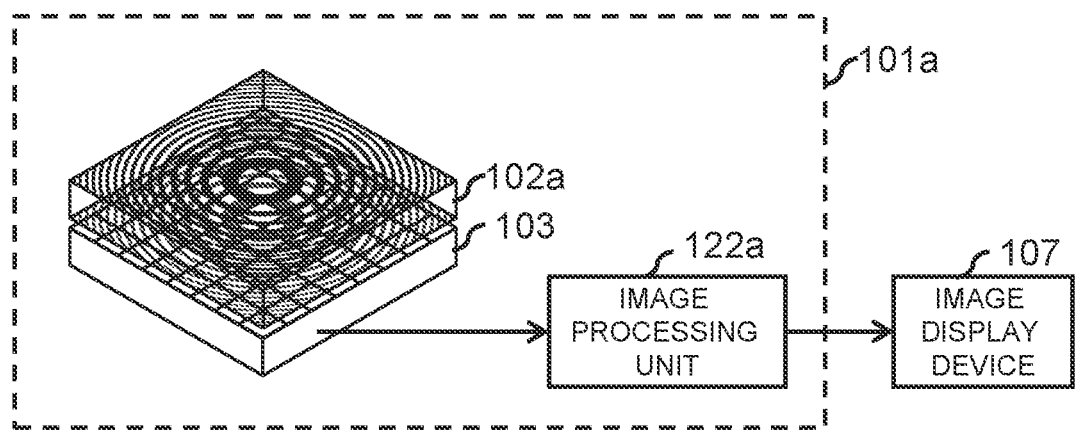
FIG. 1A illustrates a configuration of a basic lens-less imaging device according the embodiments of the present invention, and each of FIG. 1B and FIG. 1C explains an example of a modulator of the imaging device according the embodiments of the present invention.

FIG. 1A explains an example of a configuration of an imaging device 101a according to a first embodiment. The imaging device 101a is configured to acquire images of an object in the surroundings without using a lens that forms an image. As illustrated in FIG. 1A, the imaging device 101a includes a modulator 102a, an image sensor 103, and an image processing unit 122a.

Figure 1B:
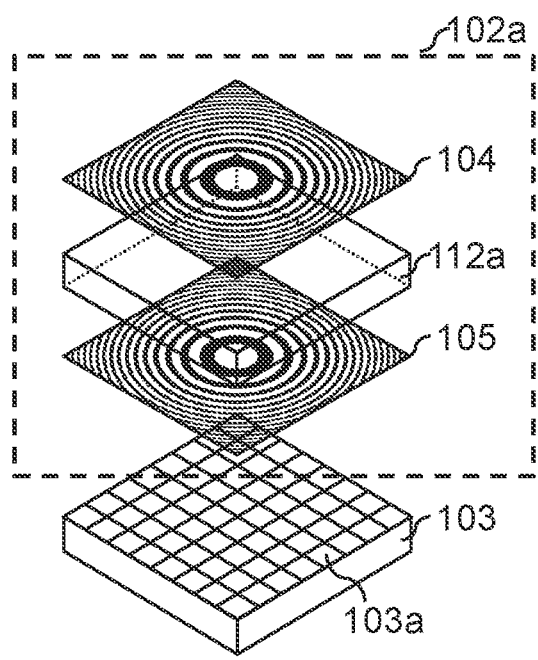

FIG. 1B illustrates an example of the modulator 102a. The modulator 102 is fixed in close contact with the light receiving surface of the image sensor 103. The modulator 102a includes a first grating pattern 104 and a second grating pattern 105 which are formed on a grating substrate 112a. For example, the grating substrate 112a is formed of a transparent material such as glass or plastic. In the following, the image sensor 103 side of the grating substrate 112a is referred to as a back surface, and the opposite side, that is, the imaging target side is referred to as a front surface. Therefore, the first grating pattern 104 and the second grating pattern 105 are also referred to as a front surface side grating pattern 104 and a back surface side grating pattern 105, respectively.

As illustrated in FIG. 2A, each of the front surface side grating pattern 104 and the back surface side grating pattern 105 includes a concentric grating pattern in which each gap of the grating pattern, in other words, the pitch narrows toward the outer side inversely proportional to the radius from the center. The front surface side grating pattern 104 and the back surface side grating pattern 105 are formed by depositing aluminum and the like by sputtering used for semiconductor processes and any other process, for example. With the pattern on which aluminum is deposited and the pattern on which no aluminum is deposited, shades are formed. Note that a forming method of the front surface side grating pattern 104 and back surface side grating pattern 105 is not limited to the one described above, and for example, they may be formed with shades by printing with an ink jet printer.

Figure 1C:
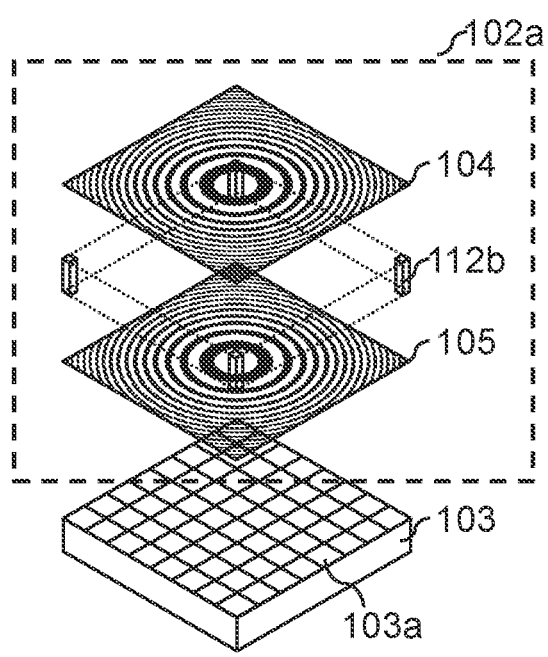

In the above, a method of forming the front surface side grating pattern 104 and back surface side grating pattern 105 on the grating substrate 112a to implement the modulator 102a has been described. However, as illustrated in FIG. 1C, it is possible to implement the modulator 102a by, for example, forming the front surface side grating pattern 104 and back surface side grating pattern 105 into a thin film form, respectively, and holding them with a support member 112b.

The light intensity of light transmitted through the front surface side grating pattern 104 and back surface side grating pattern 105 is modulated by the grating patterns thereof. The transmitted light is received by the image sensor 103.

The image sensor 103 is configured to convert an optical image captured by a plurality of light receiving elements (imaging elements, image sensors) arranged in an array on an imaging surface into sensor signals (RAW data) and output the converted sensor signals.

On the front surface of the image sensor 103, pixels 103a that are light receiving elements are regularly arranged so as to form the gratings. The image sensor 103 converts the light received at the pixels 103a into sensor signals that are electrical signals. The image sensor 103 includes, for example, a CCD (Charge Coupled Device) image sensor, or a CMOS (Complementary Metal Oxide Semiconductor) image sensor.

The image processing unit 122a is configured to perform image processing on the sensor signals output from the image sensor 103, generate image data, and output the generated image data as a photographed image to, for example, an image display device 107.

[Image Processing]

Here, an outline of the image processing performed by the image processing unit 122a will be described. FIG. 3 is a flowchart of the outline of the image processing performed by the image processing unit 122a of the imaging device 101a of FIG. 1A.

In the imaging device 101a, the image sensor 103 outputs sensor signals to the image processing unit 122a at a predetermined time interval. In the following, the interval at which the image sensor 103 outputs the sensor signals is referred to as a driving period. The image processing unit 122a performs the image processing described below every time it receives sensor signals from the image sensor 103.

Firstly, the image processing unit 122a performs, for example, demosaicing processing on the sensor signals acquired from the image sensor 103, and performs a sensor signal processing for generating a moiré fringe image for each RGB (Red Green Blue) component of color (step S500).

Next, with respect to each moiré fringe image, the image processing unit 122a obtains a frequency spectrum by calculating a two-dimensional Fourier transform (FFT: Fast Fourier Transform) such as a Fast Fourier Transform (FFT: Fast Fourier Transform) for each RGB component (step S501).

Subsequently, after cutting the data of the necessary frequency domain from the frequency spectrum obtained by the process in step S501 (step S502), the image processing unit 122a calculates the intensity of the frequency spectrum (step S503) to obtain a processed image (post-processing image).

In the present embodiment, as described later, a modulator including a plurality of patterns having different phases may be used. For example, in the case of using a modulator having four types of patterns, the image processing unit 122a obtains four types of post-processing images whose phases are different with each other, and synthesizes the intensity thereof to obtain one post-processing image. In the following, processing of obtaining a post-processing image by calculating such as a frequency spectrum and intensity based on sensor signals acquired from the image sensor 103 is referred to as an image development processing, and an image obtained at this time is referred to as a developed image.

Then, the image processing unit 122a performs noise reduction processing on the obtained post-processing image (step S504), and performs image quality adjustment processing such as contrast enhancement processing (step S505).

The image processing unit 122a adjusts the color balance of the image after the image quality adjustment processing (step S506), performs output image generation processing to generate the adjusted image as an output signal (step S507), and outputs the output signal after the output image generation processing as a photographed image. By performing the steps above, the image processing unit 122a completes the image processing.

[Imaging Principle]

Subsequently, the principle of imaging by the imaging device 101a will be described.

Firstly, the concentric front surface side grating pattern 104 and back surface side grating pattern 105 in which the pitch becomes narrower inversely proportional to the radius from the center are defined as follows. In a laser interferometer and the like, the case is assumed where a spherical wave close to a plane wave is caused to interfere with a plane wave used as a reference beam. When the radius from the reference coordinates that are the center of concentric circle is r and the phase of the spherical wave at that point is ϕ(r), the phase ϕ(r) is expressed by the following Equation (1) using a coefficient R that determines the size of the curve of the wave front.

[Equation 1]

$$\phi(r) = \beta r^2 \qquad (1)$$

The reason the phase is expressed by the square of the radius r although the wave is the spherical wave is that since the spherical wave is close to the plane wave, approximation can be achieved with the lowest order of expansion. When a plane wave is caused to interfere with light having this phase distribution, the intensity distribution of interference fringes expressed by the following Equation (2) is obtained.

[Equation 2]

$$I(r) = \frac{1}{4}|\exp i\phi(r) + 1|^2 = \frac{1}{2}(1 + \cos\phi) = \frac{1}{2}(1 + \cos\beta r^2) \qquad (2)$$

The interference fringes become concentric fringes having bright lines at a radial position satisfying the following Equation (3).

[Equation 3]

$$\phi(r) = \beta r^2 = 2n\pi \quad (n = 0, 1, 2, \ldots) \qquad (3)$$

When the pitch of the fringes is p, the following Equation (4) is obtained.

[Equation 4]

$$p\frac{d}{dr}\phi(r) = 2p\beta r = 2\pi, \; p(r) = \frac{\pi}{\beta r} \qquad (4)$$

The Equation (4) reveals that the pitch narrows inversely proportional to the radius. The plate having such fringes is referred to as the Fresnel zone plate or the Gabor zone plate. The grating patterns having a transmittance distribution proportional to the intensity distribution defined in this manner are used as the front surface side grating pattern 104 and back surface side grating pattern 105 illustrated in FIG. 1B.

Next, with reference to FIG. 4A, an incident state will be described. FIG. 4A illustrates an incident state.

It is assumed that collimated light enters the modulator 102a in a thickness t having such a grating pattern formed on the both surfaces, respectively, at an angle of $\theta_0$ as illustrated in FIG. 4A. It is assumed that when the refraction angle in the modulator 102a is θ, light geometric-optically multiplied by the transmittance of the grating on the front surface enters the back surface with a shift δ=t·tan θ, and two concentric gratings are formed as the centers are aligned, the transmittance of the grating of the back surface is multiplied with a shift of δ. At this time, the intensity distribution expressed by the following Equation (5) is obtained.

[Equation 5]

$$I(x, y)I(x+\delta, y) = \frac{1}{4}[1 + \cos\beta(x^2 + y^2)][1 + \cos\beta((x+\delta)^2 + y^2)] = \qquad (5)$$

$$\frac{1}{8}[2 + 4\cos\beta(r^2 + \delta x)\cos\delta\beta x + \cos2\beta(r^2 + \delta x) + \cos2\delta\beta x]$$

It is revealed that the fourth term of the expansion formula provides fringe patterns at regular intervals straight to the direction of a shift of two gratings on throughout the surfaces of the overlapping region. The fringes produced at a relatively low spatial frequency with the such overlap of fringes with fringes are referred to as moiré fringes.

The fringes at regular straight intervals produce a sharp peak in the spatial frequency distribution obtained by two-dimensional First Fourier Transform of a detected image. From the value of the frequency, the value δ, i.e., the incident angle θ of the light beam can be derived.

It is apparent that such moiré fringes uniformly obtained throughout the surface at regular intervals are produced at the same pitch from symmetry on the disposition of the grating in concentric circles regardless of the direction of a shift of two gratings. The reason such fringes are obtained is that the grating pattern is formed with a Fresnel zone plate or a Gabor zone plate, and it is considered that it is difficult to obtain uniform fringes throughout the surface with a grating pattern other than this. However, it is an object to obtain uniform moiré fringes at regular intervals throughout the surface, and the grating pattern is not limited to the Fresnel zone plate or the Gabor zone plate.

It is revealed that also by the second term of the expansion equation of the Equation (5), the fringes are produced in which the intensity of the Fresnel zone plate is modulated with moiré fringes. However, the frequency spectrum of a product of two fringes is convolution of the Fourier spectrums of two fringes, and thus no sharp peak is obtained.

From the Equation (5), a component having a sharp peak alone is extracted as in the following Equation (6).

[Equation 6]

$$I(x, y) = \frac{1}{8}(2 + \cos2\delta\beta x) \qquad (6)$$

The Fourier spectrum is expressed by the following Equation (7).

[Equation 7]

$$\mathcal{F}[I(x, y)] = \qquad (7)$$

$$\frac{1}{8}\mathcal{F}[2 + \cos2\delta\beta x] = \frac{1}{4}\delta(u, v) + \frac{1}{8}\delta\left(u + \frac{\delta\beta}{\pi}, v\right) + \frac{1}{8}\delta\left(u - \frac{\delta\beta}{\pi}, v\right)$$

Here, F expresses the operation of Fourier Transform, u and v express spatial frequency coordinates in an x direction and a y direction, and δ with parentheses is a delta function. From this result, it is revealed that in the spatial frequency spectrum of the detected image, the peak of the spatial frequency of moiré fringes is produced at a location u=±δβ/π.

The manner is illustrated in FIG. 4B to FIG. 5D. In these drawings, from left to right, a layout diagram of the light beam and the modulator 102a, moiré fringes, and a schematic diagram of the spatial frequency spectrum are illustrated. FIG. 4B shows vertical incidence, FIG. 4C shows the case where a light beam enters at an angle θ from the left side, and FIG. 4D shows the case where a light beam enters at an angle θ from the right side.

The axes of the front surface side grating pattern 104 formed on the front surface side of the modulator 102a and the back surface side grating pattern 105 formed on the back surface side are aligned. In FIG. 4B, the shadows of the front surface side grating pattern 104 and back surface side grating pattern 105 match, and no moiré fringes are produced.

In FIG. 4C and FIG. 4D, the shift between the front surface side grating pattern 104 and the back surface side grating pattern 105 is equal, and this produces moiré, and the peak positions of the spatial frequency spectra also match. Therefore, from the spatial frequency spectrum, it is not possible to discriminate whether the incident angle of the light beam is the case in FIG. 4C or the case in FIG. 4D.

In order to avoid this, for example, as illustrated in FIG. 5A, the front surface side grating pattern 104 and back surface side grating pattern 105 are relatively shifted beforehand to the optical axis also to the light beam that perpendicularly enters the modulator 102a such that the shadows of two grating patterns overlap with each other in a shift.

When a relative shift in the shadows of the two gratings with respect to the vertical incident plane wave on the axis is δ0, the shift δ produced due to the plane wave at the incident angle θ is expressed by the following Equation (8).

[Equation 8]

$$\delta = \delta_0 + t\tan\theta \quad (8)$$

At this time, the peak of the spatial frequency spectrum of the moiré fringes of the light beam at the incident angle θ is at the position u expressed by the following Equation (9) on the positive side of the frequency.

[Equation 9]

$$u = \frac{\delta\beta}{\pi} = \frac{1}{\pi}(\delta_0 + t\tan\theta)\beta \quad (9)$$

When the size of the image sensor 103 is S, and the pixel numbers of the image sensor 103 in the x direction and the y direction are both N, the spatial frequency spectrum of the discrete image by Fast Fourier Transform (FFT) is obtained in the range of −N/(2S) to +N/(2S).

From this, when it is considered that the incident angle on the positive side and the incident angle on the negative side are equally received, it is appropriate that the spectrum peak position of moiré fringes on the vertical incident plane wave (θ=0) is the center position between the position of the origin point (DC: direct current component) and, for example, the frequency position at the end of the positive side, i.e., the spatial frequency position expressed by the following Equation (10).

[Equation 10]

$$\frac{\delta_0\beta}{\pi} = \frac{N}{4S} \quad (10)$$

Therefore, it is appropriate that a relative shift in the center positions of the two gratings is δ0 expressed by the following Equation (11).

[Equation 11]

$$\delta_0 = \frac{\pi N}{4\beta S} \quad (11)$$

FIG. 5B to FIG. 5D explain the creation of moiré fringes and the frequency spectrum in the case where the front surface side grating pattern 104 and the back surface side grating pattern 105 are shifted and disposed. Similarly to FIG. 4B to FIG. 4D, the left side shows a layout diagram of the light beam and the modulator 102a, the center column shows moiré fringes, and the right side shows the spatial frequency spectrum. FIG. 5B is in the case where a light beam vertically enters, FIG. 5C is in the case where a light beam enters at an angle θ from the left side, and FIG. 5D is the case where a light beam enters at an angle θ from the right side.

The front surface side grating pattern 104 and the back surface side grating pattern 105 are disposed being shifted at δ0 beforehand. Therefore, also in FIG. 5B, moiré fringes are produced, and the peak appears in the spatial frequency spectrum. As described above, the shift amount δ0 is set such that the peak position appears at the center of the spectrum range on one side from the origin point. At this time, FIG. 5C shows the direction in which the shift δ further increases, and FIG. 5D shows the direction in which the shift δ decreases. Therefore, unlike FIG. 4C and FIG. 4D, the difference between FIG. 5C and FIG. 5D can be discriminated from the peak position of the spectrum. The spectral image of this peak is a bright spot indicating an infinite ray bundle, and is nothing more or less than a photographed image by the imaging device 101a.

When the maximum angle of the incident angle of receivable collimated light is θmax, the spectrum peak position of the moiré fringes is $\mu_{max}$ expressed by the following Equation (12),

[Equation 12]

$$u_{max} = \frac{1}{\pi}(\delta_0 + t\tan\theta_{max})\beta = \frac{N}{2S} \quad (12)$$

The receivable maximum angle of view $\tan\theta_{max}$ at the imaging device 101a is given by the following Equation (13).

[Equation 13]

$$\tan\theta_{max} = \frac{\pi N}{4t\beta S} \quad (13)$$

On the analogy of image formation using a typical lens, it is considered that the collimated light at the angle of view θmax is received being focused at the end of the image sensor, it can be considered that the effective focal length $f_{eff}$ of the imaging device 101a without including any lens corresponds to the following Equation (14).

[Equation 14]

$$f_{eff} = \frac{S}{2\tan\theta_{max}} = \frac{2t\beta S^2}{\pi N} \quad (14)$$

Here, it is revealed from the Equation (13) that the angle of view is changeable by the thickness t of the modulator 102a and the coefficient β of the front surface side grating pattern 104 and back surface side grating pattern 105. Therefore, for example, as long as the modulator 102a has the configuration in FIG. 1C with the function capable of changing the length of the support member 112b, the angle of view may be changed for imaging at the time of imaging.

Note that as expressed by the Equation (2), it is assumed that the transmittance distribution of the grating pattern basically has the sine wave properties. However, such a component only has to be provided as the basic frequency component of the grating pattern. For example, as the front surface side grating pattern 104 and the back surface side grating pattern 105 as illustrated in FIG. 2A, the transmittance of the grating pattern may be binarized.

Furthermore, as the grating pattern 104b illustrated in FIG. 2B, the duty may be changed between a grating region of high transmittance and a grating region of low transmittance, to increase the width of the region of high transmittance to improve the transmittance. Thus, an effect such as suppressing diffraction from the grating pattern is also obtained, and the degradation in the photographed image can be reduced.

Still further, as the grating pattern 104c illustrated in FIG. 2C, the grating pattern may be formed with a plurality of straight line such that each distance between the plurality of straight lines becomes narrower inversely proportional to the reference coordinates.

In the description above, the incident light beam enters at one incident angle at the same time in any case. However, in order that the imaging device 101a actually acts as a camera, it is necessary to assume the case where light beams at a plurality of incident angles enter at the same time. Such light beams at a plurality of incident angles already overlap a plurality of images on the front-side grating by the time the light beams enter the grating pattern on the back surface side grating pattern 105.

In the case where the light beams mutually produce moiré fringes, there is a concern that the moiré fringes become noise that inhibits detection of moiré fringes with the back surface side grating pattern 105 that is a signal component. However, actually, an overlap of images of the front surface side grating pattern 104 produces no peak in the moiré image, and the peak is produced only in an overlap with the back surface side grating pattern 105. The reason will be described below.

First, a huge difference is that an overlap of the shadows of the front surface side grating pattern 104 due to the light beams at a plurality of incident angles is not a product but a sum. In an overlap of the shadow of the front surface side grating pattern 104 due to a light beam at one incident angle and the back surface side grating pattern 105, the light intensity distribution that is the shadow of the front surface side grating pattern 104 is multiplied by the transmittance of the second grating pattern 105 so as to obtain the light intensity distribution after the back surface side grating pattern 105 is transmitted.

Whereas since an overlap of the shadows due to a plurality of light beams at different angles incident to the front surface side grating pattern 104 is an overlap of light beams, the overlap becomes not a product but a sum. In the case of the sum, as shown in the following Equation (15), the distribution is the distribution resulting from the distribution of the original grating on the Fresnel zone plate multiplied by the distribution of moiré fringes.

[Equation 15]

$$I(x, y) + I(x+\delta, y) = \\ \frac{1}{2}[1 + \cos\beta(x^2 + y^2)] + \frac{1}{2}[1 + \cos\beta((x+\delta)^2 + y^2)] = \\ 1 + \cos[\beta(r^2 + \delta x)]\cos\delta\beta x \quad (15)$$

Accordingly, the frequency spectrum is expressed by an overlap integral of the frequency spectra. Thus, even though the spectrum of moiré alone has a sharp peak, actually, a ghost of the frequency spectrum of the Fresnel zone plate is merely produced at the position. In other words, no sharp peak is produced in the spectrum.

Therefore, even though the light beams at a plurality of incident angles are included, the spectrum of the detected moiré image always includes only moiré of a product of the front surface side grating pattern 104 and the back surface side grating pattern 105. Since the back surface side grating pattern 105 is single, the peak of the detected spectrum is single to one incident angle.

Figure 6A:
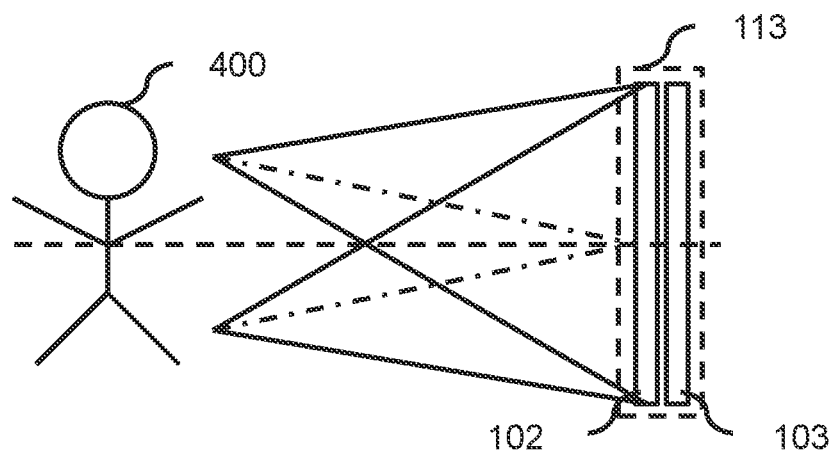
FIG. 6A explains angles formed of light beams from points forming an object to a sensor, and FIG. 6B explains a spatial frequency spectrum in the case where an image of an object is captured.

Here, the correspondence of the collimated light to be detected, described so far and light from the actual object will be schematically described with reference to FIG. 6A. FIG. 6A explains angles formed by the light from the points forming the object with respect to the image sensor 103.

The light from the points of the subject 400 enters, as strictly a spherical wave from a point light source, the modulator 102a and the image sensor 103 of the imaging device 101a (Hereinafter, referred to as a grating sensor integrated substrate 113 in FIG. 6A). At this time, in the case where the grating sensor integrated substrate 113 is small enough to the subject 400 or in the case where the grating sensor integrated substrate 113 is far enough to the subject 400, the incident angle of the light applied from the points to the grating sensor integrated substrate 113 is regarded as the same.

From the relationship in which the spatial frequency displacement $\Delta\mu$ of moiré to the micro angle displacement $\Delta\theta$ derived from the Equation (9) is equal to or less than 1/S that is the minimum resolution of the spatial frequency of the image sensor, the condition under which $\Delta\theta$ is regarded as the collimated light is expressed by the following Equation (16).

[Equation 16]

$$\begin{cases} \Delta u = \frac{1}{\pi}\beta t\Delta\theta \leq \frac{1}{S} \\ \Delta\theta \leq \frac{\pi}{S\beta t} \end{cases} \quad (16)$$

Figure 6B:
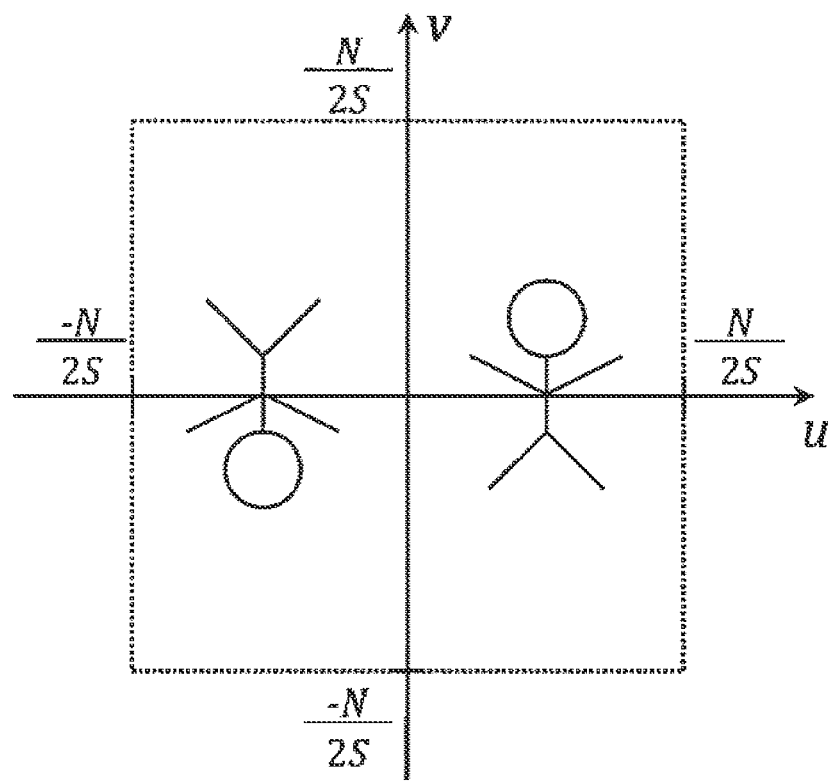

Under this condition, imaging can be performed to the infinite object by the imaging device 101a, and as described above, an image as illustrated in FIG. 6B can be obtained by Fast Fourier Transform (FFT).

[Imaging Principle of Finite Distance Object]

Figure 7A:
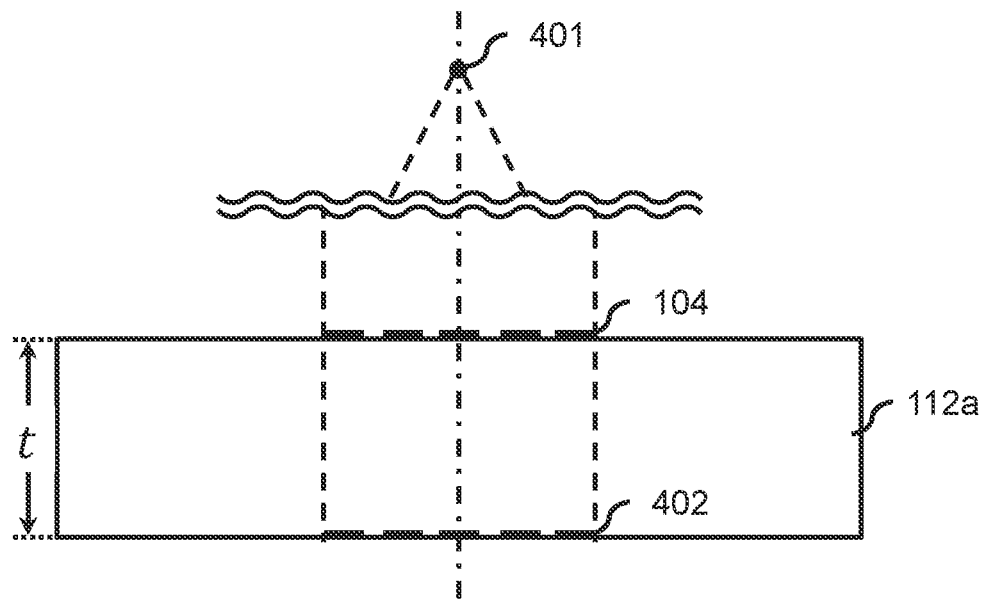
FIG. 7A explains that a front-side grating pattern is projected in the case where an object is at an infinite distance, and FIG. 7B explains an example of moiré fringes created in the case where the object is at an infinite distance.

FIG. 7A illustrates, in the case of infinity described so far, a manner of the projection onto the front surface side grating pattern 104 on the front surface side.

Figure 7B:
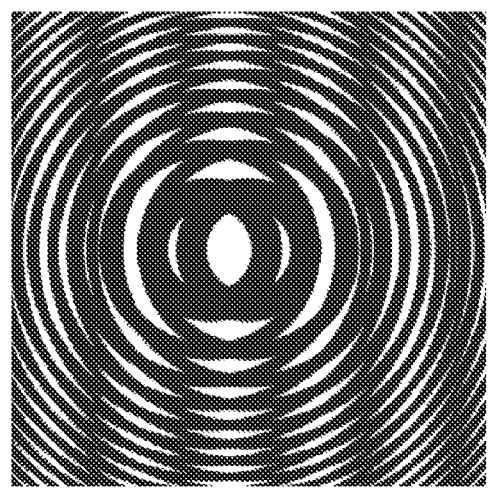

In the case where the spherical wave from a point 401 of the infinite object becomes a plane wave while propagating through a sufficiently long distance, the wave is applied to the front surface side grating pattern 104, and its projection image 402 is projected onto the surface below, the projection image is in almost the same shape as the shape of the front surface side grating pattern 104. As a result, the projection image 402 is multiplied by the transmittance distribution of the back surface side grating pattern 105 so as to obtain linear moiré fringes at regular intervals as illustrated in FIG. 7B.

Figure 8A:
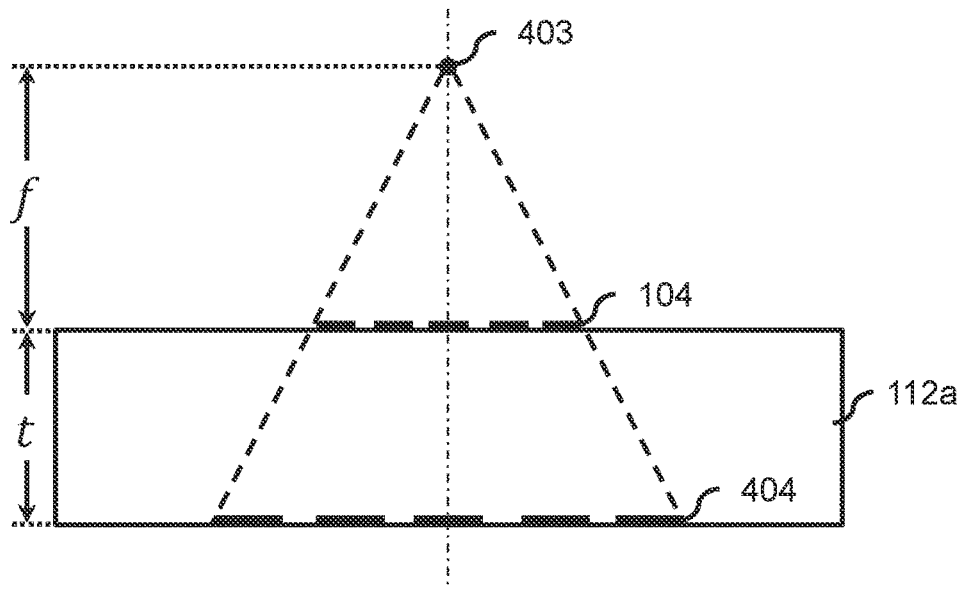
FIG. 8A explains that a front-side grating pattern is enlarged in the case where an object is at a finite distance, FIG. 8B explains an example of moiré fringes created in the case where the object is at a finite distance, and FIG. 8C explains an example of moiré fringes in which a back-side grating pattern is corrected in the case where the object is at a finite distance.

Next, imaging of an object at a finite distance will be described. FIG. 8A explains that in the case where an object to be imaged is at a finite distance, the projection onto the back surface of the front surface side grating pattern 104 is more enlarged than the front surface side grating pattern 104.

As illustrated in FIG. 8A, in the case where a spherical wave from a point 403 of an object is applied to the front surface side grating pattern 104 on the front surface side and its projection image 404 is projected onto the surface below, the projection image is almost uniformly enlarged. Note that this magnification a can be calculated with the following Equation (17) using a distance f from the front surface side grating pattern 104 to the point 403.

[Equation 17]

$$\alpha = \frac{f+t}{f} \quad (17)$$

Figure 8B:
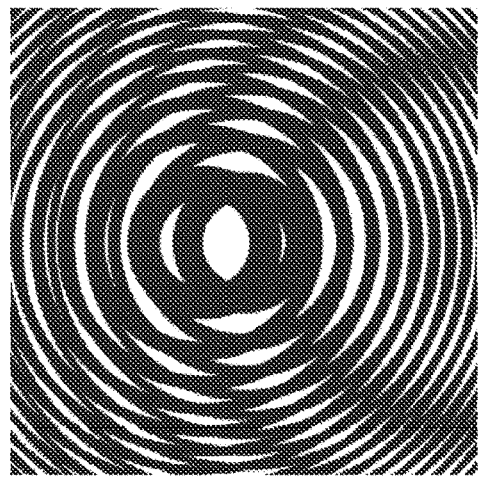
Figure 8C:
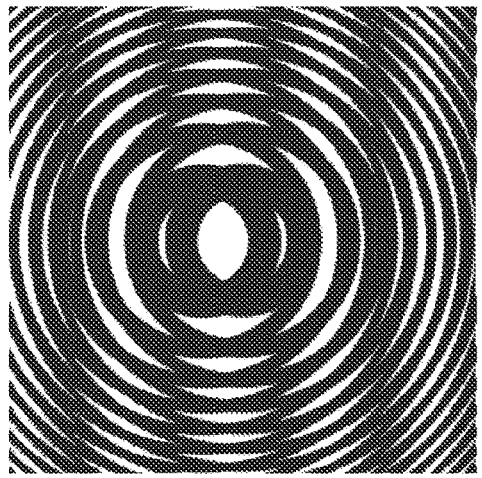

Accordingly, when the transmittance distribution of the grating pattern on the back surface side designed for the collimated light is multiplied as it is, as illustrated in FIG. 8B, no linear moiré fringe at regular intervals is produced.

However, when the back surface side grating pattern 105 is enlarged in accordance with the uniformly enlarged shadow of the front surface side grating pattern 104, as shown in FIG. 10C, linear moiré fringes at regular intervals can be produced again on the enlarged projection image 404. Therefore, the coefficient β of the back surface side grating pattern 105 is set to S/a so as to realize correction.

Thus, the light from the point 403 at a distance, which is not always at infinite, can be selectively regenerated, thereby making it possible to perform imaging with focus being achieved at a given position.

[Second Imaging Device]

Next, a second imaging device (hereinafter, simply referred to as an imaging device 101b) including a simply configured modulator 102a will be described.

In the case of the modulator 102a of the imaging device 101a, the front surface side grating pattern 104 and the back surface side grating pattern 105, which have the same shape, are displaced from each other and formed on the front surface and the back surface of the grating substrate 112a, respectively, so that the imaging device 101a detects an angle of incident collimated light from a spatial frequency spectrum of moiré fringes to develop an image.

Here, the back surface side grating pattern 105 is an optical element in close contact with the image sensor 103, and provided for modulating the intensity of incident light, and is the same grating pattern regardless of the incident light. Accordingly, the imaging device 101b uses a modulator 102b in which the back surface side grating pattern 105 is not provided, and causes the image processing unit to perform the processing corresponding to the back surface side grating pattern 105.

Figure 9A:
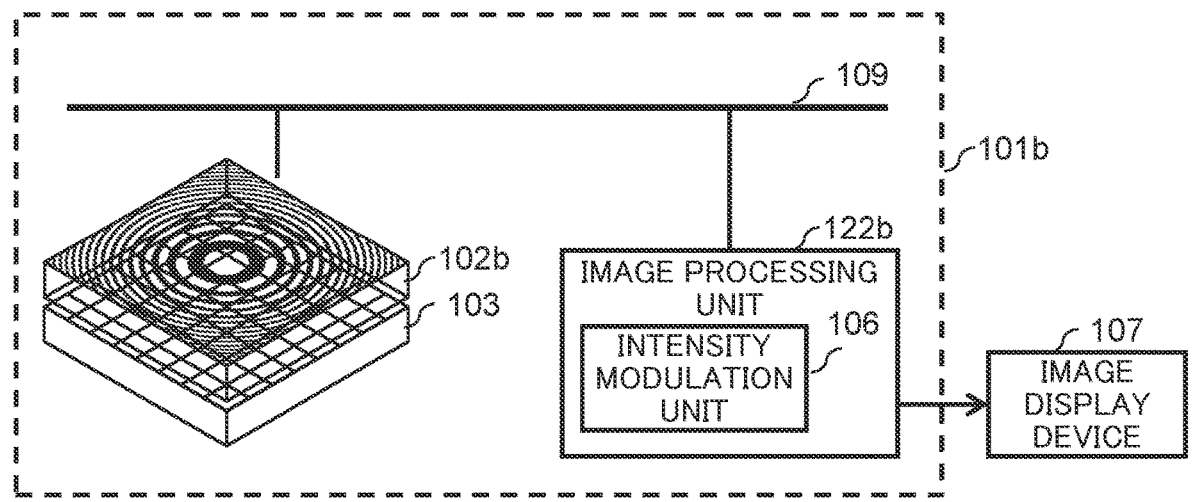
FIG. 9A is a block diagram of an imaging device that implements a back-side grating pattern with the image processing according to the embodiment of the present invention, and FIG. 9B explains the modulator of the imaging device that implements the back-side grating pattern with the image processing.

FIG. 9A illustrates a configuration of the imaging device 101b. As illustrated in FIG. 9A, the imaging device 101b includes the modulator 102b and an image processing unit 122b. The image processing unit 122b includes an intensity modulation unit 106. The image sensor 103 and the image processing unit 122b are connected to each other by a bus 109.

The modulator 102b is a modulator obtained by removing the back surface side grating pattern 105 from the modulator 102a.

Figure 9B:
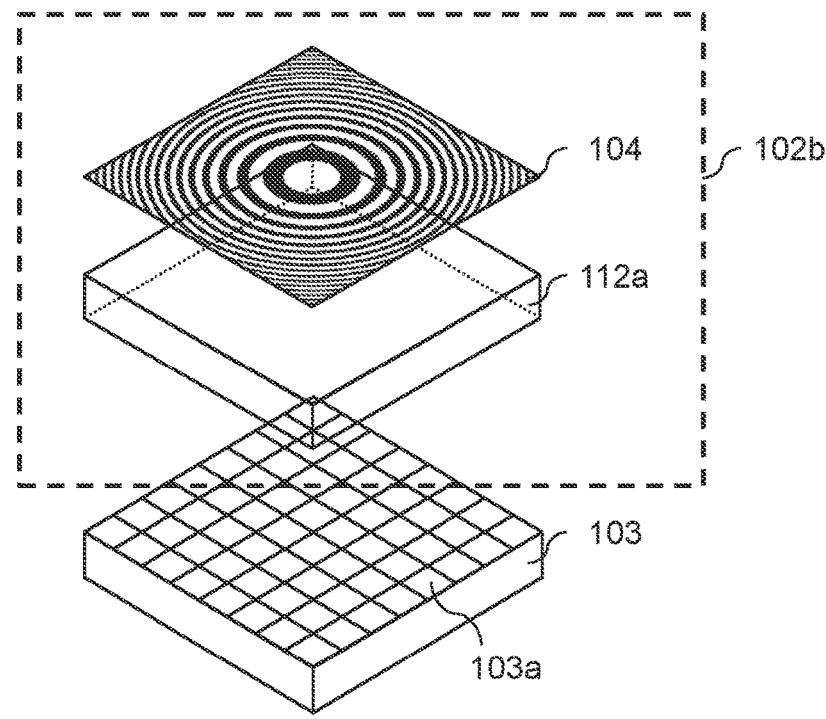

The intensity modulation unit 106 is configured to perform the processing corresponding to the back surface side grating pattern 105.s FIG. 9B illustrates the details of the configuration of the modulator 102b. The modulator 102b includes a front surface side grating pattern formed on the grating substrate 112a. The modulator 102b does not include the back surface side grating pattern 105 which is provided in the modulator 102a. The modulator 102b is configured as above, and thus the number of grating patterns to be formed on the grating substrate 112a can be reduced by one surface. As a result, it is possible to reduce the manufacturing cost of the modulator 102b as well as improve the light use efficiency.

Here, a flow of the image processing performed by the image processing unit 122b will be described. FIG. 10 illustrates a processing flow of an outline of the image processing performed by the image processing unit 122b. The image processing performed by the image processing unit 122b differs from the image processing performed by the image processing unit 122a in the process of step S511.

Also in the present image processing, the image processing unit 122b executes the following processes every time receiving sensor signals from the image sensor 103. The sensor signals received from the image sensor 103 are the ones which have not passed through the back surface side grating pattern, unlike the case of the image processing unit 122a.

The image processing unit 122b performs the sensor signal processing on the sensor signals acquired from the image sensor 103 (step S500).

Next, the intensity modulation unit 106 performs back surface grating intensity modulation processing on the moiré fringe images of each RGB component, respectively (step S511). The back surface grating intensity modulation processing is processing for generating moiré fringe images corresponding to those transmitted through the back surface side grating pattern 105.

Specifically, the intensity modulation unit 106 performs calculation corresponding to the Equation (5). That is, the intensity modulation unit 106 generates the back surface side grating pattern 105, and multiplies the sensor signals after the sensor signal processing by the generated back surface side grating pattern 105.

In the case of assuming use of a binarized pattern as the back surface side grating pattern 105, the intensity modulation unit 106 may set values of the sensor signals at an area of the image sensor 103 corresponding to black after the sensor signal processing to be 0. In this case, it is possible to suppress the scale of the multiplication circuit.

Note that the back surface grating intensity modulation processing may be performed prior to the sensor signal processing.

The processes in step S501 to step S507 in FIG. 10 are the same as the processes of steps having the same reference signs in FIG. 3, and thus, the explanation therefor will be omitted herein.

In the case of the imaging device 101b, the intensity modulation unit 106 implements the processing corresponding to the back surface side grating pattern 105. However, since the back surface side grating pattern 105 is an optical element in close contact with the image sensor 103 and provided for modulating the intensity of incident light, the processing corresponding to the back surface side grating pattern 105 can be implemented by setting the sensitivity of the image sensor 103 practically in consideration of the transmittance of the back surface side grating pattern 105.

[Third Imaging Device]

According to the imaging device 101b configured to cause the image processing unit 122b to perform the processing corresponding to the back surface side grating pattern 105, it is capable of focusing to an arbitrary distance after photographing an image.

Figure 11:
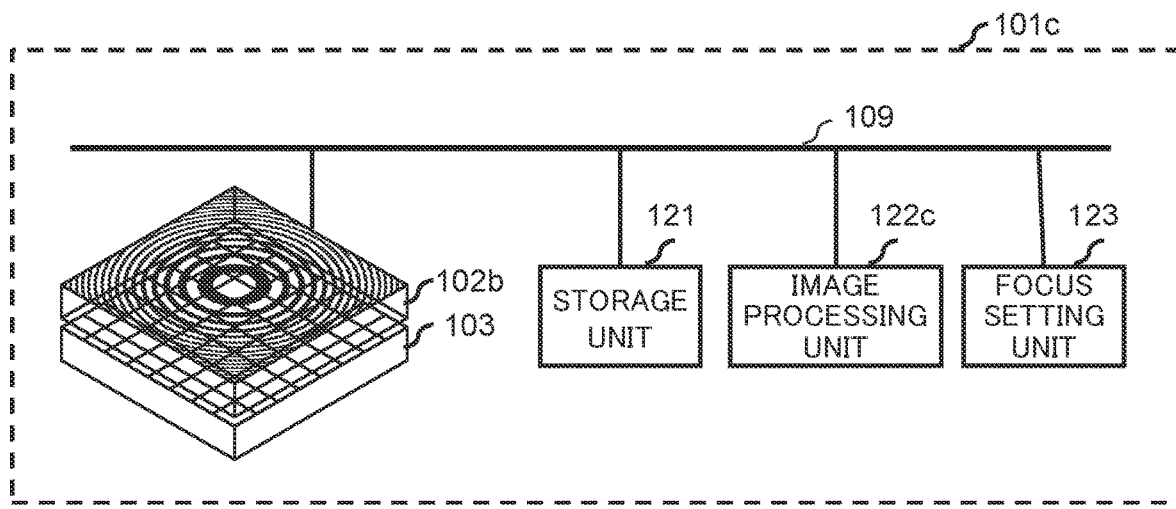
FIG. 11 is a block diagram of a re-focusable imaging device according to the embodiment of the present invention.

FIG. 11 illustrates a configuration of a third imaging device (hereinafter, simply referred to as an imaging device 101c) that implements the focusing mentioned above. As illustrated in FIG. 11, the imaging device 101c includes the image sensor 103, the modulator 102b, a storage unit 121, an image processing unit 122c, and a focus setting unit 123. These components are connected to each other, for example, by the bus 109.

The image sensor 103 and the modulator 102b have the same configurations as those of the imaging device 101b, respectively.

The storage unit 121 is configured to temporarily store sensor signals of each light receiving element output from the image sensor 103, for example, to enable focus adjustment after photographing an image. Within the entire image sensor 103, a set of sensor signals of each light receiving element, that is, a set of sensor signals for one frame, is referred to as a sensor image. For each light receiving element, the sensor image includes information indicating its position and values of the sensor signals.

The focus setting unit 123 is configured to output focus-distance information (known distance information for adjusting arbitrary distance focus) to the image processing unit 122c. The focus setting unit 123 receives the focus-distance information from the user via a setting device such as a knob provided in the imaging device 101c, a GUI (Graphical User Interface), or the like.

The image processing unit 122c is configured to perform substantially the same processing as the processing performed by the image processing unit 122b, although the image processing unit 122c further performs back surface grating pitch determination processing for determining a pitch of the back surface grating by using the focus-distance information which has been set via the focus setting unit 123.

The back surface grating pitch determination processing is performed by calculating a magnification factor α with the Equation (17) using, as f, the focus-distance information that is the output of the focus setting unit 123 to obtain a value (β/α) by dividing a coefficient β of the back surface side grating pattern 105 by the calculated magnification factor α.

Figure 12:
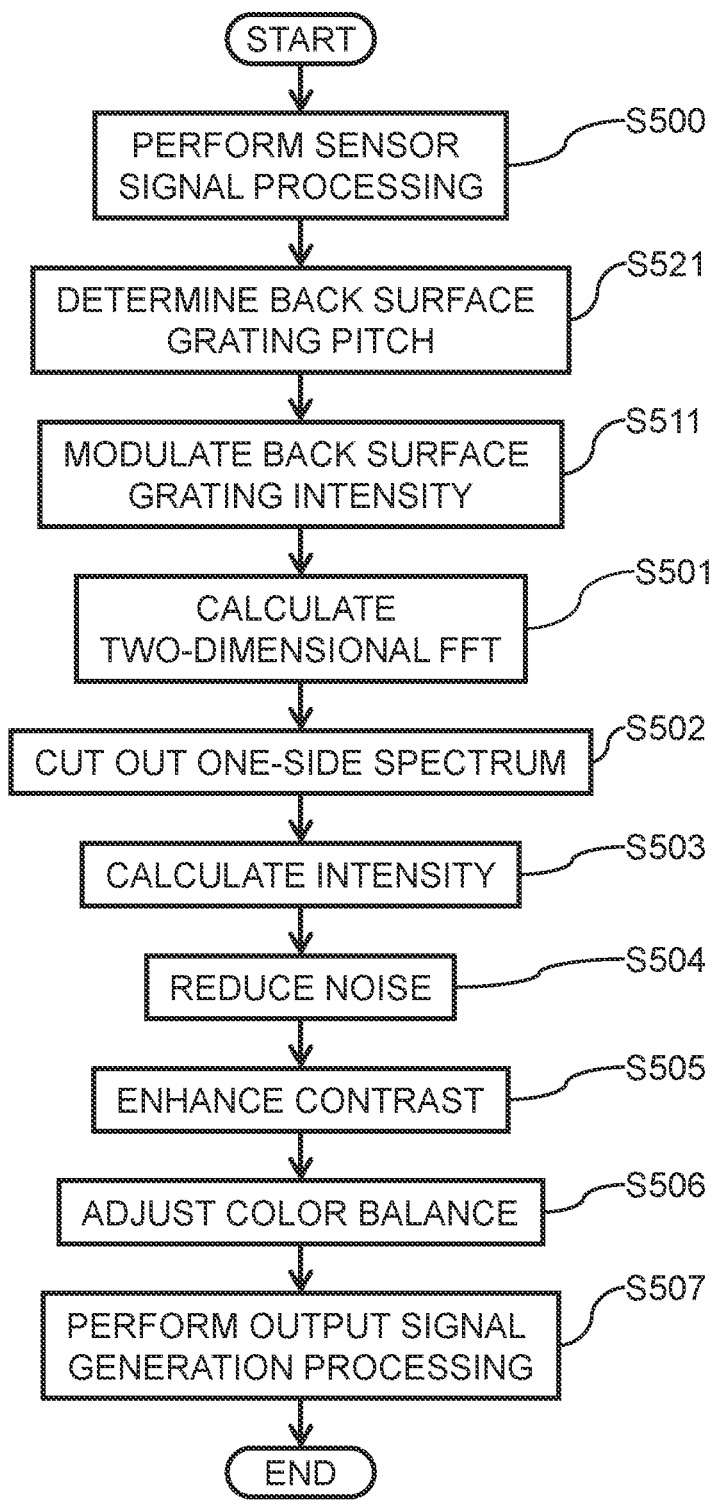
FIG. 12 is a flowchart of the image processing performed by the image processing unit of a re-focusable imaging device according to the embodiment of the present invention.

In the following, a flow of the image processing performed by the image processing unit 122c will be described. FIG. 12 illustrates a processing flow of an outline of the image processing performed by the image processing unit 122c. The image processing performed by the image processing unit 122c differs from the image processing performed by the image processing unit 122b in the process of step S521.

In this image processing, the image processing unit 122c executes the following processes every time the sensor signals are stored in the storage unit 121 by the image sensor 103. The sensor signals stored in the storage unit 121 by the image sensor 103 are the ones which have not passed through the back surface side grating pattern, unlike the case of the imaging device 101a.

The image processing unit 122c performs the sensor signal processing on the newest sensor signals stored in the storage unit 121 by the image sensor 103 (step S500).

Next, the image processing unit 122c uses the focus-distance information to perform the back surface grating pitch determination processing (step S521).

Thereafter, the image processing unit 122c performs the back surface grating intensity modulation processing on the moiré fringe images of each RGB component, respectively (step S511). This processing is the same as the back surface grating intensity modulation processing performed by the intensity modulation unit 106 of the image processing unit 122b.

The processes in step S501 to step S506 in FIG. 12 are the same as the processes of the steps having the same reference signs in FIG. 3, and thus the explanation therefor will be omitted herein.

As described above, according to the imaging device 101c, it is possible to obtain an image of an object in the surroundings by simple calculation using such as a Fast Fourier Transform (FFT), and moreover, adjust the focus to an arbitrary distance after photographing the image. A conventional camera needs to photograph an image again in order to change the focus, on the other hand, the imaging device 101c needs only one-time photographing.

[Fourth Imaging Device and Fifth Imaging Device]

The imaging devices 101a to 101c are configured to perform such as the image development processing based on the sensor signals with the Equation (6) obtained by extracting only components having sharp peaks from the Equation (5) to obtain a photographed image. In practice, however, the terms other than the fourth term in the Equation (5) are noise. In the following, a fourth imaging device configured to remove the noise will be described.

The fourth imaging device (hereinafter, simply referred to as a fourth imaging device 101d) is configured to cancel the noise by fringe scanning.

Firstly, the principle of noise cancellation by fringe scanning will be described. In an intensity distribution of interference fringes of the Equation (2), where an initial phase of the front surface side grating pattern 104 is $\Phi_F$ and an initial phase of the back surface side grating pattern 105 is $\Phi_B$, the Equation (5) can be expressed as the following Equation (18).

[Equation 18]

$$I(x, y)I(x+\delta, y) = \frac{1}{4}\{1 + \cos[\beta(x^2 + y^2) + \Phi_B]\}\{1 + \cos[\beta((x+\delta)^2 + y^2) + \Phi_F]\} \quad (18)$$

Here, by using the orthogonality of a trigonometric function, the Equation (18) is integrated for the initial phases $\Phi_F$, $\Phi_B$ so as to cancel the noise terms while leaving the term of a constant multiple of a single frequency term as expressed in the Equation (19).

[Equation 19]

$$\int\int_0^{2\pi} I(x,y)I(x+\delta,y)\cdot\cos(\Phi_B-\Phi_F)\cdot d\Phi_B d\Phi_F = \frac{\pi^2}{4}\cos(2\beta x+\beta\delta^2) \quad (19)$$

As described above, performing Fourier transform of this result can produce a noise-free sharp peak in the spatial frequency distribution.

Here, although the Equation (19) is expressed in the form of integration, the same effect can be obtained by setting the initial phases $\Phi_F$, $\Phi_B$ to a plurality of different values between 0 and $2\pi$, and calculating the sum of the intensity distributions obtained at the respective initial phases.

For example, the initial phases $\Phi_F$, $\Phi_B$ may be set by equally dividing the angle between 0 and $2\pi$. Specifically, as the initial phases $\Phi_F$, $\Phi_B$, the values $\{0, \pi/2, \pi, \text{ and } 3\pi/2\}$ obtained by dividing the angle between 0 to $2\pi$ into four equal parts may be set, respectively, or the values $\{0, \pi/3, \text{ and } 2\pi/3\}$ obtained by dividing the angle between 0 to $2\pi$ into three equal parts may be set.

The Equation (19) can be further simplified. In the Equation (19), the initial phases $\Phi_F$, $\Phi_B$ are independently changeable. However, equalizing both the initial phases $\Phi_F$, $\Phi_B$ ($\Phi_F=\Phi_B$), that is, applying the same phases to the initial phases of the front surface side grating pattern 104 and back surface side grating pattern 105 causes cancellation of the noise terms.

The Equation (20) below expresses the integration result where $\Phi_F=\Phi_B=\Phi$ in the Equation (19).

[Equation 20]

$$\int_0^{2\pi} I(x,y)I(x+\delta,y)d\Phi = \frac{\pi}{4}[2+\cos(2\beta\delta x+\beta\delta^2)] \quad (20)$$

By setting $\Phi_F=\Phi_B=\Phi$, as expressed in the Equation (20), the noise terms are canceled while a term of a constant multiple of a single frequency is left. In this case, $\Phi$ may be set to the ones obtained by equal division of the angle between 0 and $2\pi$. For example, $\Phi$ may be set to 0 and $\{\pi/2, \pi, 3\pi/2\}$, which are formed by 0 and the angles obtained by dividing the angle between 0 to $2\pi$ into four equal parts, respectively.

Furthermore, cancellation of the noise terms can be simplified by, even without equally dividing the angle, setting, as $\Phi$, $\{0, \pi/2\}$ which are two phases orthogonal to each other.

In the case where, as in the same manner as the imaging device 101b, the image processing unit 122b includes the intensity modulation unit 106 instead of the back surface side grating pattern 105 and performs the calculation corresponding the back surface side grating pattern 105, a negative value can be used as the back surface side grating pattern 105.

The Equation (18) in this case can be expressed by the following Equation (21) ($\Phi_F=\Phi_B=\Phi$).

[Equation 21]

$$I(x,y)I(x+\delta,y) = \quad (21)$$
$$\frac{1}{4}\cos[\beta(x^2+y^2)+\Phi]\{1+\cos[\beta((x+\delta)^2+y^2)+\Phi]\}$$

Here, since the back surface side grating pattern 105 is known, the back surface side grating pattern 105 is subtracted from the Equation (21) and the case of $\Phi=\{0, \pi/2\}$ is added therein so as to, as expressed in the Equation (22), cancel the noise terms while leaving the term of a constant multiple of a single frequency.

[Equation 22]

$$[I(x,y)I(x+\delta,y)-I(x,y)]_{\Phi=0}+[I(x,y)I(x+\delta,y)-I(x,y)]_{\Phi=\frac{\pi}{2}} = \quad (22)$$
$$\frac{1}{4}\cos(2\beta\delta x+\beta\delta^2)$$

In the case of the imaging devices 101a to 101c, the front surface side grating pattern 104 and the back surface side grating pattern 105 are displaced by $\delta_0$ in advance as described above, thereby separating two photographed images generated in the spatial frequency space. However, this method reduces the number of pixels of the photographed images by half. In the following, a method of avoiding overlap in the photographed images without displacing the front surface side grating pattern 104 and the back surface side grating pattern 105 by $\delta_0$ as described above will be explained.

The fringe scanning of the Equation (19) is calculated on a complex plane by using exp instead of cos as expressed in the Equation (23) below.

[Equation 23]

$$\int\int_0^{2\pi} I(x,y)I(x+\delta,y)\cdot e^{i(\Phi_B-\Phi_F)}d\Phi_B d\Phi_F = \frac{\pi^2}{4}e^{i(2\beta\delta x+\beta\delta^2)} \quad (23)$$

This calculation causes cancellation of the noise terms while leaving a term of a constant multiple of a single frequency. The following Equation (24) expresses Fourier transform of exp $(2i\beta\delta x)$ in the Equation (23).

[Equation 24]

$$\mathcal{F}[e^{i2\beta\delta x}] = \delta(u+2\delta\beta, v) \quad (24)$$

That is, it reveals that the calculation above does not produce two peaks which occur in the Equation (7), thereby making it possible to obtain a single developed image.

In this way, calculation on a complex plane does not require displacement of the front surface side grating pattern 104 and the back surface side grating pattern 105, as a result, the number of pixels can be effectively used.

An imaging device for implementing the noise cancellation based on the fringe scanning described above will be explained. The fringe scanning requires use of a plurality of grating patterns having different initial phases as at least the front surface side grating pattern 104. To this end, there are provided a method of switching the grating patterns by time division and a method of switching the grating patterns by space division. Hereinafter, the method of switching the grating patterns by time division will be referred to as time division fringe scanning, and a method of switching the grating patterns by space division will be referred to as space division fringe scanning, respectively.

[Time Division Fringe Scanning]

Figure 13A:
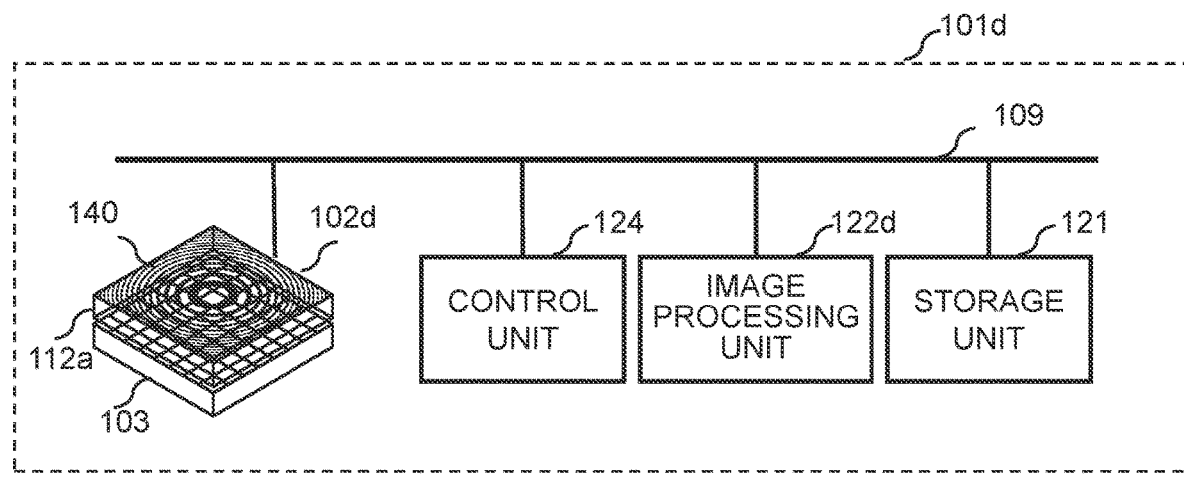
FIG. 13A illustrates a configuration of an imaging device configured to implement the time division fringe scanning according to the embodiments of the present invention, and each FIG. 13B to FIG. 13E explains an example of a grating pattern used for the time division fringe scanning according to the embodiments of the present invention.
Figure 13B:
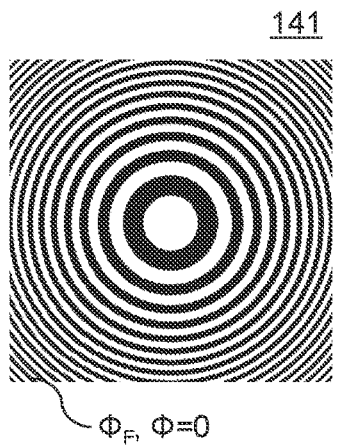
Figure 13C:
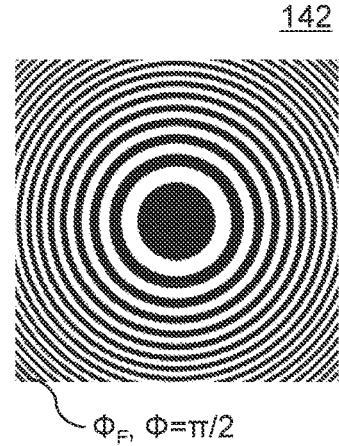
Figure 13D:
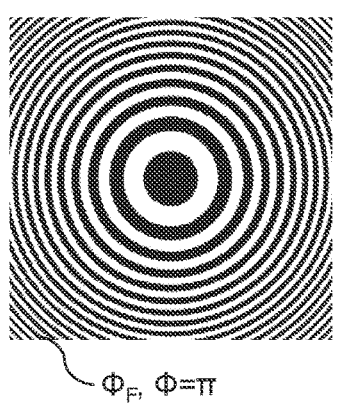
Figure 13E:
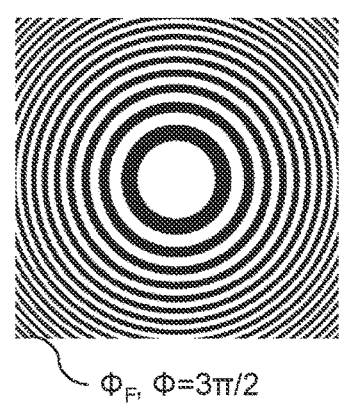
Figure 14A:
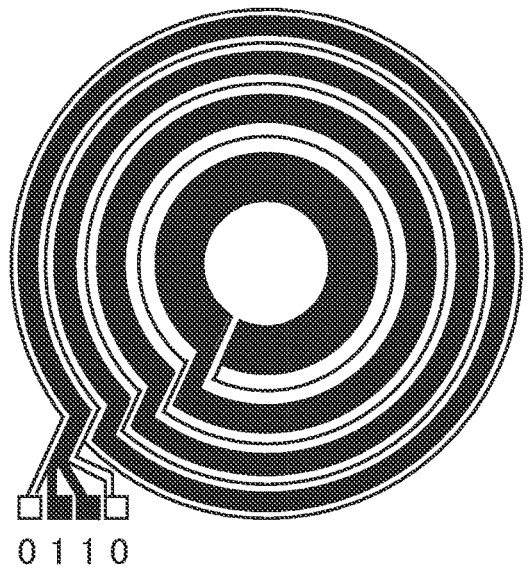
FIG. 14 Each FIG. 14A to FIG. 14D explains the electrode arrangement and applied voltage of a modulator for the time division fringe scanning according to the embodiments of the present invention.
Figure 14B:
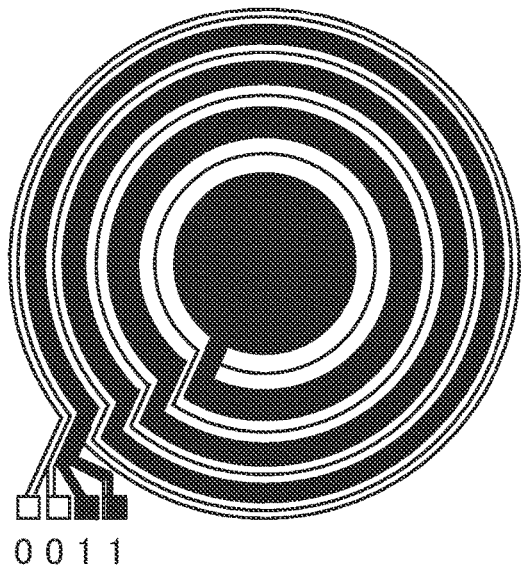
Figure 14C:
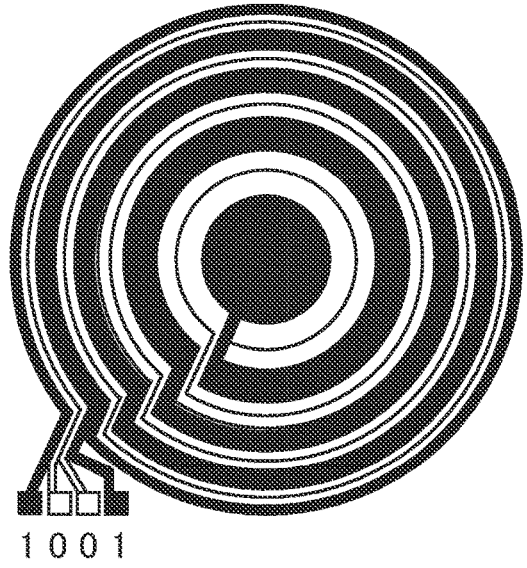
Figure 14D:
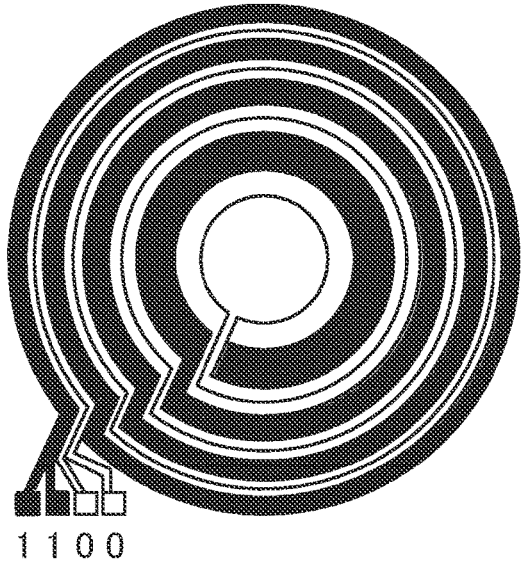

FIG. 13A illustrates a fourth imaging device (hereinafter, referred to as an imaging device 101d) configured to implement the time division fringe scanning. As illustrated in FIG. 13A, the imaging device 101d includes the image sensor 103, a modulator 102d, the storage unit 121, an image processing unit 122d, a control unit 124, and the bus 109 provided for connecting the respective units.

The modulator 102d includes the grating substrate 112a and a grating pattern display unit 140. The grating pattern display unit 140 is formed by the one which can electrically change grating patterns to be displayed, for example, a liquid crystal display element.

In the case of the imaging device 101d, for example, as illustrated in FIG. 13B to FIG. 13E, grating patterns 141, 142, 143, 144 corresponding to four different initial phases can be switched and displayed, respectively. The grating patterns 141 to 144 illustrated in FIG. 13B to FIG. 13E correspond to the cases where the initial phase $\Phi_F$ or $\Phi$ is $\{0, \pi/2, \pi, 3\pi/2\}$, respectively.

The control unit 124 is configured to control the operations of such as the image sensor 103, modulator 102d, and image processing unit 122d. In the case of the imaging device 101d, the control unit 124 controls the modulator 102d to sequentially display grating patterns corresponding to a plurality of predetermined initial phases for each driving cycle.

The image processing unit 122d is configured to, in addition to the processing performed by the image processing unit 122, perform addition of the sensor signals acquired at each grating pattern set in the modulator 102d. Details of the image processing performed by the image processing unit 122d will be described later.

The storage unit 121 is configured to temporarily store sensor signals of each light receiving element output from the image sensor 103. In the case of the imaging device 101d, the storage unit 121 further includes an addition memory area provided for addition of the sensor signals after the intensity modulation acquired in each grating pattern.

In the following, the details of the grating pattern display unit 140 of the modulator 102d will be described. As illustrated in FIG. 13B to FIG. 13E, each of the grating patterns 141 to 144 to be displayed on the grating pattern display unit 140 includes a plurality of lines. The grating pattern 142 is the one having the phase being displaced from the grating pattern 141 by $\pi/2$, the grating pattern 143 is the one having the phase being displaced from the grating pattern 141 by $\pi$, and the grating pattern 144 is the one having the phase being displaced from the grating pattern 141 by $3\pi/2$.

Each of the grating patterns 141 to 144 illustrated in FIG. 13B to FIG. 13E includes a plurality of concentric circles, and each interval (pitch) between the plurality of concentric circles becomes narrower in inverse proportion to the radius.

As described above, these grating patterns 141 to 144 are obtained by changing the voltage to be applied to the electrodes of the liquid crystal display elements forming the grating pattern display unit 140 of the modulator 102d.

Each FIG. 14A to FIG. 14D illustrates an example of the electrode arrangement and an example of the applied voltage in the grating pattern display unit 140 for implementing each of the grating patterns illustrated in FIG. 13B to FIG. 13E.

On the grating pattern display unit 140, concentric electrodes are arranged so as to divide one period of a grating pattern into four parts. From the inside, each of the electrodes is connected to every fourth electrode, and four terminal electrodes are led out from the outer peripheral portion as driving terminals. Switching the voltage to be applied to each of these four terminal electrodes between two states of "0" and "1" with time produces the four grating patterns 141 to 144. That is, the initial phase $\Phi_F$ or $\Phi$ of the grating pattern can be switched to $\{0, \pi/2, \pi, 3\pi/2\}$ as illustrated in FIG. 14A to FIG. 14D.

In FIG. 14A to FIG. 14D, the electrodes to which "1" is applied as a voltage state is illustrated in black while the electrodes to which "0" is applied as a voltage state is illustrated in white. The electrodes to which "1" is applied shields light, and the electrodes to which "0" is applied transmits light.

Figure 15:
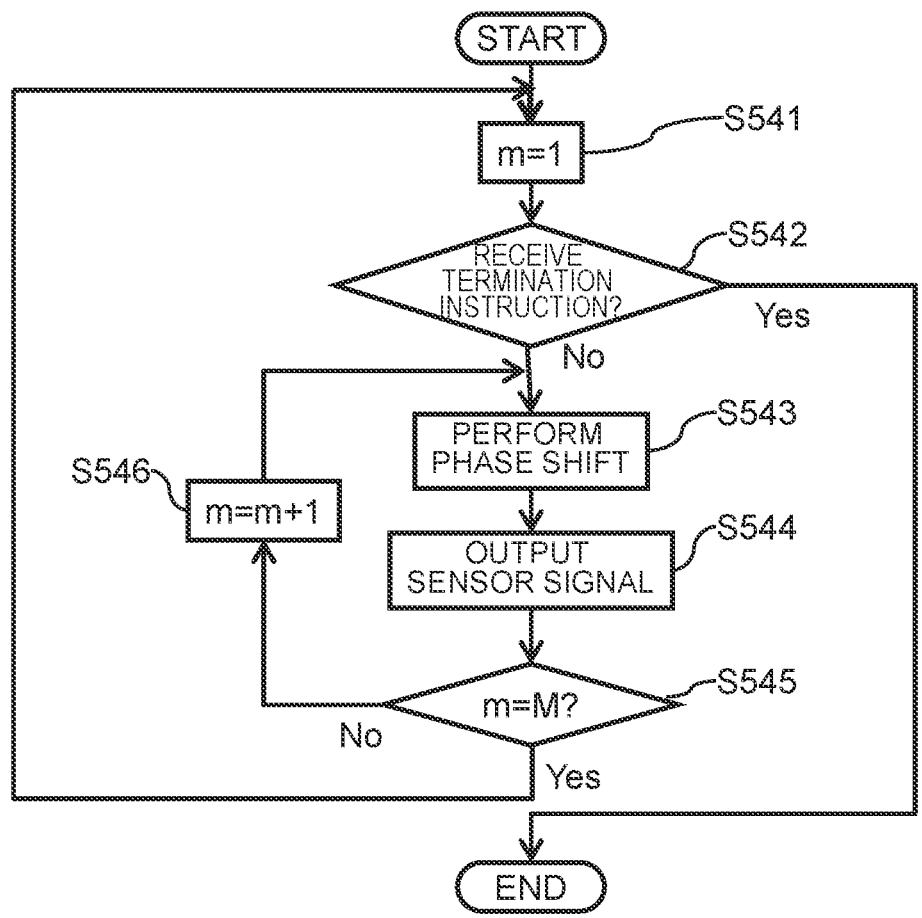
FIG. 15 is a flowchart of the grating pattern control processing performed by a control unit during execution of the time division fringe scanning according to the embodiments of the present invention.

Next, grating pattern control processing performed by the control unit 124 of the imaging device 101d will be described. FIG. 15 illustrates a processing flow of the grating pattern control processing. The control unit 124 starts this processing upon receiving an instruction to start photographing an image from the user.

The control unit 124 causes the grating pattern display unit 140 to periodically display the grating patterns corresponding to M (M is an integer of two or more) types of different initial phases in a predetermined order. The change of the displayed grating pattern is referred to as phase shift. The phase shift is performed in accordance with an instruction from the control unit 124 every time the image sensor 103 outputs sensor signals to the image processing unit 122d.

An initial value of a counter value m is 1. The value m is incremented by 1 every time the control unit 124 changes the grating pattern to be displayed on the grating pattern display unit 140 (every phase shift). The value m returns to 1 after reaching M. When the value of the counter is m, the control unit 124 causes the grating pattern display unit 140 to display the m-th grating pattern, whereby the sensor signals due to the m-th grating pattern can be acquired at this time.

Upon receiving an instruction to start imaging, firstly, the control unit 124 initializes the counter value m (m=1) (step S541).

The control unit 124 repeats the following processes until receiving a termination instruction (step S542).

Firstly, the control unit 124 causes the grating pattern display unit 140 to display the m-th grating pattern (phase shift) (step S543). Then, when detecting that the image sensor 103 outputs sensor signals to the storage unit 121 (step S544), the control unit 124 determines whether the counter value m has reached M (m=M) (step S545).

When the counter value m is less than M (step S545; No), the control unit 124 increments the counter value m by 1 (step S546), and then returns to step S543 and performs phase shift so as to cause the grating pattern display unit 140 to display the m-th grating pattern. On the other hand, when the counter value m is M (step S545; YES), the control unit 124 returns to step S541 to initialize the counter value m.

In this way, the control unit 124 can cause the grating pattern display unit 140 to sequentially display M types of patterns.

Figure 16:
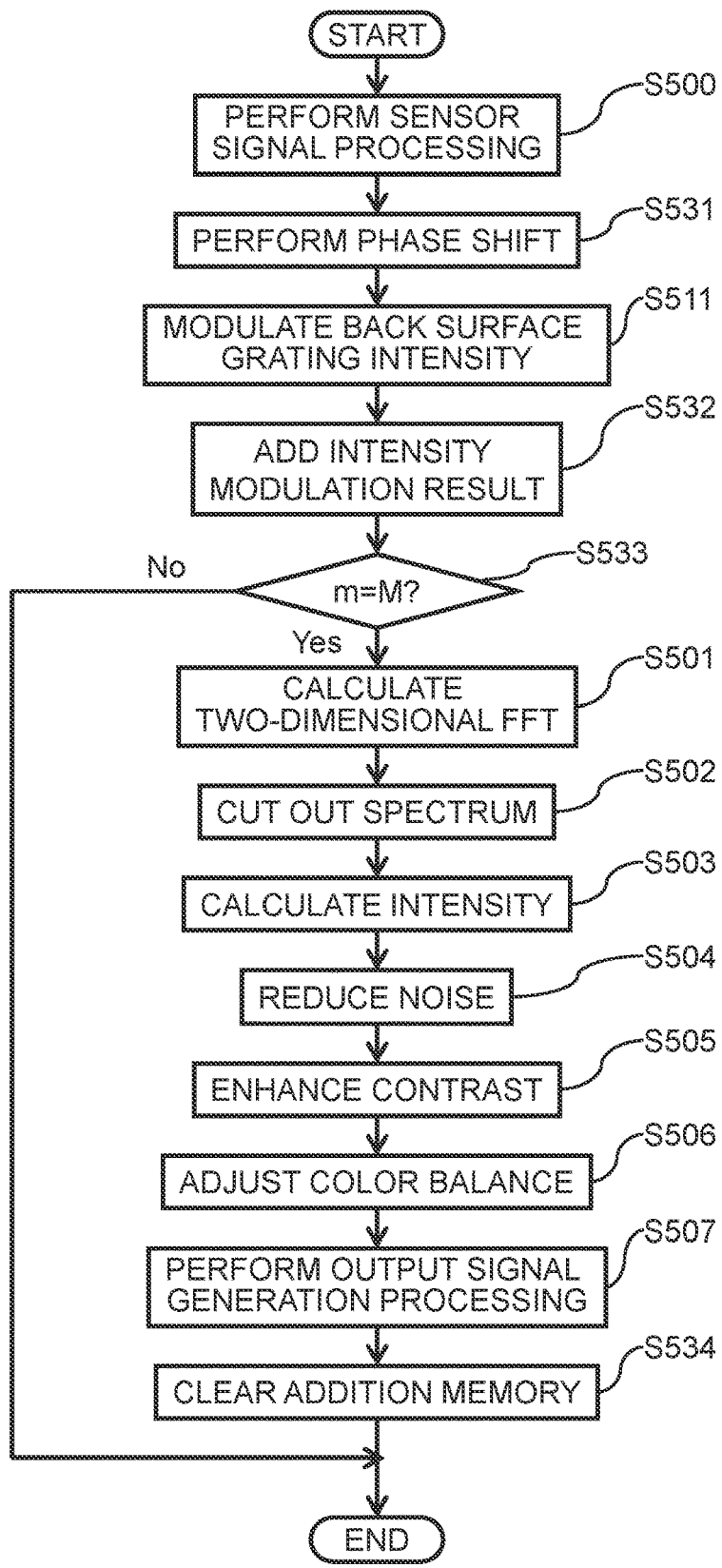
FIG. 16 is a flowchart of the image processing during execution of the time division fringe scanning according to the embodiments of the present invention.

Next, a flow of image processing performed by the image processing unit 122d of the imaging device 101d will be described. FIG. 16 illustrates a processing flow of the image processing performed by the image processing unit 122d. In this image processing as well, the image processing unit 122*d* executes the following processes every time sensor signals are stored in the storage unit 121 by the image sensor 103.

Here, an example of the above-described Equation (20), in other words, the case of the initial phase $\Phi_F=\Phi_B$ will be described. It is assumed that the control unit 124 causes the grating pattern display unit 140 to sequentially display M types of display patterns as described above. The image processing unit 122*d* also refers to the counter value m set by the control unit 124.

The image processing performed by the image processing unit 122*d* differs from the image processing performed by the image processing unit 122*b* in the processes of step S531 to step S534.

The image processing unit 122*d* performs the sensor signal processing on the latest sensor signals stored in the storage unit 121 by the image sensor 103 (step S500).

Next, since the present example assumes the Equation (20), in other words, the case of $\Phi_F=\Phi_B$, the image processing unit 122*d* performs phase shift such that the initial value of the back surface side grating pattern 105 becomes the same as that of the front surface side grating pattern 104 used for imaging (step S531), so as to produce the back surface side grating pattern 105 having the phase after the phase shift as the initial phase.

The image processing unit 122*d* performs the back surface grating intensity modulation processing on the moiré fringe images of each RGB component, respectively (step S511). Here, the image processing unit 122*d* multiplies the sensor signals after the sensor signal processing by the back surface side grating pattern 105 generated in step S531.

The image processing unit 122*d* adds the sensor signals after the back surface grating intensity modulation processing to an addition memory (step S532).

The image processing unit 122*d* determines whether the counter value m is M (step S533).

When the counter value m is M (step S533; Yes), the image processing unit 122*d* performs the processes of step S501 to step S507. These processes are the same as those of the steps having the same reference signs in FIG. 3. Meanwhile, the image processing unit 122*d* performs the two-dimensional Fourier transform calculation of step S501 on the moiré fringe images including the signals stored in the addition memory.

Thereafter, the image processing unit 122*d* clears the addition memory (step S534), and terminates the processing.

On the other hand, when the counter value m is less than M (step S533; No), the image processing unit 122*d* terminates the processing without performing any further processes. The image processing unit 122*d* starts this image processing upon receiving the sensor signals from the image sensor 103 next time.

Although the flow of the image processing described above has been explained based on the example where the Equation (20) is satisfied, it can be similarly applied to the cases of the Equation (19), the Equation (22), and the Equation (23).

[Spatial Division Fringe Scanning]

Figure 17A:
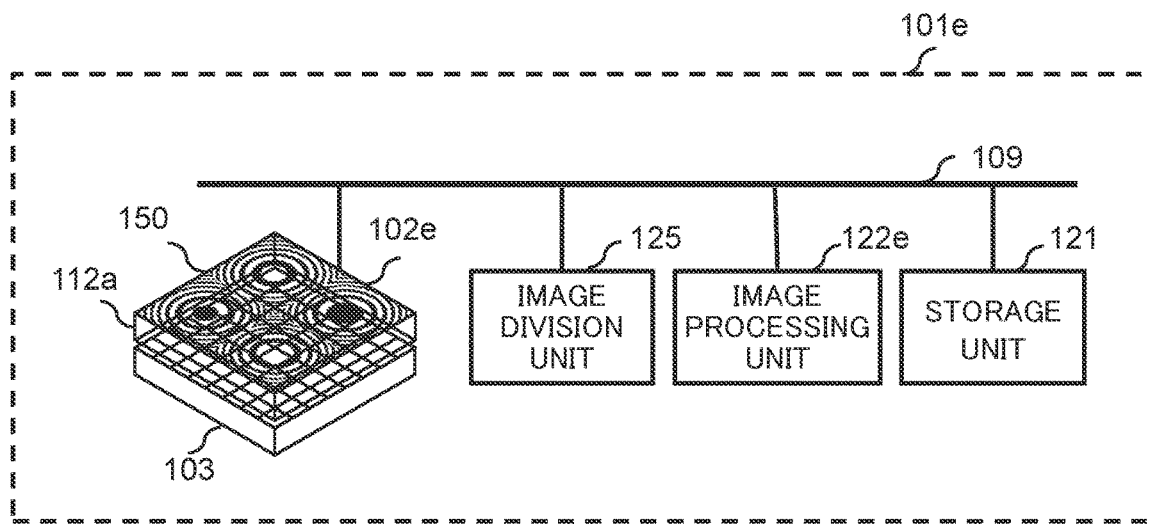
FIG. 17A illustrates a configuration of an imaging device configured to implement the time division fringe scanning according to the embodiments of the present invention, and each FIG. 17B and FIG. 17C explains an example of a grating pattern used for the time division fringe scanning according to the embodiments of the present invention.

Next, a fifth imaging device (hereinafter, referred to as an imaging device 101*e*) for implementing the spatial division fringe scanning will be described. FIG. 17A illustrates the imaging device 101*e*. As illustrated in FIG. 17A, the imaging device 101*e* includes the image sensor 103, a modulator 102*e*, the storage unit 121, an image processing unit 122*e*, an image division unit 125, and the bus 109 provided for connecting the respective units.

Figure 17B:
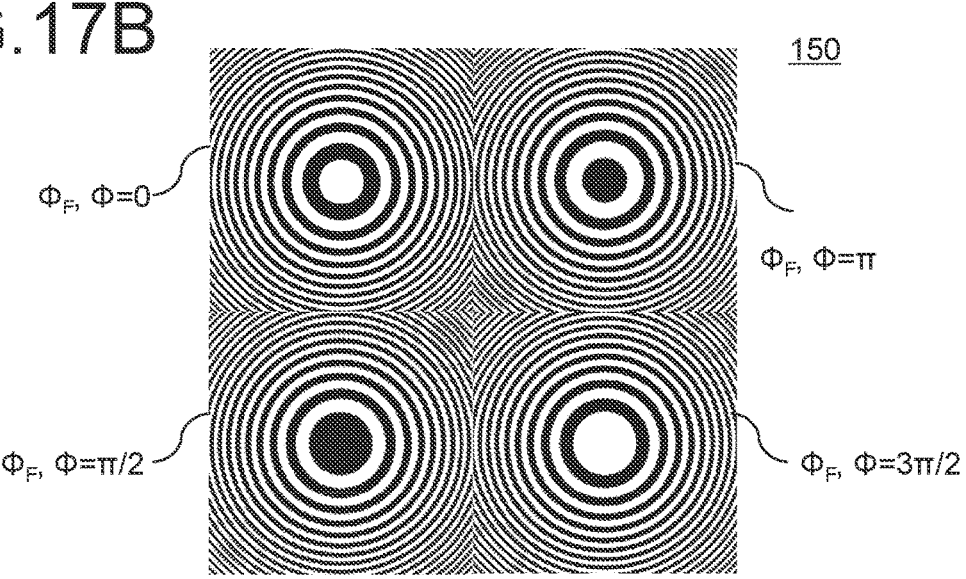

The modulator 102*e* includes a grating pattern 150 in which a plurality of grating patterns having different phases are two-dimensionally arranged. FIG. 17B illustrates an example of the grating pattern 150 of the modulator 102*e*. As illustrated in FIG. 17B, the grating pattern 150 has a pattern arrangement in which, for example, the grating patterns whose initial phases $\Phi_F$ or $\Phi$ are $\{0, \pi/2, \pi, 3\pi/2\}$, respectively, are two-dimensionally arranged.

The image division unit 125 is configured to divide the output from the image sensor 103 into regions corresponding to the pattern arrangement of the modulator 102*e*, and sequentially transmit the divided regions to the image processing unit 122. In the example of FIG. 17B, the image division unit 125 divides the output from the image sensor 103 into 2×2, that is, four regions.

The image processing unit 122*e* is configured to perform the image processing. The image processing performed by the image processing unit 122*e* is the same as the image processing performed by the image processing unit 122*d*. Meanwhile, the image processing unit 122*e* performs the back surface grating intensity modulation processing on each of the regions which have been divided by the image division unit 125, respectively, and adds the results in the addition memory.

FIG. 18 illustrates a processing flow of the image division and image processing performed by the image division unit 125 and image processing unit 122*e* of the imaging device 101*e*. This processing is executed every time sensor signals are stored in the storage unit 121 by the image sensor 103. In the following, it is assumed that the image is divided into an M number of regions. That is, it is assumed that the M number of grating patterns having different initial phases are two-dimensionally arranged in the modulator 102*e*.

Firstly, the image division unit 125 divides the sensor image into an M number of regions corresponding to the arrangement of the grating patterns (step S551).

Then, the image processing unit 122*e* performs the sensor signal processing (step S500) and back surface grating intensity modulation (step S511) described above on the sensor signals of the M number of divided regions (step S552, step S554, step S555), and adds the processed sensor signals to the addition memory (step S553).

After completing the above-described processing for all the M number of divided regions, the image processing unit 122*e* performs the processes in the step S501 to step S507 described above on the signals stored in the addition memory, clears the last addition memory (step S556), and terminates the processing.

The fringe scanning based on the Equation (20) requires four phases. For this reason, the modulator 102*e* is divided into four regions of 2×2, and grating patterns having four kinds of initial phases are arranged therein. On the other hand, the fringe scanning based on the Equation (22) can be implemented with two phases. For this reason, in this case, the modulator 102*e* can be implemented by a grating pattern arrangement having two kinds of initial phases of 1×2.

Figure 17C:
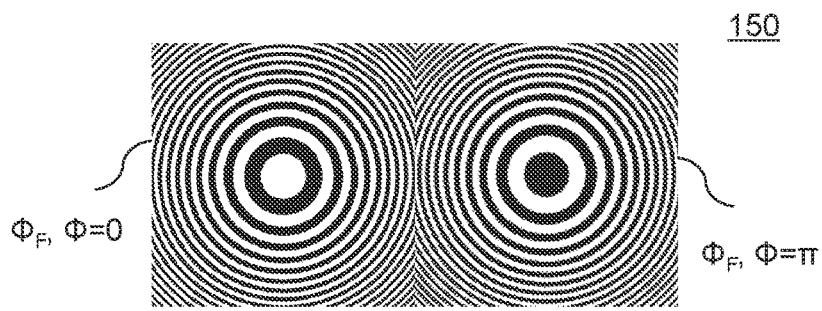

FIG. 17C illustrates an example of the grating pattern 150 of this case. The modulator 102*e* is configured such that, for example, grating patterns, of which the initial phases $\Phi_F$ or $\Phi$ are $\{0, \pi\}$, are two-dimensionally arranged.

In the case of using this grating pattern 150, the image division unit 125 divides the output from the image sensor 103 into regions of 1×2 in accordance with the number of phases.

As described above, using the spatial division fringe scanning does not require the electrical switching which is performed by the modulator 102*d* for the time division fringe scanning, thereby making it possible to manufacture the modulator 102d inexpensively. Furthermore, in the case of the space division fringe scanning, since the imaging timings are the same between the plurality of initial phases, it is possible to image a moving body.

Note that in the case of four phases, higher image quality after development can be expected than that of the case of two phases while in the case of two phases, processing volume is less than that of the case of four phases. In addition, in the case of two phases, it is possible to use an image sensor of CMOS type, whose shutter timing differs for each horizontal line, for imaging videos. However, using the spatial division fringe scanning requires division of an image, and as a result, practically reduces the resolution of the image.

Therefore, the time division fringe scanning is suitable for imaging a stationary object which needs to increase the resolution.

First Embodiment

The basic principle of imaging performed by the imaging devices 101a to 101e and the processing for improving image quality have been described above. In the following, a first embodiment of the present invention will be described. The imaging device of the present embodiment includes an exposure control function which allows the imaging devices 101a to 101e described above to be used in the environment whose brightness level varies.

An imaging device without using a lens, such as the imaging devices 101a to 101e described above, cannot control exposure which is, in the case of a camera using a lens, controlled by changing an aperture ratio of the lens. Accordingly, an imaging device according to the first embodiment controls exposure by controlling a transmittance of a transmissive portion of the modulator, changing an exposure time of the image sensor 103, or controlling both.

[Configuration of Imaging Device]

Figure 19A:
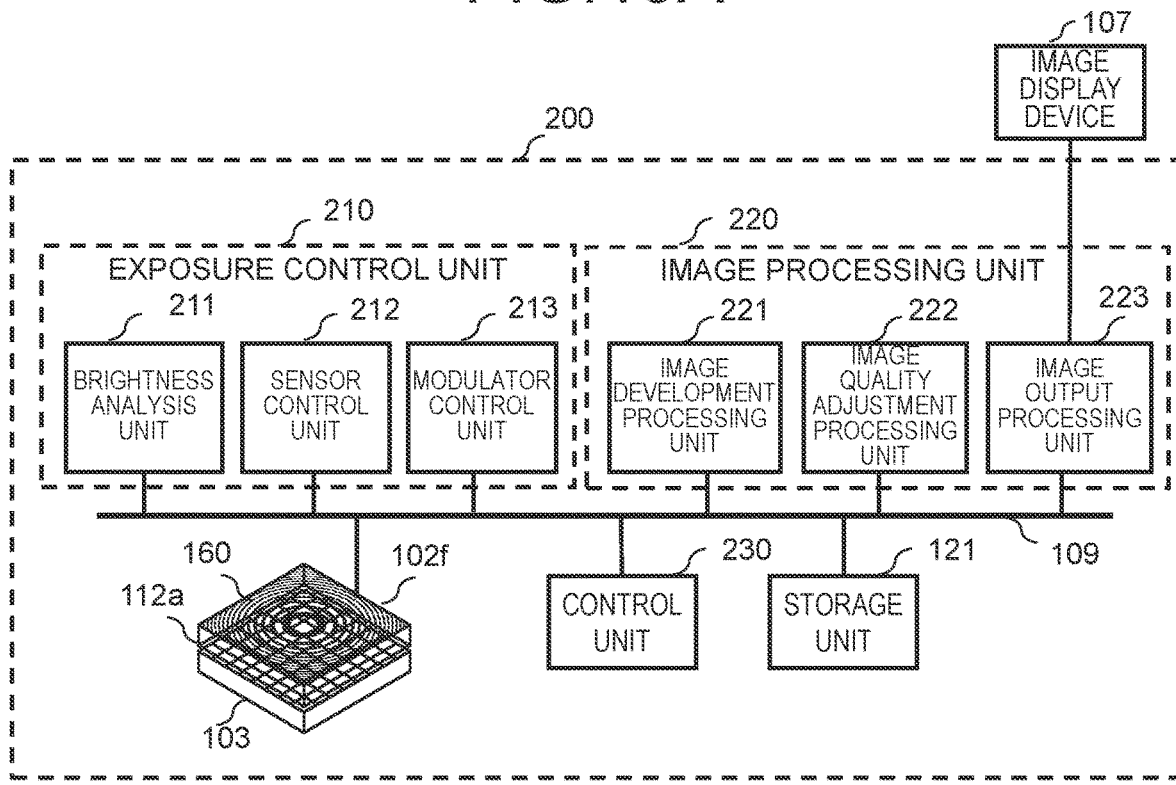
FIG. 19A illustrates a configuration of an imaging device of the first embodiment.

Firstly, a configuration of an imaging device 200 of the first embodiment will be described. FIG. 19A illustrates the configuration of the imaging device 200 of the first embodiment. The imaging device 200 of the first embodiment includes the image sensor 103, a modulator 102f, the storage unit 121, an exposure control unit 210, an image processing unit 220, a control unit 230, and the bus 109 provided for connecting these units.

The image sensor 103 is configured in the same manner as the image sensor 103 of each imaging device 101a to 101e. That is, the image sensor 103 converts an optical image captured by a plurality of light receiving elements arranged in an array on the imaging surface to sensor signals, and outputs the converted sensor signals.

The modulator 102f is provided on a light receiving surface of the image sensor 103, and modulates light by means of the front surface side grating pattern. In the first embodiment, the modulator 102f includes the grating substrate 112a and a grating pattern display unit 160 arranged on the grating substrate 112a. The grating pattern display unit 160 is configured to display the front surface side grating pattern. In the first embodiment, the grating pattern display unit 160 is formed by the one which can electrically change a transmittance of a grating pattern to be displayed, for example, a liquid crystal display element.

The storage unit 121 stores such as sensor signals output from the image sensor 103 and signals in the middle of processing by the image processing unit. The storage unit 121 of the first embodiment is configured basically in the same manner as the storage unit 121 of the imaging devices 101b to 101e.

The image processing unit 220 is configured to perform the image processing on the sensor signals output from the image sensor 103 to generate a photographed image. In the first embodiment, the image processing unit 220 generates the back surface side grating pattern (second grating pattern) 105 corresponding to the front surface side grating pattern 104, generates a moiré fringe image based on the back surface side grating pattern 105 and the sensor signals, and then generates a photographed image that is an image of a subject based on the generated moiré fringe image. The image processing unit 220 outputs the generated photographed image to the outside, and causes, for example, the image display device 107 to display it.

The image processing unit 220 of the first embodiment includes an image development processing unit 221, an image quality adjustment processing unit 222, and an image output processing unit 223.

The image development processing unit 221 is configured to perform the image developing processing for obtaining a developed image based on the sensor signals acquired by the image sensor 103 and stored in the storage unit 121. For example, in the processing flow in FIG. 3, the image development processing unit 221 performs each of the sensor signal processing of step S500, the two-dimensional FFT calculation of step S501, the spectrum cutting out processing of step S502, and the intensity calculation of step S503 to obtain a developed image of a subject 400.

The image development processing unit 221 may include the function of the intensity modulation unit 106. In this case, for example, the image development processing unit 221 further executes the back surface grating intensity modulation processing of S511 in the processing flow of FIG. 10.

The image quality adjustment processing unit 222 is configured to perform the image quality adjustment processing for adjusting image quality of the developed image generated by the image development processing unit 221. For example, the image quality adjustment processing unit 222 performs each of the noise reduction processing of S504 and the contrast enhancement processing of S505 in the processing flow of FIG. 3.

The image output processing unit 223 is configured to perform the output image generation processing for converting the signal after the image quality adjustment into a video signal (photographed image) suitable for an output form. For example, the image output processing unit 223 performs the color balance adjustment of S506 and the output signal generation processing of S507 in the processing flow of FIG. 3.

The exposure control unit 210 is configured to determine an exposure condition (exposure environment) based on the sensor signals that are output from the image sensor 103 and stored in the storage unit 121, and perform exposure control in accordance with the determined exposure condition. The exposure condition includes an exposure time of the image sensor 103 and a transmittance of the modulator 102f. In the first embodiment, the exposure control unit 210 analyzes the brightness of the sensor signals (signal values), and for example, when the maximum value of the signal values of the analyzed sensor signals exceeds a predetermined threshold, changes the exposure condition such that signal values of sensor signals output from the image sensor 103 thereafter become smaller than the signal value of the analyzed sensor signals.

In order to implement the processing described above, the exposure control unit 210 of the first embodiment includes a brightness analysis unit 211, a sensor control unit 212, and a modulator control unit 213.

The brightness analysis unit 211 is configured to analyze the brightness of the sensor signals output from the image sensor 103, and notify the analysis result to the sensor control unit 212 and/or the modulator control unit 213. The sensor signals are stored in the storage unit 121.

The sensor control unit 212 is configured to determine an exposure time of the image sensor 103 in accordance with the analysis result, and control the image sensor 103 such that its exposure time becomes the determined exposure time.

The modulator control unit 213 is configured to determine a transmittance of the modulator 102f in accordance with the analysis result, and control the modulator 102f such that its transmittance becomes the determined transmittance.

The control unit 230 is configured to control overall operation of the imaging device 200.

[Hardware Configuration]

Figure 19B:
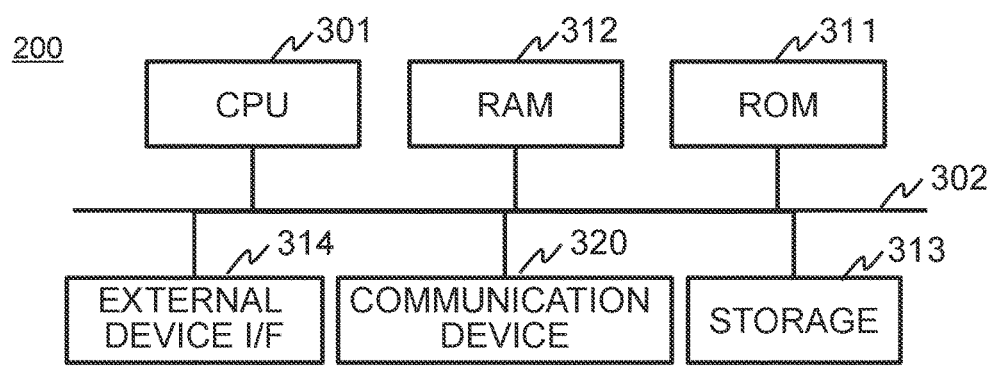
FIG. 19B illustrates a hardware configuration of the imaging device of the first embodiment.

FIG. 19B illustrates a hardware configuration of the imaging device 200. As illustrated in FIG. 19B, the imaging device 200 of the first embodiment includes, for example, a CPU 301, a ROM 311, a RAM 312, a storage 313, an external device interface (I/F) 314, and a bus 302 provided for connecting these units. The imaging device 200 may further include a communication device 320.

The CPU 301 is configured to control the overall operation of the imaging device 200. In the case where the imaging device 200 includes the communication device 320, the CPU 301 acquires various types of information from a server on an external network via the communication device 320.

The ROM 311 and the storage 313 are configured to be controlled by instructions from the CPU 301. Each of the ROM 311 and the storage 313 stores application programs, and further stores various types of data created by the application programs or various types of data necessary for executing the application programs. The storage 313 may be the one built in the imaging device 200, or may be a portable memory which is detachable from the imaging device 200.

The RAM 312 is a work area during execution of a basic operation program or other operation programs, and configured to be controlled by instructions from the CPU 301.

The CPU 301 implements the functions above by loading and executing the application programs stored in the ROM 311 or the storage 313 in the RAM 312.

The application programs may be stored in advance in the ROM 311 and/or the storage 313 before the imaging device 200 is shipped, or may be stored in an optical medium such as a CD (Compact Disk) or a DVD (Digital Versatile Disk), or a medium such as a semiconductor memory so that they can be installed in the imaging device 200 via a medium connection unit (not illustrated).

Furthermore, the application programs may be downloaded and then installed from an external network via the communication device 320, or may be moved or copied from an external device via an external device connection interface (not illustrated) and then installed.

It is also possible to implement each application program by hardware as a processing unit having the same function.

The storage unit 121 is provided in the ROM 311, the RAM 312, and/or the storage 313.

The external device interface 314 is, for example, an interface with the image display device 107 and/or an operation device. Via the external device interface 314, the imaging device 200 outputs a processing result to the outside, or receives such as an operation instruction from the outside.

The communication device 320 is provided for establishing communication with an external device.

[Brightness Analysis]

In the following, the brightness analysis processing performed by the brightness analysis unit 211 will be described. In the first embodiment, the brightness analysis unit 211 uses sensor signals (sensor image) acquired by the image sensor 103 to perform the brightness analysis. The brightness analysis unit 211 specifies a value of a sensor signal (sensor signal value) indicating the highest brightness level from among the sensor signals included in the acquired sensor image. Then, the brightness analysis unit 211 determines whether the specified sensor signal value is equal to or greater than a predetermined sensor signal threshold, or less than the sensor signal threshold. Then, the brightness analysis unit 211 outputs the determination result as an analysis result.

The light volume collected by each light receiving element of the image sensor 103 is an aggregate of light acquired through the modulator 102f. In the first embodiment, a sensor image composed of sensor signals obtained by converting the light volume collected by each light receiving element into electrical signals is subjected to the brightness analysis. As will be described later, an image of the subject 400 after the development processing by the image processing unit 220 may also be subjected to the brightness analysis.

Figure 20A:
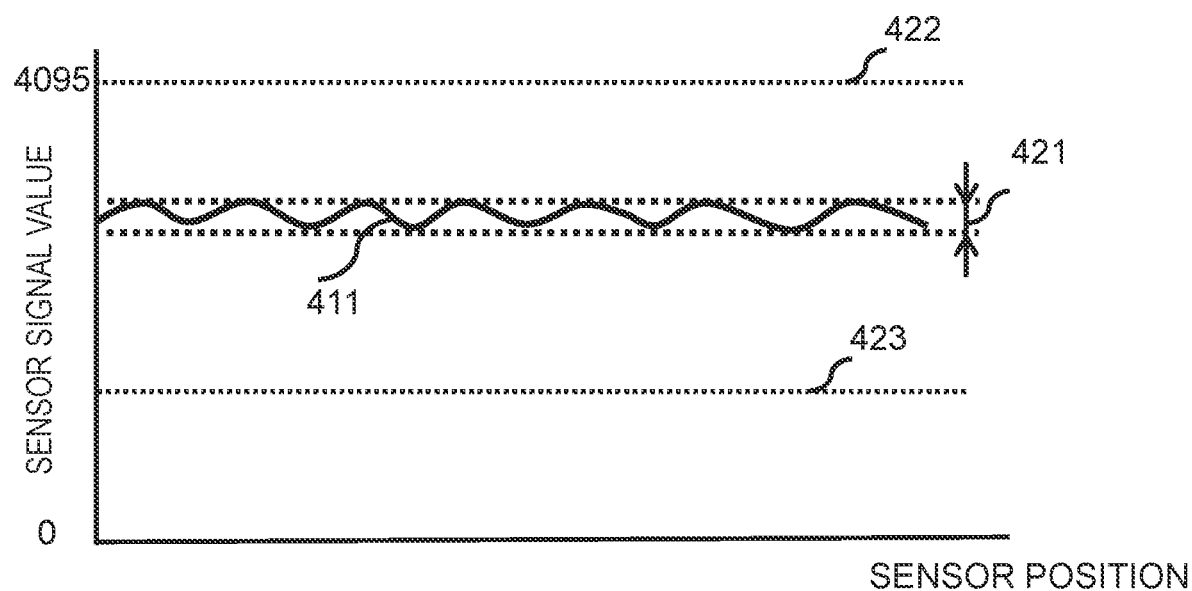
FIG. 20A illustrates a graph showing change depending on positions of sensor signal values of the first embodiment.

FIG. 20A illustrates an image example of change in signal values (brightness) of sensor signals which are output values of each light receiving element of the sensor image. An example illustrated in FIG. 20A is the case of the image sensor 103 with a 12-bit output. In FIG. 20A, the horizontal axis represents positions of a plurality of sensor pixels 103a (sensor positions) on one horizontal line of the image sensor 103 while the vertical axis represents sensor signal values expressing the brightness levels of each sensor pixel. The larger a sensor signal value is, the higher a brightness level is. The sensor values express the brightness levels from the minimum 0 to the maximum 4095. A graph 411 shows change in sensor signal values of each sensor pixel 103a on one horizontal line.

In the case of a lens-less imaging device, even when photographing an image of the subject 400 having a large contrast, generally, change in sensor signal values occurs only due to whether the sensor signals have passed through a transmissive portion of the modulator 102f or a part thereof corresponding to the non-transmissive portion.

That is, as illustrated in the graph 411, change in the brightness levels of each of the sensor pixels 103a does not occur so much. For example, in the example of the graph 411, the change is fallen within a range 421.

In the case of a lens-less imaging device, in order to improve image quality after the development processing, it is important to acquire the amplitude of the brightness and darkness of sensor signal values as accurately as possible, and accordingly, it is better that the sensor signal values to be acquired are high. On the other hand, when a sensor signal value is saturated, deterioration occurs not only in the saturated sensor pixel, but also in the whole image quality. Considering the above, a lens-less imaging device needs to control the exposure such that the sensor signal values of each of the sensor pixels 103a of the image sensor 103 become as high as possible within a range in which the sensor signal values do not get saturated.

The brightness analysis unit 211 of the first embodiment determines whether the maximum value of each of the sensor signal values is within a predetermined sensor signal threshold 422, and outputs the determination result as an analysis result. The sensor signal threshold 422 is defined in a range in which each sensor signal value does not get saturated. In the example of FIG. 20A, a saturation value (4095) is set. In the first embodiment, for example, the brightness analysis unit 211 is configured to output, as an analysis result, a signal representing that the maximum value of sensor signals is less than the sensor signal threshold 422 in such a case, whereas, in other cases, output the maximum value of the sensor signal. The sensor signal threshold 422 is stored in advance in the storage unit 121.

[Transmittance Control]

Figure 21A:
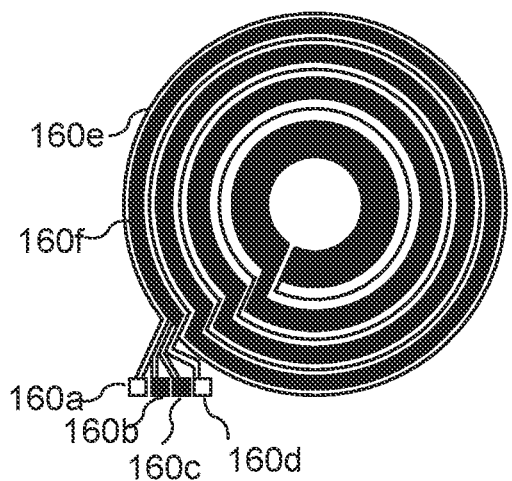
FIG. 21A and FIG. 21B explain the control of a transmittance of the modulator of the first embodiment, and FIG. 21C explains the relation between voltage to be applied to the terminals of the modulator of the first embodiment and a transmittance of the liquid crystal display element.
Figure 21B:
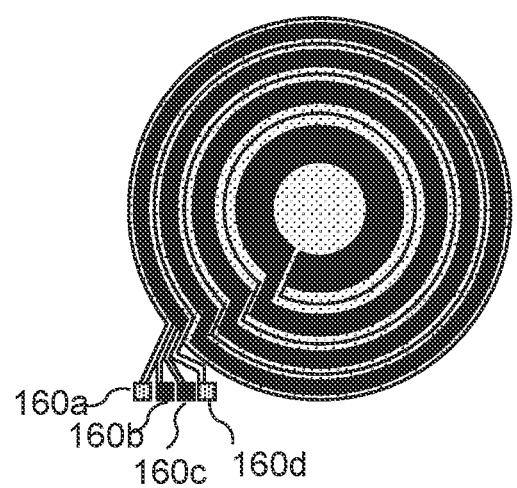

Next, control of a transmittance of a transmissive portion of the modulator 102f performed by the modulator control unit 213 will be described. FIG. 21A and FIG. 21B explain the transmittance control of the transmissive portion of the modulator 102f.

On the grating pattern display unit 160 of the first embodiment, for example in the same manner as the grating pattern display unit 140 of the imaging device 101d, concentric electrodes are arranged so as to divide one period of a grating pattern into four parts. From the inside, each of the electrodes is connected to every fourth electrode, and four terminal electrodes 160a, 160b, 160c, 160d (hereinafter, simply referred to as a terminal) are led out from the outer peripheral portion as driving terminals. Applying each predetermined voltage to the terminals 160a to 160d, respectively, causes each voltage state of 0 or 1 so as to obtain a grating pattern having a transmissive portion 160e and a non-transmissive portion 160f.

For example, as illustrated in FIG. 21A, voltage for making the liquid crystal display element transmissive is applied to the terminals 160a and 160d while voltage for making the liquid crystal display element non-transmissive is applied to the terminals 160b and 160c. As a result, the transmissive portion 160e and the non-transmissive portion 160f can be obtained.

The modulator control unit 213 of the fourth embodiment is configured to change voltage for making the liquid crystal display element transmissive in accordance with an analysis result of the brightness analysis unit 211 so as to change a transmittance of the liquid crystal display element as illustrated in FIG. 21B.

Figure 21C:
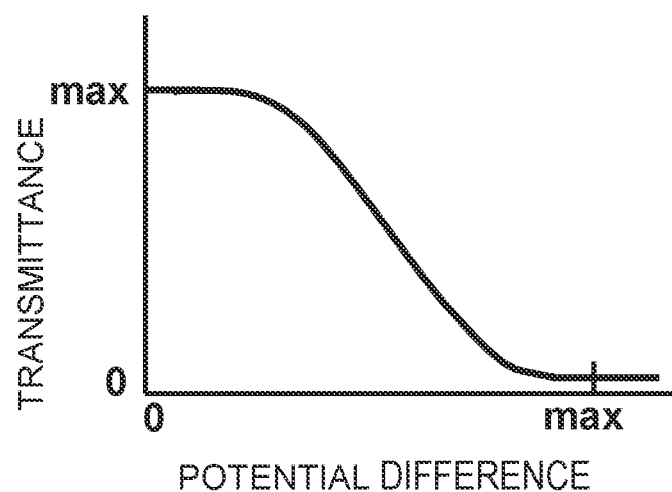

Here, relation between the voltage to be applied to the terminals 160a to 160d and the transmittance of the liquid crystal display element will be described. FIG. 21C illustrates a graph showing the relation therebetween. In FIG. 21C, a potential difference represents a difference between the voltage applied to the terminals 160a to 160d and the voltage applied to a common electrode on the opposite side of the terminals 160a to 160d with the liquid crystal interposed therebetween. As described above, in the first embodiment, as the liquid crystal display element, an element configured to transmit light when there is no potential difference (0) and not to transmit light when the potential difference is maximum (max) is used.

As illustrated in FIG. 21C, when the potential difference is changed from 0 to V max in accordance with the voltage applied to the terminals 160a to 160d, the transmittance of the liquid crystal display device monotonously decreases. That is, the liquid crystal display element used for the grating pattern display unit 160 is configured such that the smaller the potential difference due to the applied voltage is, the higher the transmittance becomes.

In the case of the imaging device 101d, the voltage is applied to the terminals 160a and 160d connected to the transmissive portion 160e such that the potential difference becomes 0. On the other hand, the voltage is applied to the terminals 160b and 160c connected to the non-transmissive portion 160f so that the potential difference becomes V max.

The modulator control unit 213 is configured to change the voltage to be applied to the terminals 160a and 160d from 0 to V max of the potential difference in accordance with an analysis result of the brightness analysis unit 211.

For example, when the analysis result indicates that a signal value of a sensor signal is saturated, the modulator control unit 213 increases the voltage to be applied to the terminals 160a and 160d to reduce the transmittance. On the other hand, when the analysis result indicates that signal values of sensor signals are not saturated, the modulator control unit 213 decreases the voltage to be applied to increase the transmittance.

Figure 22A:
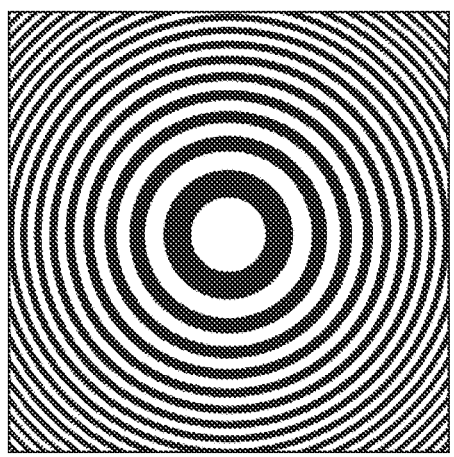
FIG. 22 Each FIG. 22A and FIG. 22B explains an example of a grating pattern to be displayed on the modulator of the first embodiment.
Figure 22B:
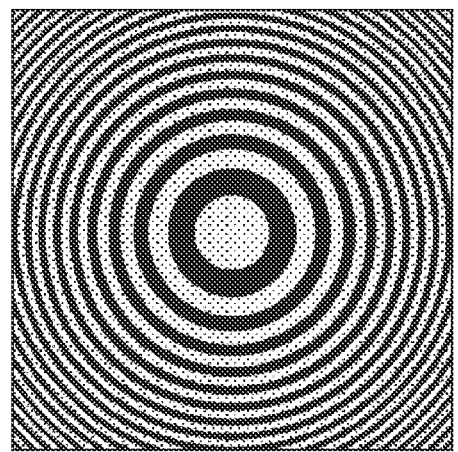

FIG. 22A and FIG. 22B illustrate a grating pattern displayed on the grating pattern display unit 160 in the case of providing the modulator 102f with a liquid crystal panel capable of controlling a transmittance for each pixel to generate and display various patterns other than predetermined patterns.

FIG. 22A illustrates an example of a grating pattern 161 in an initial state prior to execution of the exposure control. As illustrated in FIG. 22A, on the modulator 102f, a transmissive portion having the maximum transmittance and a non-transmissive portion having the minimum transmittance are displayed.

FIG. 22B illustrates an example of a grating pattern 162 after the exposure control. The grating pattern 162 is obtained by, for example since the image sensor 103 is saturated, performing the exposure control to decrease a sensor transmittance of a transmissive portion. As illustrated in FIG. 22B, the transmittance of the transmissive portion is reduced.

[Imaging Processing]

Figure 23A:
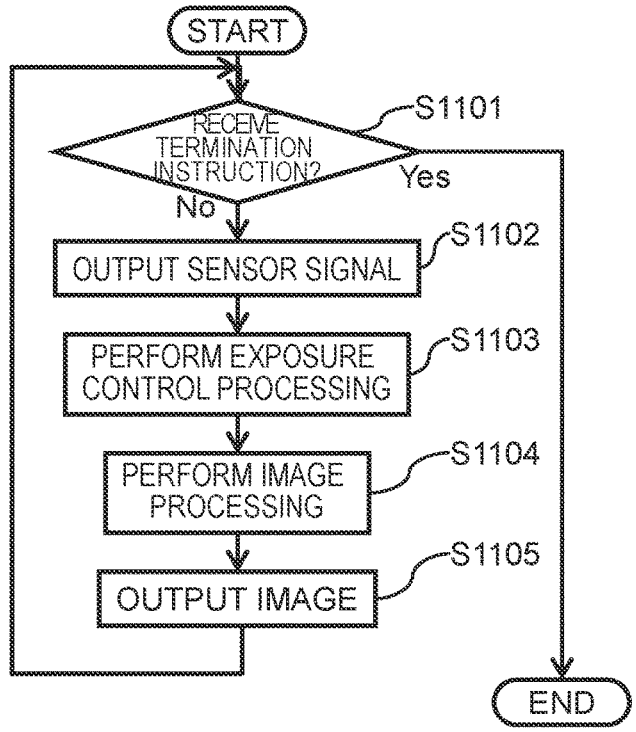
FIG. 23A explains the imaging processing of the first embodiment, FIG. 23B explains the image processing of the first embodiment, and FIG. 23C explains the exposure control processing of the first embodiment.

Next, a flow of the imaging processing performed by the imaging device 200 of the first embodiment will be described. FIG. 23A illustrates a processing flow of the imaging processing. The control unit 230 starts this processing upon receiving an instruction to start the processing from the user. Note that as an exposure condition, an initial value thereof is set.

The control unit 230 repeats the following processes until receiving a termination instruction (step S1101). Upon receiving the termination instruction, the control unit 230 terminates the processing.

Firstly, for each driving period described above, the image sensor 103 outputs sensor signals to the storage unit 121 (step S1102).

When the image sensor 103 outputs the sensor signals to the storage unit 121, the exposure control unit 210 performs the exposure control processing for determining an exposure condition based on the latest sensor signals (step S1103).

The image processing unit 220 performs the image processing on the latest sensor signals (step S1104) to generate a photographed image, and outputs the photographed image to, for example, the image display device 107 (step S1105).

[Image Processing]

Figure 23B:
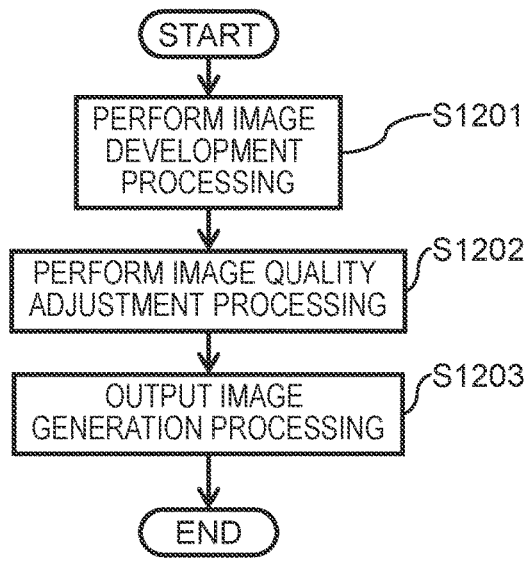

Next, a flow of the image processing performed by the image processing unit 220 in step S1104 will be described. FIG. 23B illustrates a processing flow of the image processing according to the first embodiment.

Firstly, the image development processing unit 221 extracts the latest sensor signals for one frame stored in the storage unit 121, and performs the image development processing on the extracted sensor signals (step S1201). The development processing corresponds to the processes of step S500 to step S503 described above.

Next, the image quality adjustment processing unit 222 performs the image quality adjustment processing (step S1202). The image quality adjustment processing corresponds to the processes of step S504 to step S505.

The image output processing unit 223 performs the output image generation processing (step S1203). The output image generation processing corresponds to the processes of step S506 to step S507 described above.

In this connection, the image processing unit 220 may be configured to keep performing the image processing during photographing images, on the other hand, when it is not necessary to display a photographed image in real time, it may be configured not to keep performing the image processing but to perform it at an appropriate timing by storing the sensor signals in association with its acquisition time in the storage unit 121. With this configuration, it is possible to reduce the processing load of the imaging device 200, thereby making it possible to smoothly photograph images even in the case of using a device having a low processing capacity.

[Exposure Control Processing]

Figure 23C:
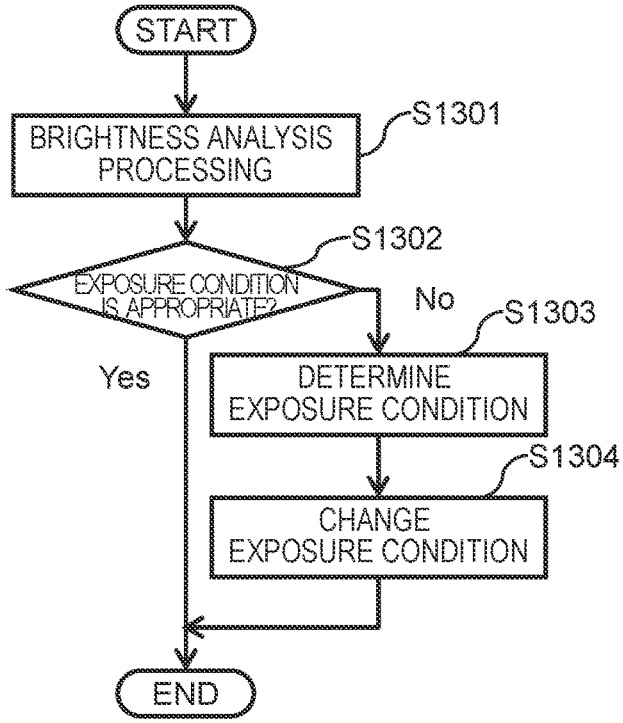

Next, a flow of the exposure control processing will be described. FIG. 23C illustrates the flow of the exposure control processing performed by the exposure control unit 210 of the first embodiment.

Firstly, the brightness analysis unit 211 performs the brightness analysis processing by extracting the latest sensor signals stored in the storage unit 121 and analyzing the brightness of the extracted sensor signals (step S1301).

The exposure control unit 210 determines whether the analysis result by the brightness analysis unit 211 indicates that the exposure condition is appropriate (step S1302). Here, in the case where the analysis result indicates that the maximum value of the sensor signals is less than the sensor signal threshold 422, the exposure control unit 210 determines that the exposure condition is appropriate. In this case (step S1302; Yes), the exposure control unit 210 terminates the processing without performing any further processes.

On the other hand, in the case where the analysis result indicates that the exposure condition is inappropriate (step S1302; No), that is, in the case where the maximum value of the sensor signals is equal to or greater than the sensor signal threshold 422, the exposure control unit 210 notifies the determination result to at least one of the sensor control unit 212 and the modulator control unit 213.

Each of the sensor control unit 212 and the modulator control unit 213 calculates an exposure time of the image sensor 103 and a transmittance of the modulator 102$f$, respectively, so that the maximum value of the sensor signals becomes less than the sensor signal threshold 422, and determines the exposure condition (step S1303).

In this connection, the exposure can be controlled by a shutter timing (exposure time) of the image sensor 103 in the same manner as a conventional camera with a lens.

The image sensor 103 outputs sensor signals for each driving period. Furthermore, the image sensor 103 can set an exposure period for maximizing the driving period.

In the first embodiment, upon receiving the analysis result from the brightness analysis unit 211, the sensor control unit 212 determines an optimal exposure time of the image sensor 103 and an optimal transmittance of the modulator 102$f$ in accordance with the analysis result.

In the first embodiment, controlling the optimal exposure time of the image sensor 103 as well as the optimal transmittance of the modulator 102$f$ enables the exposure control in a wider range.

In the first embodiment, which one of the exposure time and the transmittance to be controlled to improve the exposure condition is determined in advance. In the case of controlling both of them, the exposure time and the transmittance are determined to achieve the desired exposure condition by both of them.

Each of the sensor control unit 212 and the modulator control unit 213 changes the exposure time of the image sensor 103 and the transmittance of the modulator 102$f$, respectively, to realize the determined exposure condition (step S1304), and terminate the processing.

Which one of the exposure time of the image sensor 103 and the transmittance of the modulator 102$f$ to be adjusted in the case where the exposure condition is determined to be inappropriate is determined in advance. Either one of them may be adjusted, or both of them may be appropriately adjusted to determine a new exposure condition.

The exposure time and the transmittance are calculated by using the maximum value of the sensor signals and the sensor signal threshold 422. The exposure time and the transmittance may be determined by changing them by predetermined amounts and calculating the maximum value of the sensor signals, or determined by using such as a half-value method.

As described above, the imaging device 200 according to the first embodiment comprises: the image sensor 103 that is configured to convert an optical image captured in a plurality of light receiving elements arranged in an array on an imaging surface into sensor signals, and output the sensor signals; the modulator 102$f$ that is provided on a light receiving surface of the image sensor 103, and configured to modulate light by using a first grating pattern; the exposure control unit 210 that is configured to determine an exposure condition based on the sensor signals, change a set exposure condition to the exposure condition as determined, and control exposure in accordance with the exposure condition as changed; and the image processing unit 220 configured to generate a second grating pattern corresponding to the first grating pattern, generate a moiré fringe image based on the second grating pattern and the sensor signals, and generate a photographed image based on the moiré fringe image. The exposure condition includes an exposure time of the image sensor 103 and a transmittance of the modulator 102$f$.

As described above, the first embodiment includes the exposure control unit 210 configured to determine an exposure condition based on sensor signals, and thus, according to the first embodiment, it is possible to control the exposure even in the case of a lens-less imaging device (imaging device 200). As a result, the lens-less imaging device 200 can obtain high quality images even in an environment where the light volume is not constant.

In particular, according to the first embodiment, the exposure condition is determined based on signal values of the sensor signals prior to the image development processing. Furthermore, at this time, whether the exposure condition should be changed is determined by comparison between a predetermined threshold and the maximum or minimum value of the sensor signal values. Therefore, it is possible to quickly determine an optimum exposure condition with a small processing load.

Furthermore, in the first embodiment, the transmittance of the modulator 102$f$ is changed by changing voltage to be applied to the liquid crystal display element of the modulator 102*f*. Therefore, it is possible to set an optimum exposure condition with a simple configuration.

In particular, according to the first embodiment, both a transmittance of the modulator 102*f* and an exposure time of the image sensor 103 can be controlled. Controlling both a transmittance and an exposure time enables the exposure control with minimal reduction of light volume.

<First Modification>

In the first embodiment, the brightness analysis unit 211 determines whether the exposure control is necessary based on whether the maximum value of the sensor signal values of the image sensor 103 is less than the sensor signal threshold 422, however, a method of determining whether the exposure control is necessary is not limited thereto.

For example, as illustrated in FIG. 20A, a second sensor signal threshold 423 for defining a minimum value of sensor signal values may be provided. The brightness analysis unit 211 may be configured to determine that the exposure condition is appropriate in the case where the maximum value of the sensor signal values is less than the sensor signal threshold 422 and the minimum value of the sensor signals is equal to or greater than the second sensor signal threshold 423. The second sensor signal threshold 423 is stored in advance in the storage unit 121.

Also in this case, in the case of determining that the exposure condition is appropriate, the brightness analysis unit 211 outputs a signal indicating the above, whereas in the case of determining that the exposure condition is inappropriate, the brightness analysis unit 211 outputs the maximum or minimum values of the sensor signals as an analysis result.

In the case of receiving the maximum value of the sensor signals, the exposure control unit 210 determines a new exposure condition by the method described above. On the other hand, in the case of receiving the minimum value of the sensor signals, the exposure control unit 210 changes a shutter timing and a transmittance so as to realize at least one of increase of the exposure time and increase of the transmittance.

According to the first modification, with a simple configuration, it is possible to determine an exposure condition for limiting the sensor signal values to a desired value range. Therefore, photographed images with high image quality can be obtained.

Figure 20B:
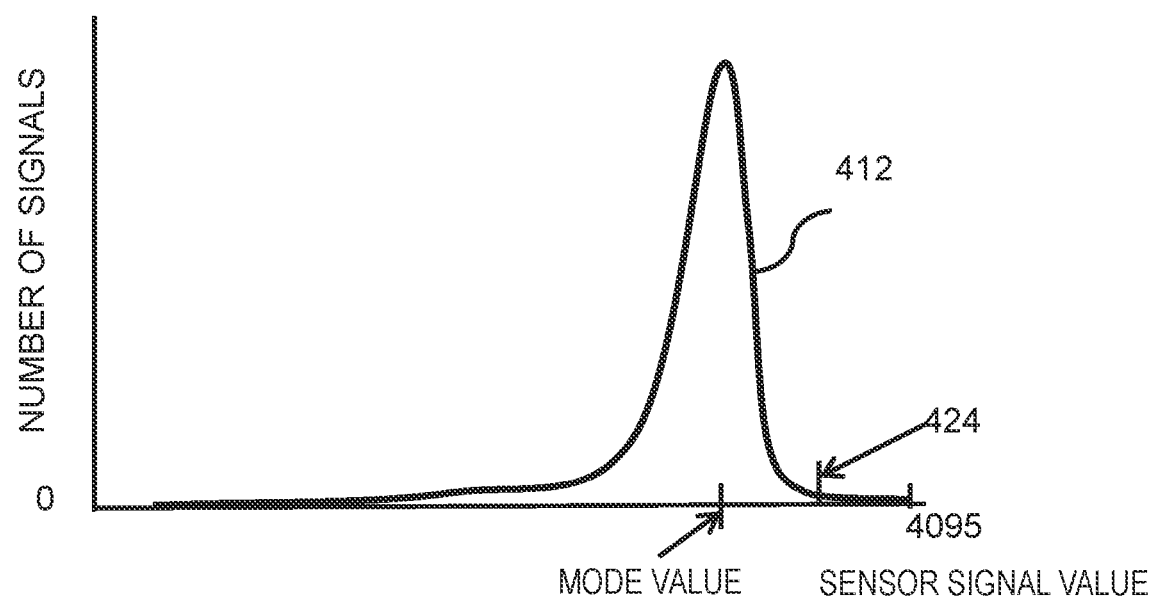
FIG. 20B illustrates a histogram of the sensor signal values of the first embodiment.

The sensor signal threshold 422 is not limited to the maximum value (saturation value) that is a highest possible value for a sensor signal value. FIG. 20B illustrates a histogram 412 of sensor signal values. As illustrated in FIG. 20B, a value taken as a sensor signal value is remarkably high around a predetermined signal value (mode value), and becomes smaller as it moves away from the mode value.

A sensor signal threshold 424 may be set by calculating a histogram of sensor signal values and including a certain number or a predetermined ratio of the sensor signals in the sensor signal threshold. Setting the sensor signal threshold 424 as above enables elimination of an influence of a light receiving element in case that the image sensor 103 includes a defective light receiving element or in case that a light receiving element is receiving a light source of strong collimated light. In this case, the sensor signal threshold 424 is a value between the mode value and the maximum value.

In the first above, the exposure control unit 210 determines whether the exposure condition is appropriate each time the image sensor 103 outputs sensor signals, and changes the exposure condition when determining it is inappropriate. Here, in the case of setting the sensor signal threshold used for the determination to a predetermined value, the exposure control unit 210 changes the exposure condition even when the sensor signal values are slightly changed, which may cause flicker. In order to avoid the above, sensor signal thresholds in a predetermined range may be provided, such as the sensor signal threshold 422, the second sensor signal threshold 423, and the sensor signal threshold 424.

<Second Modification>

Figure 24A:
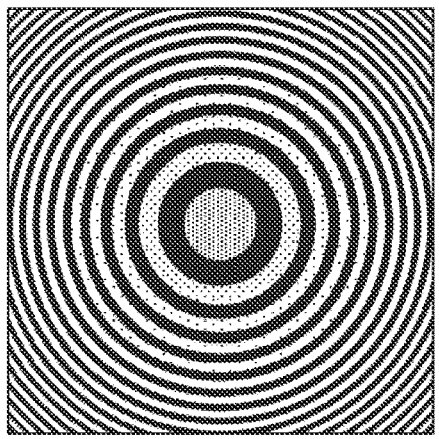
FIG. 24A explains a display example of a grating pattern according to a modification of the first embodiment, and each FIG. 24B

In the exposure adjustment, a transmittance of the grating pattern of the modulator 102*f* may be partially changed. FIG. 24A illustrates an example of a grating pattern 163 whose transmittance is partially changed in the exposure adjustment processing.

The image sensor 103 has light incident angle characteristics in which light volume acquisition characteristics differ depending on an angle of light incident on each light receiving element (sensor pixels 103*a*). Accordingly, ones of the sensor pixels 103*a* which are located closer to the center portion receive more volume of incident light, and their luminance levels are higher than those of the peripheral portion. Accordingly, the sensor pixels 103*a* which are located closer to the center portion receive more volume of incident light, and therefore, the luminance levels become higher as closer to the center while becoming lower in the periphery. An influence of image quality deterioration due to the characteristics above is reduced, for example, by using fringe scanning. However, since the amplitude also decreases with decrease in the luminance level, it is difficult to improve the resolution.

Accordingly, the modulator control unit 213 generates a grating pattern to be displayed on the modulator 102*f* such that, as illustrated in FIG. 24A, a transmittance of the center portion is low and a transmittance of the peripheral portion is high.

Figure 24B:
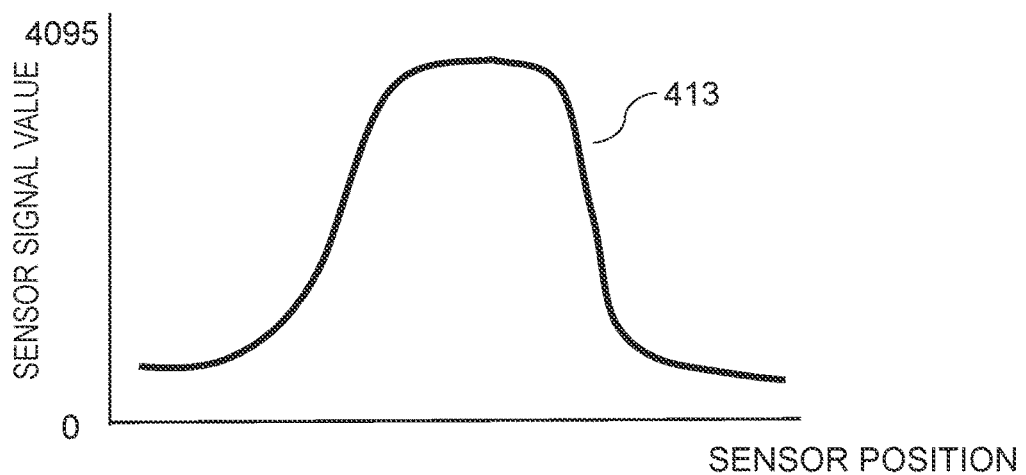
FIG. 24C illustrates a graph showing a sensor signal value for each sensor position.
Figure 24C:
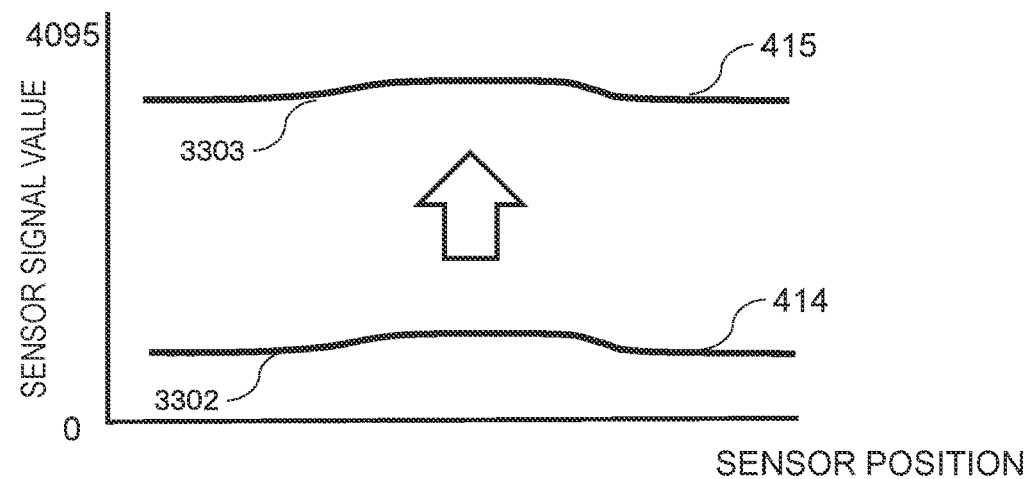

FIG. 24B and FIG. 24C illustrate an example of sensor signal values before and after the partial light volume control as mentioned above. Each FIG. 24B and FIG. 24C illustrates sensor pixel values in one horizontal line of the image sensor 103. The example illustrated herein shows the image sensor 103 of 12-bit output, and the horizontal axis indicates positions (sensor positions) of sensor pixels in a certain horizontal line of the image sensor 103 while the vertical axis indicates sensor signal values representing the brightness of each sensor pixel.

Note that there is fine fluctuation in the sensor pixel values for each sensor pixel as illustrated in FIG. 20A. However, FIG. 24B and FIG. 24C do not illustrate the fine fluctuation but provide a general image of change in sensor pixel values.

A graph 413 in FIG. 24B illustrates the sensor signal values of each sensor pixel 103*a* in a state where the modulator 102*f* has not performed the partial transmittance control (for each position of the sensor pixels 103*a*). As described above, due to the light incident angle characteristics of the modulator 102*f*, the center portion is bright and the sensor signal values therein are high. On the other hand, the peripheral portion is dark, and the sensor signal values therein are small. In this state, the fluctuation of the light in the peripheral portion is too small to be accurately caught.

Accordingly, as illustrated in FIG. 24A, the control is performed so as to gradually lower the transmittance toward the center portion while making the transmittance in the peripheral portion of the modulator 102*f* high. The light volume in the center portion is reduced, and as a result, the sensor signal values output from the image sensor 103 are substantially the same in the center portion and the peripheral portion as illustrated in a graph 414 of FIG. 24C.

At this time, increase in the exposure time of the image sensor 103 can increase the level of the overall sensor signal values. A graph 415 illustrates the sensor signal values obtained by performing such processing. As a result, it is possible to take out more accurately the difference in pixel values due to the phase difference.

As described above, in the image sensor 103 having the light incident angle characteristics, image quality can be improved by partially changing a transmittance of the modulator 102f. At this time, the image quality can be further improved by controlling an exposure time.

Second Embodiment

Next, a second embodiment of the present invention will be described. In the second embodiment, the case of applying the fringe scanning to the processing of the imaging device will be described. Hereinafter, in the second embodiment, the elements having the same names as those of the first embodiment have the same configurations and functions as those of the first embodiment, unless explicitly described in particular. Hereinafter, the second embodiment will be described while focusing on the features different from those of the first embodiment. Hereinafter, an example of performing the time division fringe scanning among the types of the fringe scanning will be described.

The imaging device 200 of the second embodiment basically has the same configuration as that of the imaging device 200 of the first embodiment.

However, the control unit 230 of the second embodiment is configured to make a phase of a grating pattern to be displayed on the grating pattern display unit 160 of the modulator 102f vary for each driving cycle of the image sensor 103. The control unit 230 periodically displays predetermined types of grating patterns having different phases in a predetermined order in the same manner as the imaging device 101d.

The exposure control unit 210 performs the exposure control so as to keep the exposure condition the same while one photographed image is being generated. That is, while the grating patterns having different phases are being displayed in order, the exposure condition is not changed.

Figure 25A:
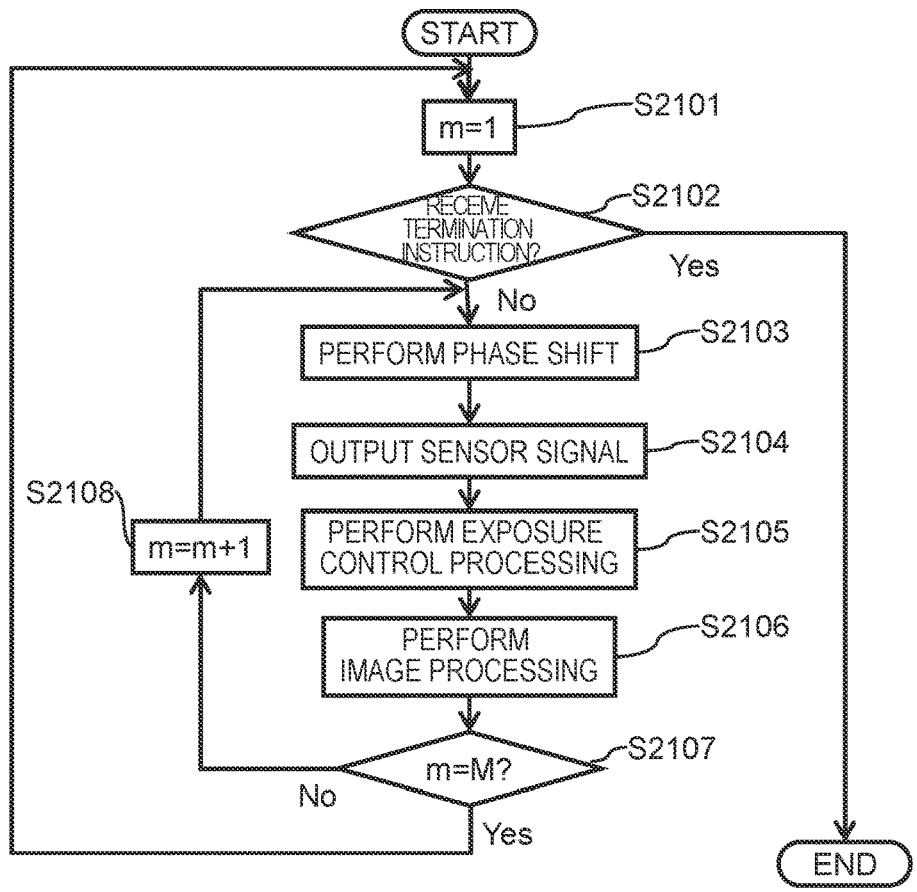
FIG. 25A is a flowchart of the imaging processing according to the second embodiment.

A flow of imaging processing of the second embodiment will be described. FIG. 25A illustrates a processing flow of the imaging processing according to the second embodiment. In the imaging processing according to the second embodiment, M kinds of different grating patterns are periodically displayed to generate a photographed image based on the M number of sensor images.

An initial value of a counter value m is 1. The value m is incremented by 1 every time the control unit 230 changes the grating pattern to be displayed on the grating pattern display unit 160 (every phase shift). The value m returns to 1 after reaching M. When the value of the counter is m, the control unit 230 causes the grating pattern display unit 160 to display the m-th grating pattern, whereby the sensor signals due to the m-th grating pattern can be acquired at this time.

Upon receiving an instruction to start imaging, firstly, the control unit 230 initializes the counter value m (m=1) (step S2101).

The control unit 230 repeats the following processes until receiving a termination instruction (step S2102).

Firstly, the control unit 230 causes the grating pattern display unit 160 to display the m-th grating pattern (phase shift) (step S2103). Then, when detecting that the image sensor 103 outputs sensor signals to the storage unit 121 (step S2104), the control unit 230 causes the exposure control unit 210 to execute the exposure control processing (step S2105), and also causes the image processing unit 220 to execute the image processing (step S2106).

Thereafter, the control unit 230 determines whether the counter value m has reached M (m=M) (step S2107).

When the counter value m is less than M (step S2107; No), the control unit 230 increments the counter value m by 1 (step S2108), and then returns to step S2103 and performs phase shift so as to cause the grating pattern display unit 160 to display the m-th grating pattern. On the other hand, when the counter value m is M (step S2107; YES), the control unit 230 returns to step S2101 to initialize the counter value m.

Note that the image processing performed by the image processing unit 220 in step S2106 is the same as the flow of the image processing performed by the image processing unit 122d of the imaging device 101d.

Figure 25B:
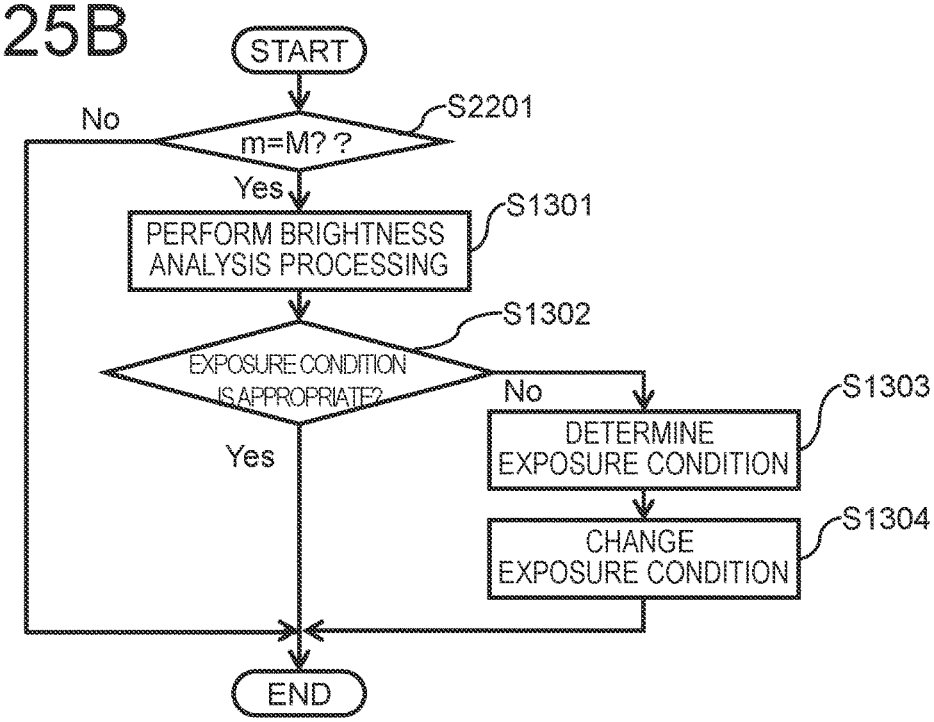
FIG. 25B is a flowchart of the exposure control processing according to the second embodiment.

The exposure control processing performed by the exposure control unit 210 in step S2105 will be described. FIG. 25B illustrates a processing flow of the exposure control processing according to the second embodiment.

The exposure control processing of the second embodiment is basically the same as the exposure control processing of the first embodiment. However, in the second embodiment, as described above, the exposure control unit 210 does not change the exposure condition for one cycle in which grating patterns whose M kinds of initial phases are different from each other are sequentially displayed. Accordingly, for example, prior to the brightness analysis processing, the exposure control unit 210 determines whether the counter value m is M (step S2201).

Then, only in the case where the counter value m is M, the exposure control unit 210 executes the subsequent exposure control processes (step S1301 to step S1304). On the other hand, in the case where the counter value m is other than M, the exposure control unit 210 does not perform but terminate the exposure control processing without performing any further processes.

In the second embodiment as well, the exposure control unit 210 changes the exposure condition by changing at least one of an exposure time of the image sensor 103 and a transmittance of the modulator 102f.

In the exposure control processing, the timing that the exposure control unit 210 determines whether the counter value m is M is not limited to the timing described above. For example, the exposure control unit 210 may determine after the exposure condition is determined to be inappropriate in step S1302. In this case, the exposure control unit 210 performs an exposure condition determination process only in the case where the counter value m is M.

Furthermore, the exposure control unit 210 may determine after step S1303. In this case, the exposure condition determined in step S1303 is stored in the storage unit 121 in association with the date and time of the determination. In the case where the counter value m is M, the exposure control unit 210 may extract the latest exposure condition and set it as the exposure condition.

Still further, it may be configured that the exposure control unit 210 adds the sensor signal output in the addition memory in the case where the counter value m is not M. In this configuration, in the case where the counter value m is M, the brightness analysis unit 211 performs the brightness analysis on the sensor signals added in the addition memory. In this case, in the case where the counter value m is M, the addition memory is cleared immediately before the termination of the exposure control processing.

Figure 26:
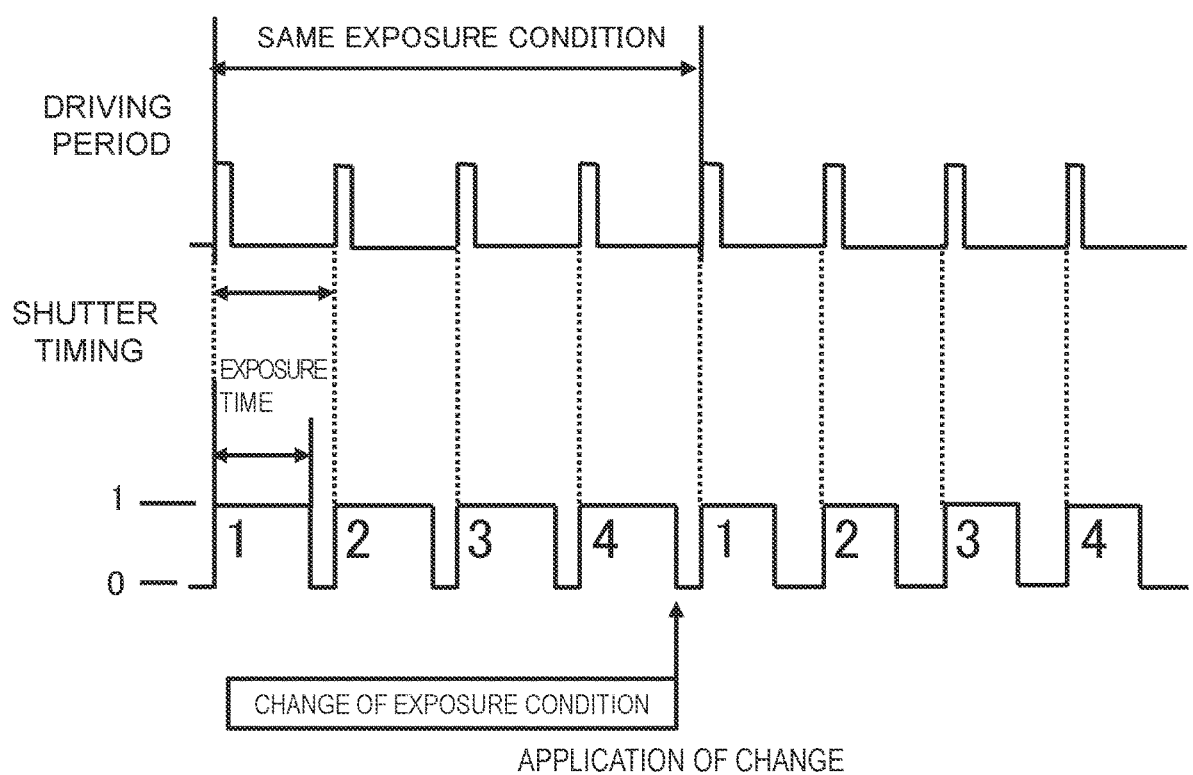
FIG. 26 explains a timing of changing an exposure condition according to the second embodiment.

FIG. 26 illustrates a control example of the second embodiment in the case of, for example, performing the exposure control at a shutter timing (exposure time) of the image sensor 103. Here, it is assumed that four types of grating patterns are displayed in order. In FIG. 26, when a signal of the shutter timing is 1, the light receiving element (sensor pixel) is in an exposure state, and when the signal of the shutter timing is 0, the light receiving element (sensor pixel) is not in the exposure state. That is, a period in which the shutter is ON is the exposure period.

As illustrated in FIG. 26, during a period for displaying each of the four grating patterns in order (four driving periods), the exposure control unit 210 does not change the exposure condition (exposure time). The exposure control unit 210 changes the exposure condition immediately before the first grating pattern is displayed.

As described above, in addition to the configuration of the first embodiment, the imaging device 200 of the second embodiment further includes the control unit 230 configured to control the first grating pattern to be displayed on the modulator 102f. The control unit 230 controls the first grating pattern to be displayed so as to perform the fringe scanning for reducing the noise by using a plurality of different grating patterns.

In this way, according to the second embodiment, in addition to the advantageous effects of the first embodiment, fringe scanning can be performed to suppress the noise. Therefore, it is possible to obtain a photographed image with high quality.

Furthermore, according to the second embodiment, when the control unit 230 performs the time division fringe scanning, the exposure control unit 210 maintains the exposure condition during one period in which the first grating pattern varies. Therefore, according to the second modification, in the case of using a lens-less imaging device capable of performing the fringe scanning, it is possible to control exposure without impairing effects of the fringe scanning.

<Third Modification>

Figure 27A:
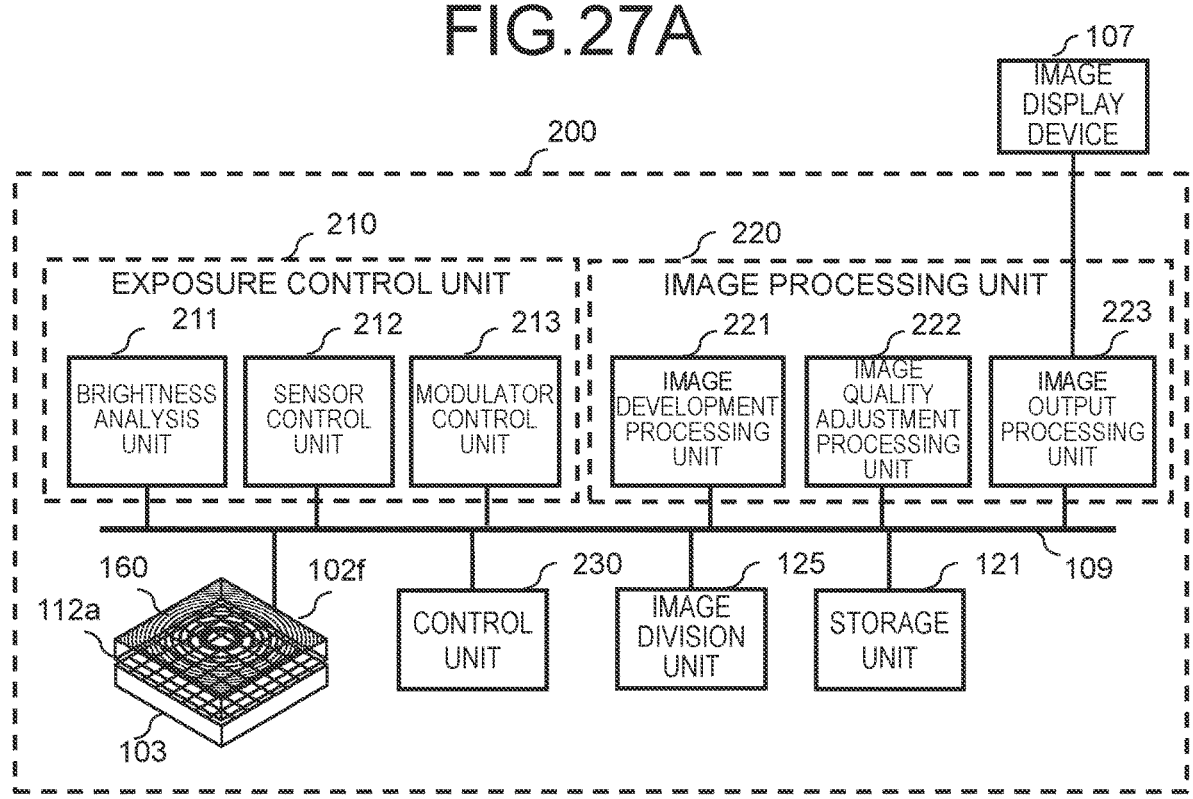
FIG. 27A illustrates a configuration of an imaging device according the modification of the second embodiment, and FIG. 27B explains an example of a grating pattern according to the modification of the second embodiment.

In the second embodiment described above, the example of using the time division fringe scanning has been described. However, the spatial fringe scanning may also be used. FIG. 27A illustrates a configuration of an imaging device 200a according to the third modification.

In the third modification, the elements having the same names as those of the second embodiment have the same configurations and functions as those of the second embodiment, unless explicitly described in particular. Hereinafter, the third modification will be described while focusing on the features different from those of the second embodiment.

In addition to the configuration of the second embodiment, the imaging device 200a of the third modification further includes the image division unit 125. The image division unit 125 is the same as the image division unit 125 of the imaging device 101e, and thus the explanation therefor is omitted herein.

Unlike the second embodiment, the control unit 230 of the third modification is configured not to cause the grating pattern display unit 160 to display the different grating patterns in order for each driving period. Instead, for example, as illustrated in FIG. 17B, the control unit 230 causes the grating pattern display unit 160 to display the grating pattern 150 in which a plurality of grating patterns having different phases are arranged two-dimensionally.

The modulator control unit 213 can change a transmittance of the modulator 102f for each grating pattern display region.

The imaging processing and the exposure control processing of the third modification are the same as those of the first embodiment, and the image processing is the same as that by the imaging device 101e.

However, in the case of controlling an exposure condition based on an exposure time of the image sensor 103, the exposure control unit 210 determines whether the exposure is appropriate by using all the sensor signals of the image sensor 103.

On the other hand, in the case of controlling an exposure condition based on a transmittance of the modulator 102f, the exposure control unit 210 determine whether the exposure condition is appropriate for each sensor signal output from the light receiving element (sensor pixels) which corresponds to each grating pattern display region. Then, the exposure control unit 210 changes the exposure condition for each grating pattern display region as well.

Figure 27B:
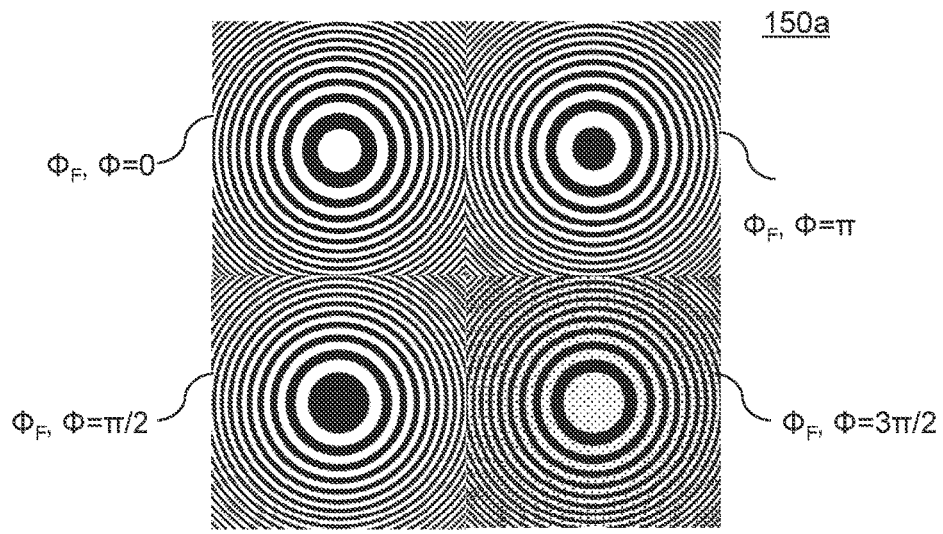

FIG. 27B illustrates an example of a grating pattern 150a to be displayed on the grating pattern display unit 160 in the case where only a transmittance of the grating pattern ($\Phi_F$, $\Phi=3\pi/2$) is changed.

According to the third modification, when the control unit 230 performs the spatial division fringe scanning, the exposure control unit 210 determines an exposure condition for each region of the image sensor 103 which corresponds to each region of the modulator 102f in which different grating patterns are displayed, based on the sensor signals output from the region. Therefore, according to the third modification, in the case of using a lens-less imaging device capable of performing fringe scanning, it is possible to control exposure without impairing effects of the fringe scanning.

It should be noted that various modifications of the first embodiment are applicable to the second embodiment and its modifications.

Third Embodiment

A third embodiment of the present invention will be described. In the third embodiment, in the same manner as the second embodiment, fringe scanning is performed. However, in the third embodiment, the presence or absence of the movement of the subject 400 to be imaged is determined, and the fringe scanning is switched between the spatial division fringe scanning and the time division fringe scanning.

In the case where the subject 400 is stationary, performing the time division fringe scanning for displaying one phase pattern on one modulator and changing phase patterns with time is preferable. This is because the light volume acquired by one phase pattern is high in the time division fringe scanning, which improves the image quality. On the other hand, in the case where there is movement in the subject 400, performing the spatial division fringe scanning for imaging four phase patterns at the same time is preferable. This is because, in the case where there is a difference in the acquisition times of the four images to be synthesized, a gap is generated by the amount of movement of the subject 400.

In the third embodiment, based on the characteristics of the fringe scanning, the types of fringe scanning to be executed is switched by the presence or absence of the movement of the subject 400. That is, in the case where it is determined that there is movement in the subject 400, the space division fringe scanning is used, while in the case where it is determined that there is no movement in the subject 400, the time division fringe scanning is used. As a result, it is possible to perform optimum imaging.

Hereinafter, in the third embodiment, an imaging mode using the spatial division fringe scanning is referred to as a moving object imaging mode, and an imaging mode using the time division fringe scanning is referred to as a stationary object imaging mode.

The imaging device 200b of the third embodiment is basically the same as that of the second embodiment. Hereinafter, in the third embodiment, the elements having the same names as those of the second embodiment have the same configurations and functions as those of the second embodiment, unless explicitly described in particular. Hereinafter, the third embodiment will be described while focusing on the features different from those of the second embodiment.

FIG. 28 illustrates a configuration of the imaging device 200b of the third embodiment. The imaging device 200a of the third embodiment includes the image sensor 103, the modulator 102f, the storage unit 121, the image processing unit 220, the control unit 230, the exposure control unit 210, and the bus 109 provided for connecting the respective components.

The image processing unit 220 includes the image development processing unit 221, the image quality adjustment processing unit 222, and the image output processing unit 223. The exposure control unit 210 includes the brightness analysis unit 211, the sensor control unit 212, and the modulator control unit 213.

Furthermore, the imaging device 200b of the third embodiment further includes a movement determination unit 231 and an imaging mode setting unit 232.

The movement determination unit 231 is configured to determine whether there is movement in the subject 400, and output a determination result to the imaging mode setting unit 232. The movement determination unit 231 determines the presence or absence of movement, for example, based on a sensor image stored in the storage unit 121.

The imaging mode setting unit 232 is configured to set the imaging mode based on an instruction from the user or a determination result of the movement determination unit 231. In the third embodiment, the imaging mode setting unit 232 determines the moving object imaging mode or the stationary object imaging mode.

The control unit 230 controls grating patterns to be displayed on the grating pattern display unit 160 in accordance with the imaging mode set by the imaging mode setting unit 232. Furthermore, in the case where the moving object imaging mode is set as the imaging mode, the control unit 230 makes the grating pattern to be displayed vary in a predetermined order for each driving period.

In the third embodiment, the storage unit 121 stores information for specifying the current imaging mode as imaging mode information. Furthermore, the storage unit 121 stores the sensor image acquired in the past in association with its acquisition time and imaging mode at the time of acquisition, and in the case where the imaging mode at the time of acquisition is the moving object imaging mode, stores it further in association with its phase pattern.

[Imaging Processing]

Figure 29A:
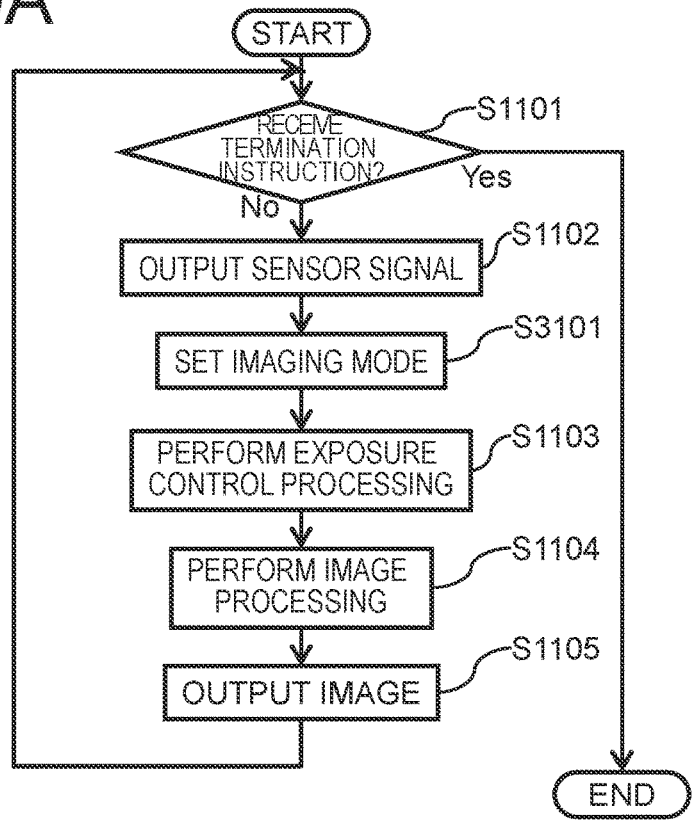
FIG. 29A is a flowchart of the imaging processing according to the third embodiment.

Firstly, a flow of the imaging processing of the third embodiment will be described. FIG. 29A illustrates a processing flow of the imaging processing of the third embodiment. This processing is started upon reception of an instruction to start imaging. The instruction to start imaging includes a manual instruction such that the user directly or remotely presses a start button, or an instruction automatically issued by a preset timer. Note that as an exposure condition, an initial value thereof is set.

The imaging processing of the third embodiment is basically the same as the imaging processing of the first embodiment. However, in the third embodiment, when the image sensor 103 outputs the sensor signals (step S1102), the movement determination unit 231 performs the movement determination, and the imaging mode setting unit 232 executes the imaging mode setting processing for setting an imaging mode (step S3101). The subsequent processes are the same as those of the first embodiment.

However, in the case where the moving object imaging mode is set as the imaging mode in the imaging mode setting processing, in the same manner as the execution of the time division fringe scanning of the second embodiment, the exposure control unit 210 counts change of grating patterns by a counter to restrict execution of the exposure control.

[Imaging Mode Setting Processing]

Figure 30:
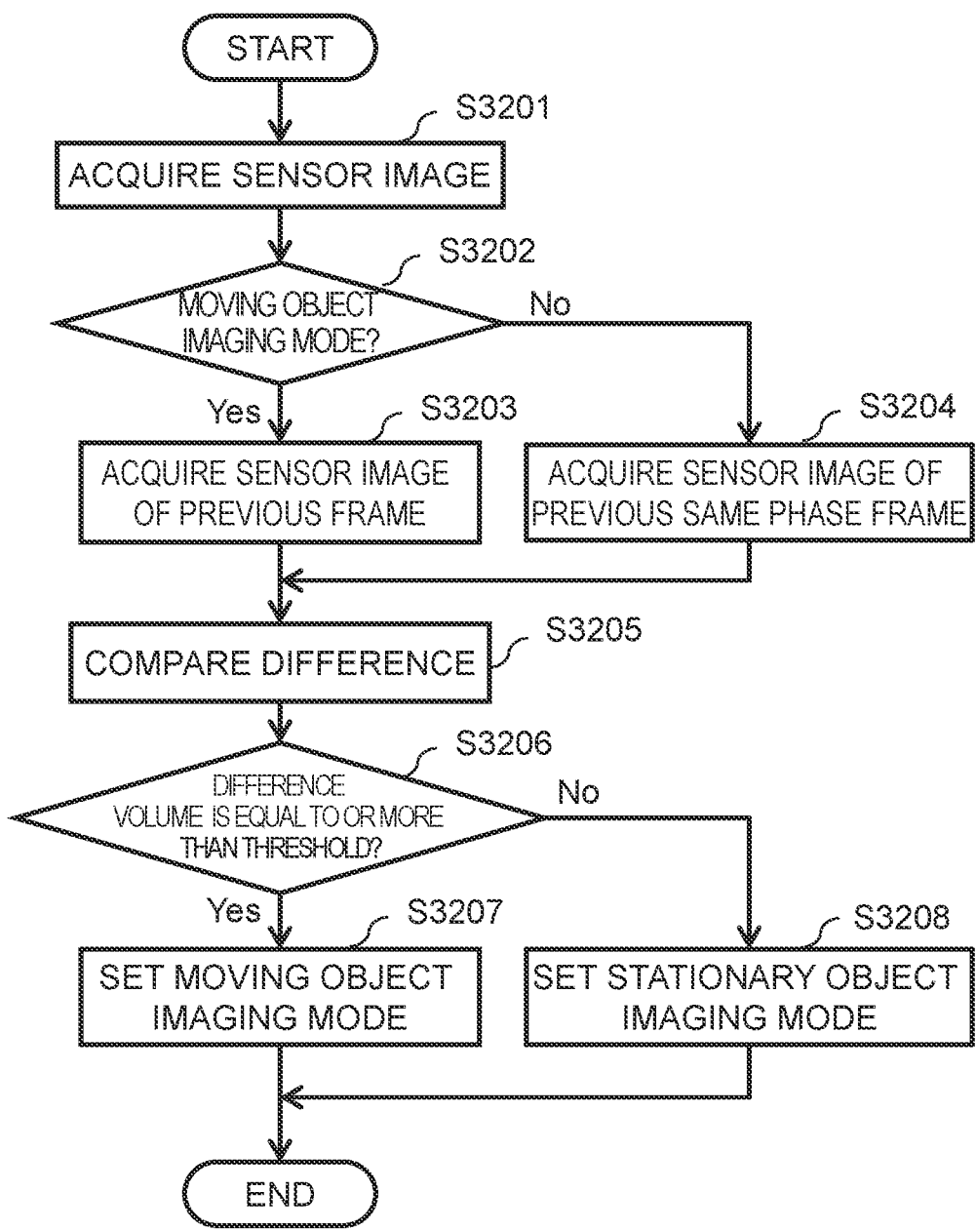
FIG. 30 is a flowchart of the imaging mode setting processing according to the third embodiment.

Next, a flow of the imaging mode setting processing in step S3101 described above will be explained. FIG. 30 illustrates a processing flow of the imaging mode setting processing according to the third embodiment.

The movement determination unit 231 acquires the latest sensor signals (sensor image) for one frame and the imaging mode information stored in the storage unit 121 (step S3201).

The movement determination unit 231 determines whether the current imaging mode is the moving object imaging mode based on the imaging mode information (step S3202).

In the case of determining that the current imaging mode is the moving object imaging mode (step S3202; Yes), the movement determination unit 231 acquires a sensor image one frame before (previous frame) of the latest sensor image as a sensor image for comparison (step S3203). Note that the case where the current imaging mode is determined to be the moving object imaging mode corresponds to the case where the latest sensor image is acquired in the space division fringe scanning.

On the other hand, in the case of determining that the current imaging mode is not the moving object imaging mode (step S3202; No), the movement determination unit 231 acquires a sensor image of the previous same phase frame as a sensor image for comparison (step S3204). Note that the case of determining that the current imaging mode is not the moving object imaging mode corresponds to the case where the current imaging mode is the stationary object imaging mode and the latest sensor image is acquired in the time division fringe scanning. Also note that a sensor image of the previous same phase frame is the most recent sensor image acquired in the phase pattern which is the same as that of the latest sensor image acquisition among the sensor images acquired before the latest sensor image.

The movement determination unit 231 calculates a difference between the latest sensor image and the sensor image for comparison (step S3205). Since the sensor image is not for recognition of the subject 400, the movement determination unit 231 calculates how much the entire image data is changed as the difference. The movement determination unit 231 may obtain the difference by calculating a difference for each sensor pixel and then calculating the total thereof, by calculating a difference between each total of all the sensor pixel values, or by other methods.

Next, the movement determination unit 231 determines whether the calculated difference is equal to or greater than a predetermined difference threshold (step S3206). The difference threshold is stored in advance in the storage unit 121.

In the case where the difference is equal to or greater than the difference threshold (step S2106; Yes), the movement determination unit 231 determines that there is movement, and outputs the determination result to the imaging mode setting unit 232. Upon receiving the determination result, the imaging mode setting unit 232 sets the moving object imaging mode (step S3207), and then terminates the processing.

On the other hand, in the case where the difference is less than the difference threshold (step S2106; No), the movement determination unit 231 determines that there is no movement, and outputs the determination result to the imaging mode setting unit 232. Upon receiving the determination result, the imaging mode setting unit 232 sets the stationary object imaging mode (step S3208), and then terminates the processing.

The storage unit 121 stores, as the latest imaging mode, the imaging mode as set so as to allow the exposure control unit 210 and the image processing unit 220 to refer thereto.

In the case where the imaging mode setting unit 232 sets the moving object imaging mode, the control unit 230 causes the modulator 102f to display, for example, the grating pattern 150 for the spatial division fringe scanning. The exposure control unit 210 and the image processing unit 220 perform the exposure control processing and the image processing for the spatial division fringe scanning, respectively.

In the case where the imaging mode setting unit 232 sets the stationary object imaging mode, the control unit 230 sequentially and periodically causes the modulator 102f to display, for example, the grating patterns 141 to 144. The exposure control unit 210 and the image processing unit 220 perform the exposure control processing and the image processing for the time division fringe scanning, respectively.

As described above, the imaging device 200a of the third embodiment further includes the movement determination unit 231 configured to detect presence or absence of movement of the subject 400 based on the sensor signals; and the imaging mode setting unit 232 configured to determine execution of either time division fringe scanning or space division fringe scanning, wherein the control unit 230 controls the first grating pattern to be displayed on the modulator 102f so as to perform one of the types of the fringe scanning that has been determined by the imaging mode setting unit, and controls the operations of the exposure control unit 210 and image processing unit 220.

In the case where the movement determination unit 231 determines that there is no movement, the imaging mode setting unit 232 determines that the time division fringe scanning should be executed, while in the case where the movement determination unit 231 determines that there is movement, the imaging mode setting unit 232 determines that the space division fringe scanning should be executed.

As described above, according to the third embodiment, it is possible to optimize the imaging in accordance with the subject 400. Therefore, it is possible to efficiently obtain images with optimum quality.

Furthermore, according to the third embodiment, which types of the fringe scanning should be performed is determined based on the presence or absence of the movement of the subject 400. Since the presence or absence of movement of the subject 400 is determined based on the sensor image, the determination can be made quickly. In addition, since the determination does not require the development processing, it is possible to reduce the processing load.

<Fourth Modification>

In the third embodiment described above, the presence or absence of movement is determined by calculation of a difference between a sensor image and a predetermined sensor image, however, the present invention is not limited thereto. The image processing including the image development processing may be performed to determine the presence or absence of movement based on the obtained photographed image.

Figure 29B:
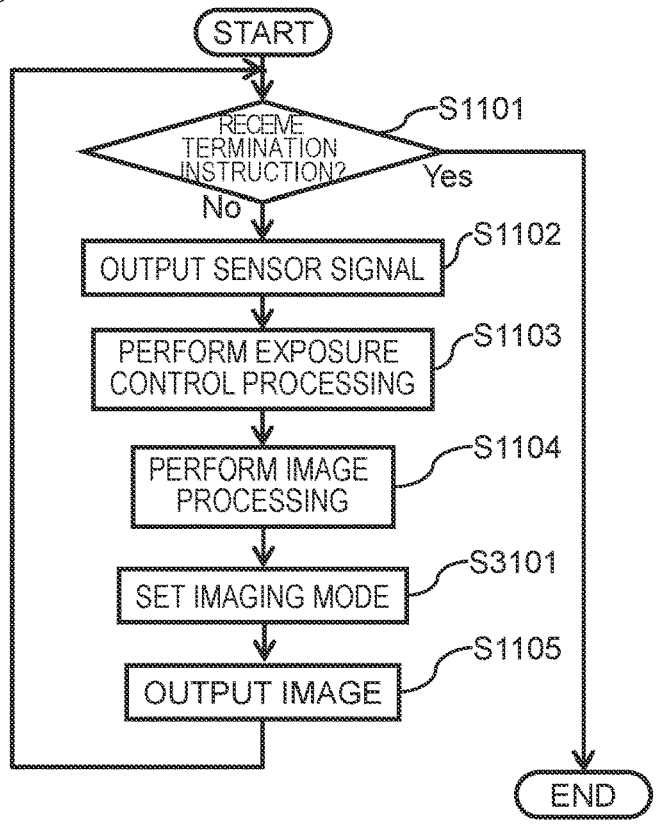
FIG. 29B is a flowchart of the imaging processing according to the modification of the third embodiment.

In this case, in the imaging processing, as illustrated in FIG. 29B, after the sensor signals are output (step S1102), the exposure control processing (step S1103) and the image processing (step S1104) are performed so as to set an imaging mode based on the obtained photographed image (step S3101).

Figure 31:
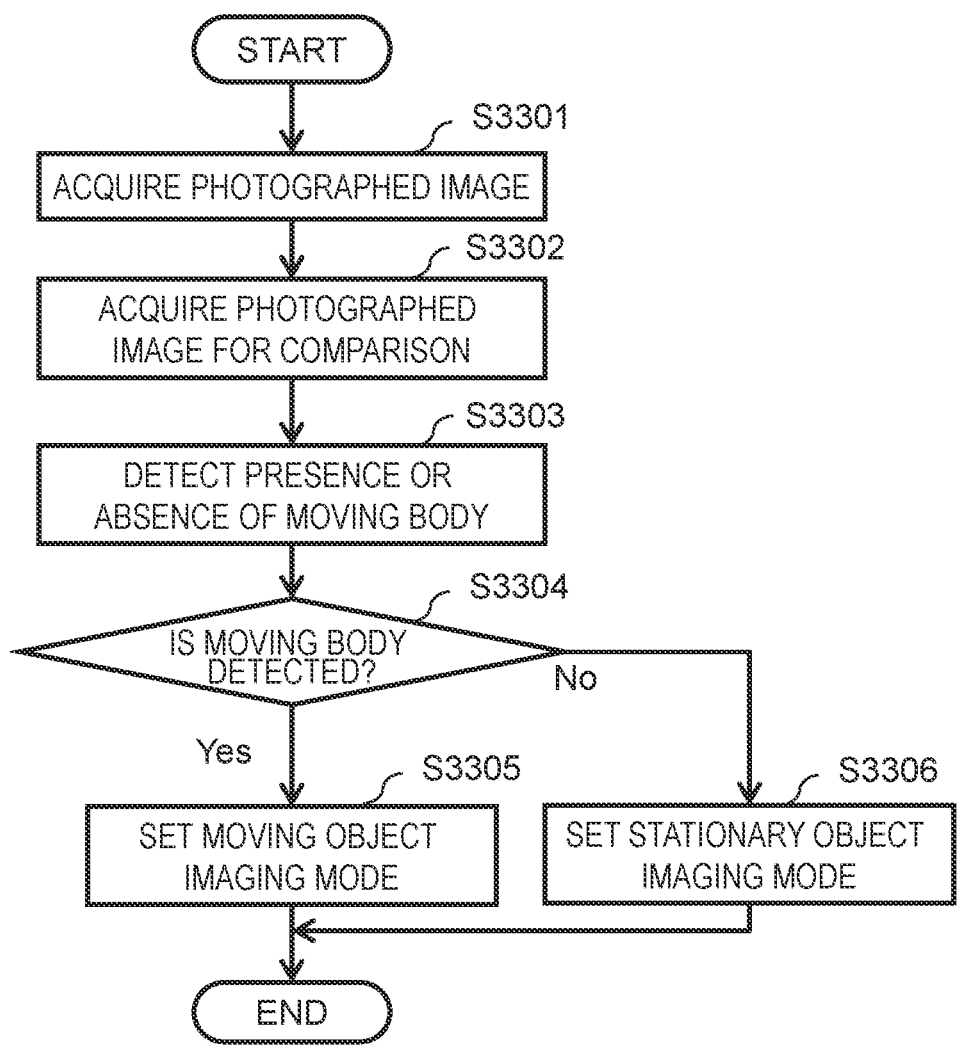
FIG. 31 is a flowchart of the imaging mode setting processing according the modification of the third embodiment.

FIG. 31 illustrates a processing flow of the imaging mode setting processing in the case of determining the presence or absence of movement by using a photographed image. This processing is started when a photographed image for one frame is stored in the storage unit 121.

Firstly, the movement determination unit 231 acquires the latest photographed image from the storage unit 121 (step S3301).

Next, similarly, the movement determination unit 231 acquires the photographed image for comparison from the storage unit 121 (step S3302). Here, for example, the movement determination unit 231 acquires the most recent photographed image (immediately preceding photographed image) stored before the latest photographed image.

The photographed image for comparison is not limited to the above. An image generated based on a plurality of recently photographed images, including the immediately preceding photographed image, may be used as the photographed image for comparison. In this case, as a pixel value of the photographed image for comparison, for example, a value obtained by performing statistical processing on pixel values of each pixel of the plurality of recently photographed images is set. The statistical processing is, for example, averaging or summing.

The movement determination unit 231 compares the latest photographed image with the photographed image for comparison to detect the presence or absence of a moving object (step S3303). For the detection of the presence or absence of a moving object, the movement determination unit 231 may use a known method, or a method of calculating a difference and determining whether the difference is equal to or greater than a difference threshold.

In the case where the moving object is detected (step S3303; Yes), the movement determination unit 231 determines that there is movement, and outputs the determination result to the imaging mode setting unit 232. Upon receiving the determination result, the imaging mode setting unit 232 sets the moving object imaging mode (step S3304), and terminates the processing.

On the other hand, in the case where the moving object is not detected (step S3303; No), the movement determination unit 231 determines that there is no movement, and outputs the determination result to the imaging mode setting unit 232. Upon receiving the determination result, the imaging mode setting unit 232 sets the stationary object imaging mode (step S3305), and terminates the processing.

As described above, detecting the presence or absence of a moving object and switching the modulators and the image development methods enable optimum photographing. In this case, for example, using a known movement determination processing technique enables distinguishment between the background that does not move and a subject that is moving, thereby making it possible to determine the presence or absence of the movement of the subject itself. As a result, it is possible to more accurately determine the presence or absence of movement.

In the fourth modification, determination of the presence or absence of a moving body is not necessarily based on a photographed image. For example, it may be based on a developed image obtained by performing only the image development processing before adjusting the image quality or the like.

Fourth Embodiment

A fourth embodiment of the present invention will be described. In the fourth embodiment, a part or all of the functions of the imaging devices 200, 200a, 200b (hereinafter, collectively referred to as the imaging device 200) are mounted on a mobile information communication device (hereinafter, referred to as a portable terminal), thereby implementing a small and thin portable terminal using a lens-less imaging device, which is capable of exposure control.

Note that the portable terminal may be an information processing device having a wireless communication function, an information processing function, an imaging function, and a display function, and for example, it may be a mobile phone, a smartphone, a tablet terminal, a wearable terminal such as a watch and a head mounted display, a future phone, or a portable digital device other than the above.

Figure 32:
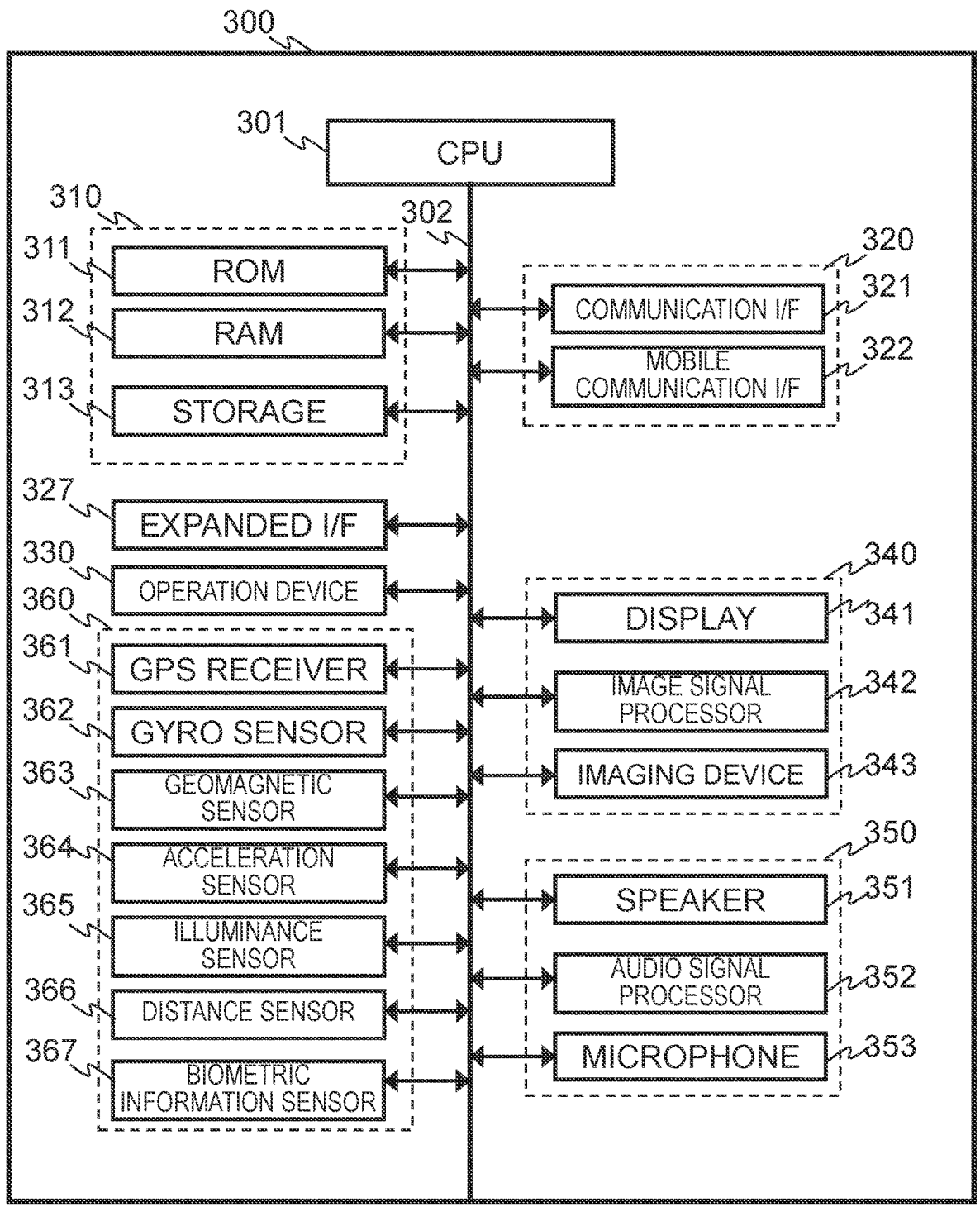
FIG. 32 illustrates a hardware configuration of a portable terminal according to the fourth embodiment.

FIG. 32 illustrates a hardware configuration of the portable terminal 300 of the present invention. As illustrated in FIG. 32, the portable terminal 300 includes the CPU (Central Processing Unit) 301, the system bus 302, a storage device 310, the communication device 320, an expanded I/F 327, an operation device 330, a video processor 340, an audio processor 350, and a sensor 360.

The CPU 301 is a microprocessor unit for controlling the overall portable terminal. The system bus 302 is a data communication path provided for transmitting and receiving data between the CPU 301 and the operation blocks in the portable terminal.

The CPU 301 is configured to receive an operation request from the user through the operation device 330 and control the video processor 340, the communication device 320, and various program function units.

Furthermore, the CPU 301 has a function of acquiring various kinds of information from a server on an external network through the communication device 320 and passing the acquired information to the various program function units.

The storage device 310 includes the ROM (Read Only Memory) 311, the RAM (Random Access Memory) 312, and the storage 313.

The ROM 311 is a memory configured to store a basic operation program such as an operating system and other operation programs. As the ROM 311, for example, rewritable ROMs such as an EEPROM (Electrically Erasable and Programmable Read Only Memory) and a flash ROM are used.

The storage 313 stores various operation programs and operation setting values of the portable terminal 300, and various programs and items of data required to implement each function of the embodiments of the present invention. The storage 313 holds the stored information even in a state where no power is supplied to the portable terminal 300 from the outside. Accordingly, as the storage 313, devices such as a flash ROM, an SSD (Solid State Drive), and an HDD (Hard Disk Drive) are used.

The storage 313 is controlled in accordance with instructions from the CPU 301, and stores application programs. In addition, the storage 313 stores various types of information created by the application program. Furthermore, the storage 313 may be configured to store content such as video/audio streams based on signals acquired from the communication device 320. The storage 313 may be built in the portable terminal 300, or may be a removable portable memory.

The RAM 312 is a work area during execution of a basic operation program or other operation programs, and configured to be controlled by instructions from the CPU 301. The CPU 301 loads the application programs stored in the storage 313 in the RAM 312. Although not illustrated in FIG. 32, the storage 313 stores, for example, the programs for implementing the exposure control unit 210, the image processing unit 220, and the control unit 230 of FIG. 19A. That is, in the fourth embodiment, the CPU 301 loads and executes the application programs stored in the storage device 310 (storage 313 or ROM 311) in the RAM 312 so as to implement the various functions.

The application programs may be stored in advance in the storage 313 or the like before the portable terminal 300 is shipped, or may be stored in an optical medium such as a CD (Compact Disk) or a DVD (Digital Versatile Disk), or a medium such as a semiconductor memory so that it can be installed in the portable terminal 300 via a medium connection unit (not illustrated).

The application programs may be downloaded from an external network (not illustrated) through the communication device 320 (described later) and a wireless router (not illustrated) in order to be installed. Furthermore, they may be downloaded from a distribution source via a base station (not illustrated) through a mobile communication interface in order to be installed. Still further, in a state where the portable terminal 300 is connected to a personal computer (PC) that has acquired the application programs via a network by using an external device connection I/F (not illustrated), the application programs may be moved or copied from the PC to the portable terminal 300 in order to be installed.

Still further, it is possible to implement each application program by hardware as a processing unit having the same function. In such a case, each processing unit is a main unit for implementing each function.

The communication device 320 includes a communication interface (I/F) 321 and a mobile communication interface 322.

The communication IF 321 is connected to a wireless router (not illustrated), for example, by a wireless LAN.

The communication IF 321 is further connected to an external network via the wireless router to transmit and receive information to and from such as a server on the external network. In addition to or in place of the communication function with the wireless router, the communication IF 321 can directly communicate with the server without going through the wireless router by a wireless LAN such as Wi-Fi (registered trademark).

The communication IF 321 may be equipped with chips for different communication methods, or equipped with a single chip for a plurality of communication methods. For example, a function such as Bluetooth (registered trademark) for directly communicating with other information devices enables the communication IF 321 to directly transmit and receive data to and from other information devices.

The mobile communication IF 322 is connected to a communication network via a base station by using a mobile communication network such as a third generation mobile communication system (hereinafter, referred to as "3G"), an LTE (Long Term Evolution) system, or a new next generation communication system called a fifth generation mobile communication system (5G) so as to transmit and receive data to and from a server on the communication network. As 3G, for example, a GSM (registered trademark) (Global System for Mobile Communications) system, a W-CDMA (Wideband Code Division Multiple Access) system, a CDMA 2000 system, and a UMTS (Universal Mobile Telecommunications System) system are known.

It may be configured to prioritize the connection with an external network by the communication IF 321 over the communication network connection by the mobile communication IF 322.

The expanded I/F 327 is an interface group for expanding the functions of the portable terminal 300. In the fourth embodiment, the expanded I/F 327 includes such as a video/audio I/F, an operating device I/F, and a memory I/F. The video/audio I/F inputs picture signals/sound signals from an external video/audio output device and outputs picture signals/sound signals to external video/audio input devices. The external operating device such as a keyboard is connected through the operating device I/F. The memory I/F is provided for connecting a memory card or other memory media to the portable terminal 300 to transmit and receive data therebetween.

The operation device 330 is configured to input operation instructions to the portable terminal 300. In the fourth embodiment, the operation device 330 includes an operation key on which a touch screen and button switches are arranged to be overlapped with a display 341. Note that only any one of them may be provided. The portable terminal 300 may be operated using a keyboard connected to the expanded I/F 327, or may be operated using a separate personal digital assistant device connected via wired communication or wireless communication. The touch screen function may be provided in the display 341.

The video processor 340 includes the display 341, an image signal processor 342, and a camera 343.

The display 341 is a display device such as a liquid crystal panel, and configured to display image data processed by the image signal processor 342 to provide the user of the portable terminal 300 with the image data. In the fourth embodiment, the display 341 also functions as the image display device 107 of the imaging device 200.

The image signal processor 342 includes a video RAM (not illustrated), and is configured to drive the display 341 based on the image data input to the video RAM. The image signal processor 342 performs such as format conversion and superposition processing of a menu or other OSD (On-Screen Display) signals, as necessary.

The camera 343 is an imaging device configured to convert incident light into electrical signals to acquire images of the surroundings or a target as image data. In the fourth embodiment, the camera 343 is the imaging device 200.

The audio processor 350 includes a speaker 351, an audio signal processor 352, and a microphone 353. The speaker 351 provides the user of the portable terminal 300 with audio signals processed by the audio signal processor 352. The microphone 353 converts such as a voice of the user into audio data and inputs the audio data.

The sensor 360 is a sensor group for detecting a state of the portable terminal 300. In the fourth embodiment, for example, the sensor 360 includes a GPS (Global Positioning System) receiver 361, a gyro sensor 362, a geomagnetic sensor 363, an acceleration sensor 364, an illuminance sensor 365, a distance sensor 366, and a biometric information sensor 367.

Note that a sensor group other than the above detects such as a position, inclination, orientation, motion, ambient luminosity, and user biometric information of the portable terminal 300. The portable terminal 300 may further include such as an atmospheric pressure sensor and a pressure sensor. Although the portable terminal 300 acquires its positional information through the GPS receiver 361, at places where GPS radio waves are not easily available, it may acquire its positional information by using positional information of an AP device of Wi-Fi through the communication device 320, by using positional information of a base station similarly through the communication device 320, or by a positional information acquisition method using propagation delay of telephone communication radio waves. These sensor groups do not necessarily have to include all the sensors described above.

The configuration example of the portable terminal 300 illustrated in FIG. 32 includes a number of functions that are not essential to the fourth embodiment. Note that the advantageous effects of the fourth embodiment are not impaired even in the case where the portable terminal 300 does not include such unessential functions. In addition, the portable terminal 300 may further include functions such as a digital broadcast reception function and an electronic money settlement function (not illustrated).

The methods and operations of imaging according to the fourth embodiment are the same as those according to the embodiments and modifications described above.

As described above, according to the fourth embodiment, since the portable terminal 300 includes the imaging device 200 described above, it is possible to reduce the size and thickness of the portable terminal 300 while improving image quality of imaging thereby.

The portable terminal 300 may be used for imaging in various imaging environments. By controlling the modulator 102*f* of the imaging device 200 in accordance with an imaging environment, the portable terminal 300 can realize optimum imaging.

The present invention is not limited to the embodiments and modifications described above, and includes various modifications. For example, the embodiments and modifications described above are explained in detail for the purpose of easy understanding of the present invention, which are not necessarily limited to ones including all the configurations described above. Some of the configurations of an embodiment or a modification may be replaced with the configuration of another embodiment or another modification. The configuration of another embodiment or another modification may be added to the configuration of an embodiment or a modification. In regard to some of the configurations of the embodiments or the modifications, another configuration may be added, removed, or replaced.

Some or all the configurations described above, functions, processing units, and processing means may be implemented by hardware, for example, by designing them with an integrated circuit. In addition, the configurations and functions described above may be implemented by software by interpreting and executing programs in which the processor implements the respective functions. Information such as programs, tables, and files for implementing various functions can be placed in recording devices such as a memory, a hard disk, and an SSD (Solid State Drive), or recording media such as an IC card, an SD card, and a DVD.

Furthermore, the control lines and the information lines which are considered to be necessary for the purpose of explanation are indicated herein, but not all the control lines and the information lines of actual products are necessarily indicated. It may be considered that almost all the configurations are actually connected to each other.

REFERENCE SIGNS LIST

101a: imaging device, 101b: imaging device, 101c: imaging device, 101d: imaging device, 101e: imaging device, 102a: modulator, 102b: modulator, 102d: modulator, 102e: modulator, 102f: modulator, 103: image sensor, 103a: sensor pixel, 104: first grating pattern (front surface side grating pattern), 104b: grating pattern, 104c: grating pattern, 105: second grating pattern (back surface side grating pattern), 106: intensity modulation unit, 107: image display device, 109: bus, 112a: grating substrate, 112b: support member, 113: grating sensor integrated substrate, 121: storage unit, 122: image processing unit, 122a: image processing unit, 122b: image processing unit, 122c: image processing unit, 122d: image processing unit, 122e: image processing unit, 123: focus setting unit, 124: control unit, 125: image division unit, 140: grating pattern display unit, 141: grating pattern, 142: grating pattern, 143: grating pattern, 144: grating pattern, 150: grating pattern, 150a: grating pattern, 160: grating pattern display unit, 160a: terminal, 160b: terminal, 160c: terminal, 160d: terminal, 160e: transmissive portion, 160f: non-transmissive portion, 161: grating pattern, 162: grating pattern, 163: grating pattern, 200: imaging device, 200a: imaging device, 200b: imaging device, 210: exposure control unit, 211: brightness analysis unit, 212: sensor control unit, 213: modulator control unit, 220: image processing unit, 221: image development processing unit, 222: image quality adjustment processing unit, 223: image output processing unit, 230: control unit, 231: movement determination unit, 232: imaging mode setting unit, 300: portable terminal, 301: CPU, 302: bus, 310: storage device, 311: ROM, 312: RAM, 313: storage, 314: external device interface, 320: communication device, 321: communication I/F, 322: mobile communication interface (I/F), 327: expanded I/F, 330: operation device, 340: video processor, 341: display, 342: image signal processor, 343: camera, 350: audio processor, 351: speaker, 352: audio signal processor, 353: microphone, 360: sensor, 361: GPS receiver, 362: gyro sensor, 363: geomagnetic sensor, 364: acceleration sensor, 365: illuminance sensor, 366: distance sensor, 367: biometric information sensor, 400: subject, 401: point, 402: projection image, 403: point, 404: projection image, 411: graph, 412: histogram, 413: graph, 414: graph, 415: graph, 422: sensor signal threshold, 423: second sensor signal threshold, 424: sensor signal threshold

The invention claimed is:

1. An imaging device comprising:
an image sensor that is configured to convert an optical image captured in a plurality of light receiving elements arranged in an array on an imaging surface into sensor signals, and output the sensor signals;
a modulator that is provided on a light receiving surface of the image sensor, and configured to modulate light by using a first grating pattern;
an exposure controller that is configured to determine an exposure condition based on the sensor signals, change a set exposure condition to the exposure condition as determined, and control exposure in accordance with the exposure condition as changed; and
an image processing unit that is configured to generate a second grating pattern corresponding to the first grating pattern, generate a moiré fringe image based on the second grating pattern and the sensor signals, and generate a photographed image based on the moiré fringe image; and
a controller,
wherein the exposure condition includes an exposure time of the image sensor and a transmittance of the modulator, and
wherein in a case where the controller controls the first grating pattern so as to perform time division fringe scanning for making the first grating pattern vary periodically at predetermined time intervals among a plurality of types of the fringe scanning, the exposure controller maintains the exposure condition during one period in which the first grating pattern varies.

2. The imaging device according to claim 1, wherein the exposure controller determines the exposure condition in accordance with signal values of the sensor signals.

3. The imaging device according to claim 2, wherein in a case where a maximum value of sensor signals to be analyzed is equal to or greater than a predetermined sensor signal threshold, the exposure controller determines the exposure condition such that values of sensor signals to be output from the image sensor become smaller than the values of the sensor signals to be analyzed.

4. The imaging device according to claim 3, wherein in a case where a minimum value of the sensor signals to be analyzed is less than a predetermined second sensor signal threshold, the exposure controller determines the exposure condition such that the values of the sensor signals to be output from the image sensor become greater than the values of the sensor signals to be analyzed.

5. The imaging device according to claim 3, wherein the sensor signal threshold is set to a maximum value that is a highest possible value for a sensor signal output from the image sensor.

6. The imaging device according to claim 3, wherein the sensor signal threshold is set to a value between a mode value and a maximum value that are possible values for a sensor signal output from the image sensor.

7. The imaging device according to claim 3, wherein the sensor signal threshold is set to a value having a predetermined range.

8. The imaging device according to claim 3, wherein the exposure controller determines the exposure condition so as to reduce at least one of the exposure time of the image sensor and the transmittance of the modulator.

9. The imaging device according to claim 8, wherein in a case of reducing the transmittance of the modulator, the exposure controller determines the exposure condition such that the transmittance becomes lower towards a center portion of the modulator.

10. The imaging device according to claim 1, wherein the modulator includes a pattern display unit configured to display the first grating pattern on the light receiving surface,
the pattern display unit includes a liquid crystal display element, and
the transmittance is changed by change of voltage applied to the liquid crystal display element.

11. The imaging device according to claim 1, wherein
in a case where the controller controls the first grating pattern so as to perform space division fringe scanning for displaying a plurality of different grating patterns on the first grating pattern among types of the fringe scanning, the exposure controller determines, for each region of the image sensor corresponding to regions of the modulator on which each of the plurality of different grating patterns is displayed, the exposure condition based on sensor signals output from the regions.

12. The imaging device according to claim 1, further comprising:
a movement determination unit configured to detect presence or absence of movement in a subject based on the sensor signals; and
an imaging mode setting unit configured to determine execution of either time division fringe scanning for making the first grating pattern vary periodically at predetermined time intervals or space division fringe scanning for displaying a plurality of different grating patterns on the first grating pattern among types of the fringe scanning, wherein
the controller controls the first grating pattern to be displayed on the modulator so as to perform one of the types of the fringe scanning that has been determined by the imaging mode setting unit.

13. The imaging device according to claim 12, wherein
in a case where the movement determination unit determines that there is no movement in the subject, the imaging mode setting unit determines that the time division fringe scanning should be executed.

14. The imaging device according to claim 12, wherein
in a case where the movement determination unit determines that there is movement in the subject, the imaging mode setting unit determines that the space division fringe scanning should be executed.

15. A portable terminal comprising the imaging device according to claim 1.

16. An exposure control method for an imaging device including: an image sensor that is configured to convert an optical image captured in a plurality of light receiving elements arranged in an array on an imaging surface into sensor signals and output the sensor signals; a modulator that is provided on a light receiving surface of the image sensor and configured to modulate light by using a first grating pattern; and an image processing unit configured to generate a second grating pattern corresponding to the first grating pattern, generate a moiré fringe image based on the second grating pattern and the sensor signals, and generate a photographed image based on the moiré fringe image, the exposure control method comprising the steps of:
determining an exposure condition based on the sensor signals;
changing a set exposure condition to the exposure condition as determined; and
controlling exposure in accordance with the exposure condition as changed,
wherein the exposure condition includes an exposure time of the image sensor and a transmittance of the modulator,
wherein the control method further comprises the steps of, in a case where the first grating pattern is controlled so as to perform time division fringe scanning for making the first grating pattern vary periodically at predetermined time intervals among a plurality of types of the fringe scanning, maintaining the exposure condition during one period in which the first grating pattern varies.

* * * * *